United States Patent [19]

Verbanets, Jr.

[11] Patent Number: 4,912,723
[45] Date of Patent: Mar. 27, 1990

[54] MULTIPURPOSE DIGITAL IC FOR COMMUNICATION AND CONTROL NETWORK

[75] Inventor: William R. Verbanets, Jr., Plum Borough, Pa.

[73] Assignee: Westinghouse Electric Corp., Pittsburgh, Pa.

[21] Appl. No.: 625,747

[22] Filed: Jun. 28, 1984

[51] Int. Cl.$^4$ .......................... H04L 5/16; H04B 1/38
[52] U.S. Cl. ........................................ 375/7; 375/121; 340/825.51; 340/825.52
[58] Field of Search .......................... 375/7, 8, 9, 121; 179/2 DP, 2 C; 455/608; 364/200, 900; 340/310 R, 825.5, 825.51, 825.52, 825.53, 825.54

[56] References Cited

U.S. PATENT DOCUMENTS

| | | | |
|---|---|---|---|
| 3,601,537 | 8/1971 | Gueldenpfenning | 375/113 |
| 3,715,725 | 2/1973 | Kievit et al. | 340/147 |
| 3,842,405 | 10/1974 | Key et al. | 375/8 |
| 3,876,984 | 4/1975 | Chertok | 340/310 R |
| 3,909,790 | 9/1975 | Shapiro et al. | 340/172.5 |
| 4,014,004 | 3/1977 | Fuller | 375/9 |
| 4,085,449 | 4/1978 | Walsh et al. | 375/8 |
| 4,091,361 | 5/1978 | Eichelberger et al. | 340/310 R |
| 4,167,786 | 9/1979 | Miller et al. | 340/825.5 |
| 4,168,531 | 9/1979 | Eichelberger et al. | 364/900 |
| 4,173,754 | 11/1979 | Feiker | 340/310 R |
| 4,185,272 | 1/1980 | Feiker | 340/310 R |
| 4,201,887 | 5/1980 | Burns | 179/2 DP |
| 4,213,182 | 7/1980 | Eichelberger et al. | 364/493 |
| 4,257,099 | 3/1981 | Appelt | 364/200 |
| 4,263,670 | 4/1981 | Sherman | 375/9 |
| 4,264,960 | 4/1981 | Gurr | 364/492 |
| 4,271,505 | 6/1981 | Menot et al. | 370/85 |
| 4,276,656 | 6/1981 | Petryk, Jr. | 455/608 |
| 4,326,264 | 4/1982 | Cohen | 360/900 |
| 4,367,414 | 1/1983 | Miller et al. | 307/38 |
| 4,385,384 | 5/1983 | Rosbury et al. | 179/2 DP |
| 4,387,271 | 6/1983 | Artom | 179/2 DP |
| 4,387,440 | 6/1983 | Eaton | 375/8 |
| 4,396,844 | 8/1983 | Miller et al. | 307/39 |
| 4,425,665 | 1/1984 | Stauffer | 375/9 |
| 4,430,728 | 2/1984 | Beitel et al. | 179/2 DP |
| 4,440,988 | 4/1984 | Heatherington | 179/2 DP |
| 4,455,453 | 6/1984 | Parasekuakos et al. | 179/2 AM |
| 4,455,661 | 6/1984 | Qureshi | 364/200 |
| 4,521,891 | 6/1985 | Biba et al. | 375/8 |
| 4,525,804 | 6/1985 | Mosier et al. | 340/750 |
| 4,700,292 | 10/1987 | Campanini | 364/200 |

FOREIGN PATENT DOCUMENTS 0057511  8/1982  European Pat. Off. .
2128388  4/1984  United Kingdom .

OTHER PUBLICATIONS

Sliger et al., "Remote Data Systems Needs Just One Twisted Pair to Link Analog Sensors with Host Computer", Electronic Design, vol. 27, No. 26, Dec. 6, 1979.

Primary Examiner—Robert L. Griffin
Assistant Examiner—Stephen Chin
Attorney, Agent, or Firm—M. J. Moran

[57] ABSTRACT

A low cost, multipurpose digital IC is used as the basic building block in establishing a network communication system over a desired communication link. The digital IC can function as an addressable microcomputer interface between the network line and a remotely located microcomputer which may, for example, comprise any microprocessor based controlled product. In such mode, the digital IC's function is to take data from the network and pass it on to the remotely located microcomputer upon command from the central controller and to transmit data from the microcomputer to the central controller. The digital IC may also function as a nonaddressable microcomputer interface between the central or master controller and the network line. In such case the digital IC's function is to continuously take data from the central controller and place it on the network and take data from the network and pass it back to the central controller. The digital IC may also function as an addressable load controller associated with an individual remote controlled device and responding to shed or restore load commands from the central controller over the network line. When so used the digital IC may also be commanded to transmit a reply message back to the central controller giving information as to the status of the controlled device, thus enabling the central controller to monitor a large number of remotely located controllable devices.

52 Claims, 57 Drawing Sheets

33 BIT STAND ALONE SLAVE REPLY MESSAGE
(TRANSMITTED BACK TO CENTRAL CONTROLLER)

33 BIT EXPANDED SLAVE RECEIVED MESSAGE

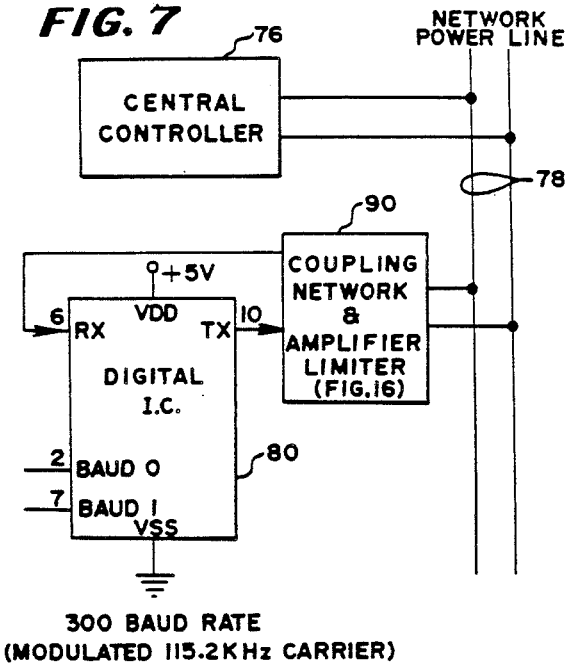
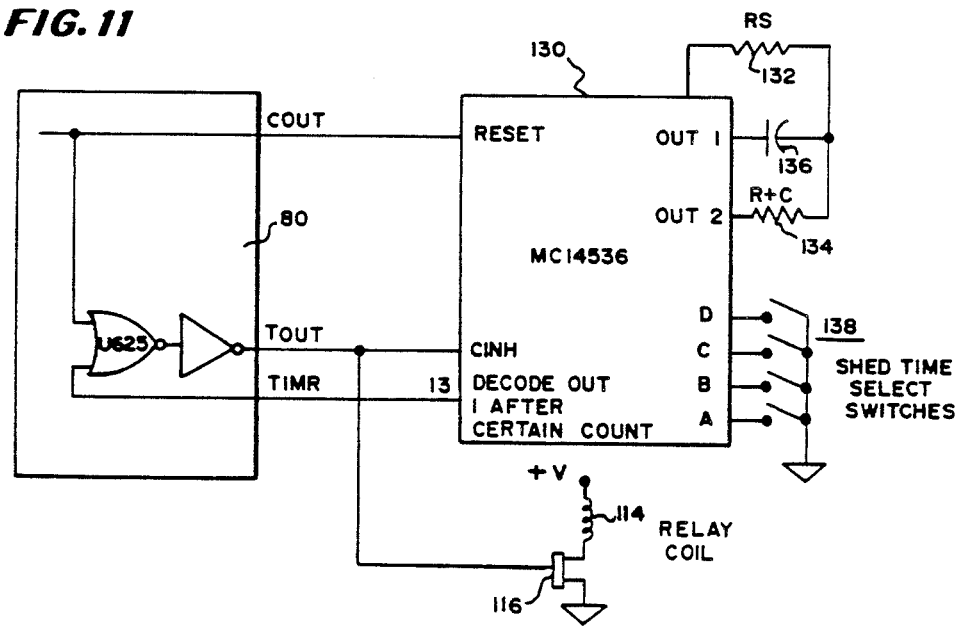

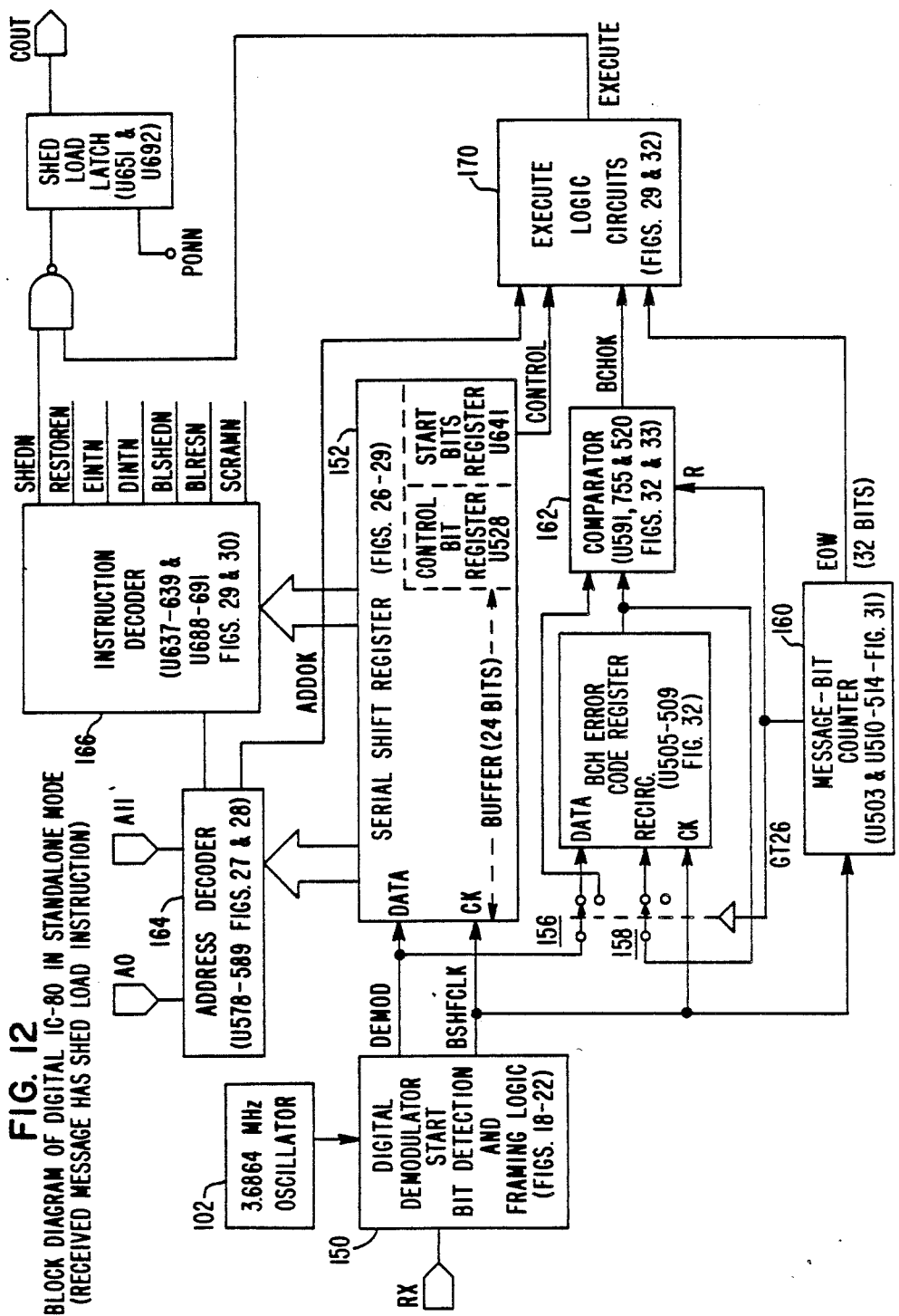
FIG. 12 BLOCK DIAGRAM OF DIGITAL IC-80 IN STANDALONE MODE (RECEIVED MESSAGE HAS SHED LOAD INSTRUCTION)

BLOCK DIAGRAM OF STANDALONE SLAVE
IN TRANSMIT REPLY MESSAGE MODE

BLOCK DIAGRAM OF EXPANDED SLAVE MODE IN
RESPONDING TO ENABLE INTERFACE INSTRUCTION

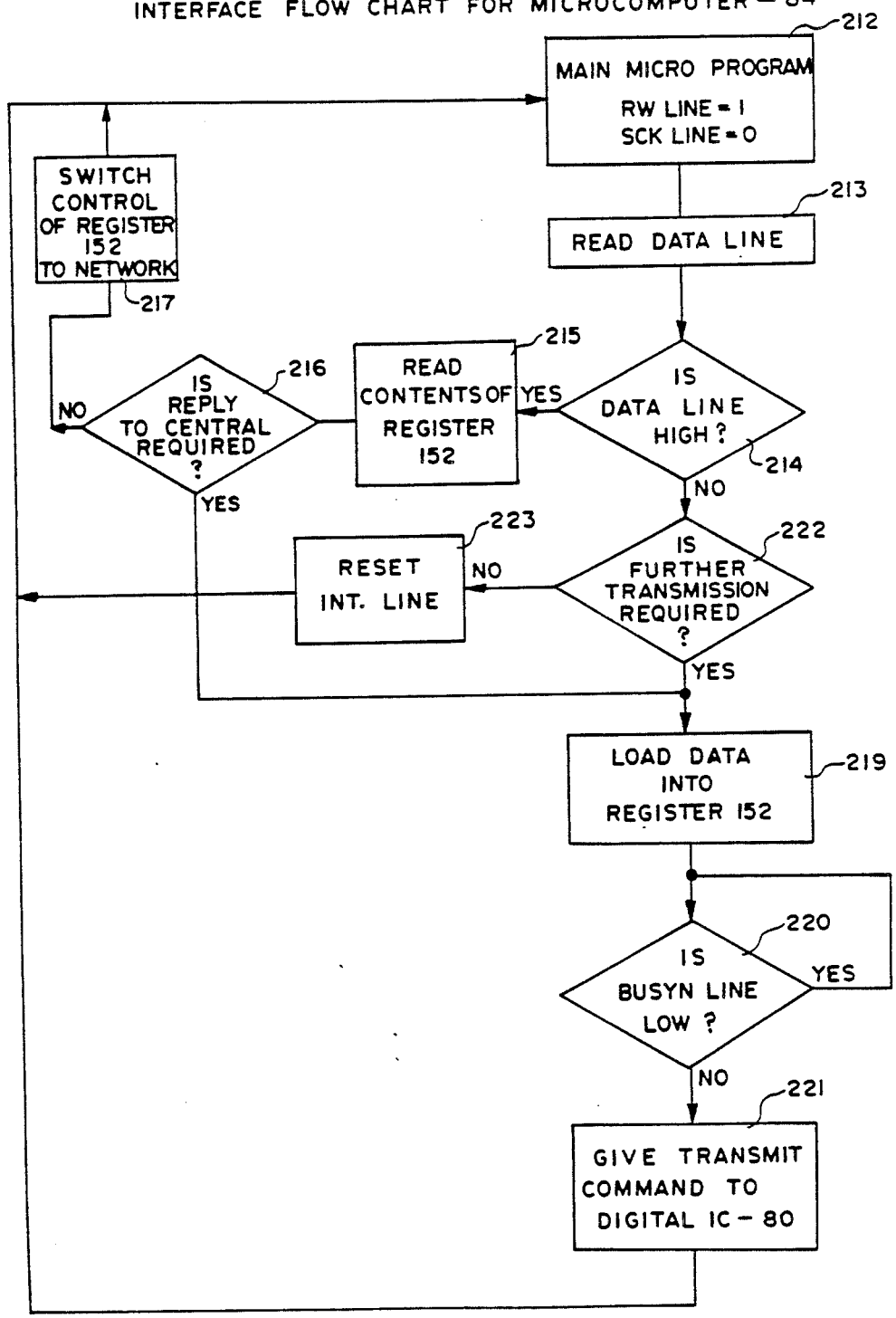
FIG. 15 INTERFACE FLOW CHART FOR MICROCOMPUTER—84

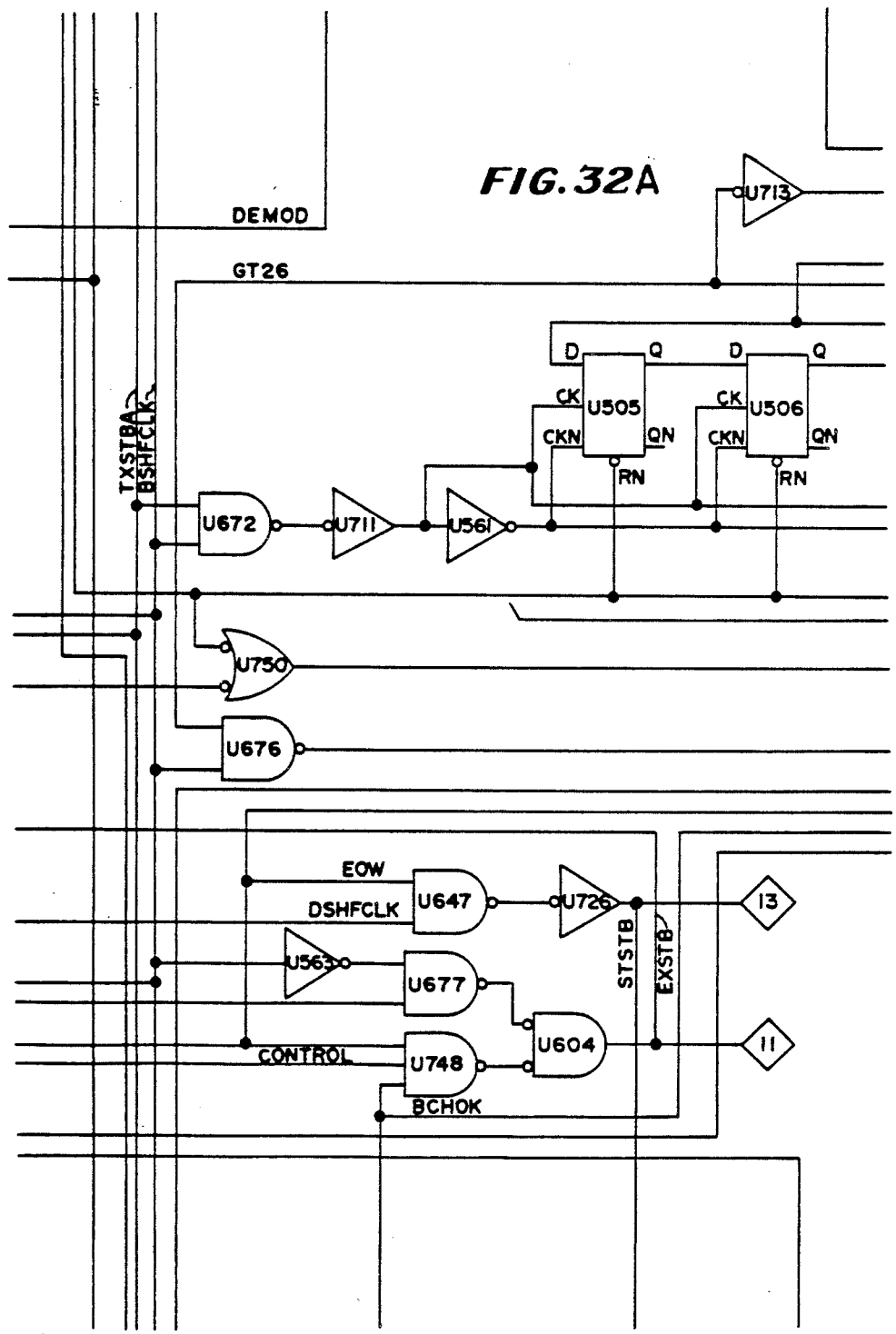

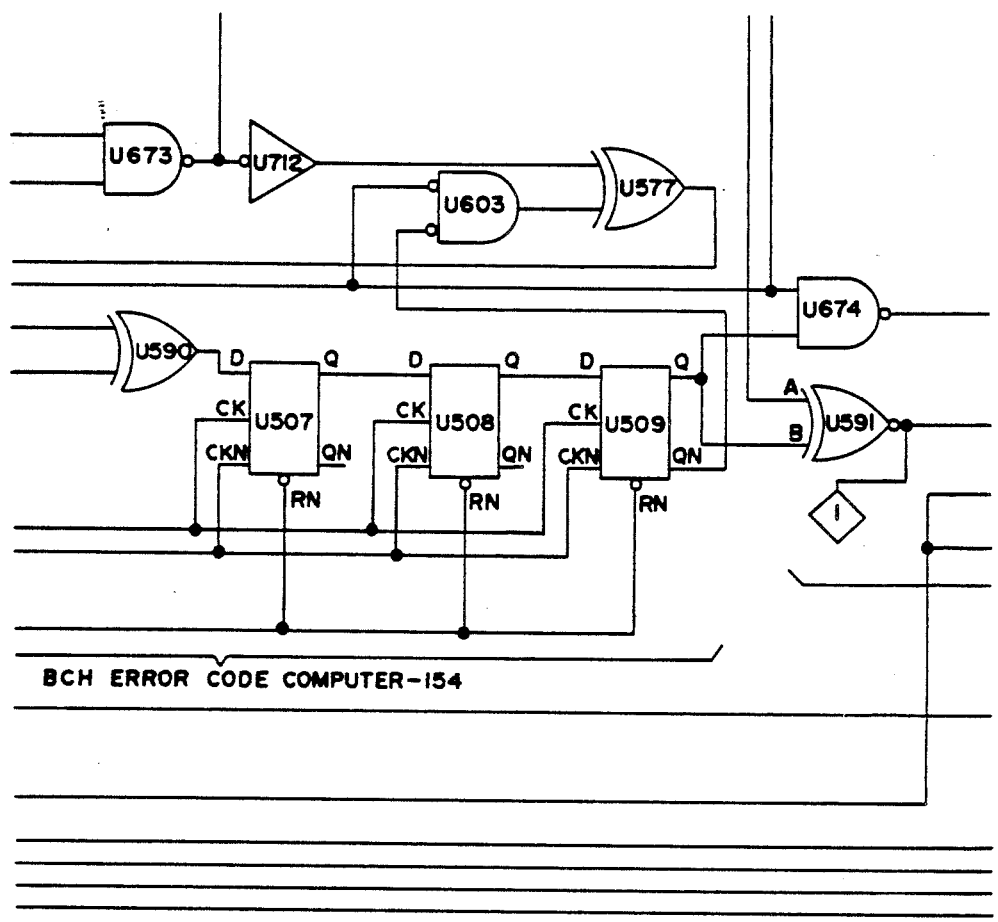
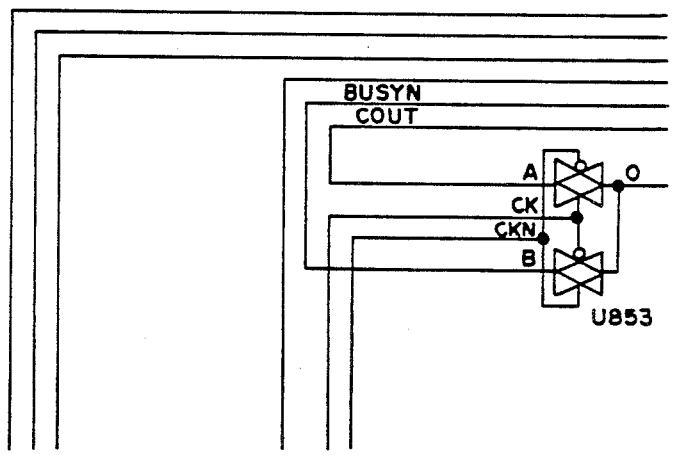
FIG. 32B

FIG. 34

INPUT SAMPLING SCHEME

FIG.39 LOCAL OVERRIDE CIRCUIT

| SYMBOL | PARAMETER | 300 BAUD | 1200 BAUD | 38.4K BAUD | UNITS |
|---|---|---|---|---|---|
| TM | NETWORK MESSAGE LENGTH | 110 | 27.5 | 0.86 | MS |
| TC | END OF MESSAGE TO COUT DELAY | 300 | 70 | 2 | µS |
| TR | REPLY MESSAGE DELAY | 3.33 | 832 | .026 | MS |
| TST | REPLY MESSAGE STATUS STROBE | 53 | 13.3 | .4 | NS |
| TRW | RESET PULSE WIDTH | 50 MIN | 50 MIN | 50 MIN | NS |
| TCR | COUT RESET RESPONSE TIME | 50 | 50 | 50 | NS |

FIG. 43

| SYMBOL | PARAMETER | 300 BAUD | 1200 BAUD | 38.4KBAUD | UNITS |
|---|---|---|---|---|---|
| TBD | RECEIVE MESSAGE TO BUSY DELAY | 3.88 | 0.97 | .03 | MS |
| TIBD | END OF MESSAGE TO INTERRUPT AND BUSY | 300 | 70 | 2 | µS |
| TDM | RECEIVE MESSAGE TO DATA TIME | 250 | 62.5 | 1.9 | µS |
| TIRST | RESET INTERRUPT DELAY | 50 | 50 | 50 | NS |
| TSCK | SCK PULSE WIDTH | 100 MIN | 100 MIN | 100 MIN | NS |
| TSD | SCK TO DATA TIME | 50 | 50 | 50 | NS |
| TWSU | SET UP TIME DATA TO SCK | 50 MIN | 50 MIN | 50 MIN | NS |
| TT | RW TO TRANSMIT MESSAGE TIME | 3.88 | 0.97 | .03 | MS |
| TBT | RW TO BUSY TIME | 3.88 | 0.97 | .03 | MS |

MULTIPURPOSE DIGITAL IC FOR COMMUNICATION AND CONTROL NETWORK

CROSS REFERENCE TO RELATED APPLICATIONS

The invention disclosed herein relates to two-way communication and control systems. The following three commonly assigned U.S. patent applications were all filed in the U.S. Patent and Trademark Office on June 28, 1984 and relate to such communication and control systems: Ser. No. 624,863 filed by William R. Verbanets and Theodore H. York and entitled Improved Digital IC-Microcomputer Interface; Ser. No. 625,862 filed by Leonard C. Vercellotti and William R. Verbanets and entitled Low Error Rate Digital Demodulator; and Ser. No. 625,864 filed by Leonard C. Vercellotti, William R. Verbanets and Theodore H. York entitled Digital Message Format for Two-Way Communication and Control Network.

BACKGROUND OF THE INVENTION

A. Field of the Invention

The present invention relates generally to information communication networks and, more particularly, to communication networks by means of which a large number of remotely positioned controllable devices, such as circuit breakers, motor overload relays, lighting systems, and the like, may be controlled from a central or master controller over a common network line which may comprise either the existing AC power lines, or a dedicated twisted pair line, or in some instances a fiber optic cable.

The invention particularly relates to a low cost, multipurpose digital IC which can be used as the basic building block in establishing a network communication system over a desired communication link. The digital IC can function as an addressable microcomputer interface between the network line and a remotely located microcomputer which may, for example, comprise any microprocessor based controlled product. In such mode, the digital IC's function is to take data from the network and pass it on to the remotely located microcomputer upon command from the central controller and to transmit data from the microcomputer to the central controller. The digital IC may also function as a nonaddressable microcomputer interface between the central or master controller and the network line. In such case the digital IC's function is to continuously take data from the central controller and place it on the network and take data from the network and pass it back to the central controller. The digital IC may also function as an addressable load controller associated with an individual remote controlled device and responding to shed or restore load commands from the central controller over the network line. When so used the digital IC may also be commanded to transmit a reply message back to the central controller giving information as to the status of the controlled device, thus enabling the central controller to monitor a large number of remotely located controllable devices.

B. Description of the Prior Art

Various communication and control systems have been heretofore proposed for controlling a group of remotely located devices from a central controller over a common network line. Control systems for controlling distributed electrical loads are shown, for example, in Miller et al U.S. Pat. Nos. 4,167,786, 4,367,414 and 4,396,844 and in the earlier patents cross referenced therein. In such systems a large number of relatively complex and expensive transceiver-decoder stations, each of which includes a microprocessor, are interconnected with a central controller over a common party line consisting of a dedicated twisted pair for bidirectional communication between the central controller and all transceivers. Each of the transceiver-decoder stations is also of relatively large physical size due to the fact that a substantial amount of hardware is required, in addition to the microprocessor, to receive and transmit signals. Also, both the hardware and microprocessor consume substantial amounts of power. In fact, in Miller et al U.S. Pat. No. 4,167,786 it is necessary to provide a powersaver mode in which the major portion of the circuitry at each remote station is deenergized to reduce power consumption during intervals when load changes are not being actuated.

Each of the transceiver-decoder stations controls a number of loads which must be individually connected to a particular transceiver by hardwiring, these interconnections being quite lengthy in many instances. In such a system, all transceivers can initiate messages at any arbitrary time in response to control input from the associated switches. Accordingly, it is not uncommon for two or more transceivers to simultaneously sense a free common party line and begin simultaneous transmission. This requires a special bus arbitration scheme to cause all but one of the interfering transceivers to drop out of operation while permitting one selected transceiver to continue its data transmission. Also, in such a system transmission from the transceiver to the central controller is very limited and consists merely of an indication of a manually operable or condition responsive switch or analog sensors such as a thermistor or other analog sensing device. In the load distribution control system shown in the above referenced prior art patents, the arbitration technique is dependent on the impedance levels of the active and inactive states of the data line. If the data line becomes stuck in a low impedance state, due to the failure of one of the connected transceiver decoders, further communication over the network line is prevented until the malfunctioning transceiver is physically disconnected from the data line.

In the communication and control system described in the above identified Miller et al patents a message transmitted over the network includes a preamble portion of a minimum of four bits. These preamble bits comprise 50% square waves which are utilized by the transceiver decoders to permit a phase lock loop circuit in each transceiver to lock onto the received preamble bits. The use of a minimum of four bits to provide phase loop lockon reducing the overall throughput of such a system. Also, in order to capture the preamble bits it is necessary to provide the phase lock loop circuit initially with a relatively wide bandwidth of about 5 KHz and then narrow down the bandwidth after the phase lock loop circuit has locked onto the preamble bits. Such an arrangement requires additional circuitry to accomplish the necessary change in bandwidth. Also, the relatively wide bandwidth necessary to capture the preamble bits also lets in more noise so that the security and reliability of the system is reduced in noisy environments.

SUMMARY OF THE INVENTION

In the presently described communication network a small low cost digital IC is employed which can be readily adapted by merely grounding different input terminals of the IC to perform all of the different functions necessary to the component parts of the complete communications network. Thus, in one pin configuration of the digital IC it can function as an addressable load controller, responding to shed or restore load commands from the central controller and replying back to the central controller with status information regarding the state of the controlled load. This mode of functioning of the digital IC is referred to as a stand alone slave mode of operation. In the stand alone slave mode the digital IC is arranged to be directly associated with each control device i.e. circuit breaker, motor controller, lighting control, etc. and may, if desired, communicate with the master controller over the same wires which are used to supply power to the controlled device. This substantially reduces the amount of wiring required to connect a number of controlled devices to the common communication network. The central controller may also issue block shed and block restore commands to a group of stand alone slaves to which command they will all simultaneously respond. Also, the central controller may issue a "scram" command to shed load which causes all stand alone slaves (which may number as high as 4,095) to simultaneously shed their respective loads.

In another pin configuration of the digital IC it can function as an addressable microcomputer interface. In this so called expanded slave mode of operation the digital IC provides an interface between the communication network line and a remote microcomputer which may, for example, wish to transmit data over the communications network to the central controller. In the expanded slave mode of the digital IC the micro computer interface is disabled until the central controller enables it by sending an enable interface command addressed to the expanded slave. After the microcomputer interface is enabled the central controller and the remote microcomputer can communicate back and forth through the expanded slave digital IC.

The digital IC may also be pin configured to function as a nonaddressable microcomputer interface, such functioning being referred to as the expanded master mode of functioning of the digital IC. In the expanded master mode the interface with an associated microcomputer is always enabled and any network transmissions that the digital IC receives may be read by the interfaced microcomputer. Also, the interfaced microcomputer may transmit data onto the network at any time through the expanded master type of digital IC. Accordingly, when the digital IC is operated in this mode the interfaced microcomputer may comprise the central controller of the communications network.

The digital IC which may be adapted to perform all of the above described functions, is also arranged so that it can be used with different types of data lines. Thus, in one pin configuration of the digital IC it is adapted to transmit messages to and receive messages from a network line consisting of the conventional AC power line of a factory, office building or home. Because of the significant phase disturbances associated with such power lines, data is transmitted over the network by means of on-off keying of a high frequency carrier. Preferably this high frequency carrier has a frequency of 115.2 kHz and the digital IC is arranged to transmit data at the rate of 300 bits per second (300 baud) over conventional power lines. The choice of a 115.2 kHz carrier is based on empirical results of spectrum analyses of typical power lines and the 300 baud bit rate is based upon desired system performance and acceptable error rates.

In the presently described communication system, the digital IC has a crystal controlled oscillator operating at a frequency many times higher than the carrier frequency. The carrier signal is derived from this crystal oscillator. The crystal oscillator is also used as a source of timing signals within each digital IC to establish predetermined baud rates for the transmission of data over the network. Accordingly, the frequency of the carrier signal employed to transmit messages over the network can be readily changed to avoid an undesired interfering frequency by simply changing the crystals in the crystal oscillator associated with each digital IC. Such a change in carrier frequency will also change the baud rates at which the communication system operates, as described in more detail hereinafter.

The frequency of the crystal oscillator in each digital IC is highly stabilized so that the carrier frequencies developed by the digital IC's at the central controller and remote stations are very close to the same frequency although a received carrier signal may drift in phase relative to the timing signals produced in the digital IC which is receiving a message. As a result, it is not necessary to transmit a number of preamble bits and provide a phase lock loop circuit which locks onto the received message during the preamble bits, as in the above described Miller et al patents. In the presently described communication and control system the individual digital IC's operate asynchronously but at substantially the same frequency so that any drift in phase does not interfere with detection of the received carrier signal, even at relatively low baud rates and noisy environments.

In order to provide further noise immunity when using noisy power lines as the common network data line, the digital IC is arranged to compute a 5 bit BCH error code and transmit it with each message transmitted to the network. Also, each message received from the network by the digital IC includes a five bit BCH error code section and the digital IC computes a BCH error code based on the other digits of the received message and compares it with the BCH error code portion of the received message.

In order to provide still further noise immunity when operating over conventional power lines, the digital IC includes a digital demodulator which has high noise rejection so that it can detect on-off carrier modulation on power lines which have a relatively high noise level. Empirical results show that the digital demodulator portion of the digital IC can receive messages with a bit error rate of less than 1 in 100,000 for power line signal to noise ratios of approximately 6 db at a 300 Hz bandwidth. Also, such digital demodulator can receive error free 33 bit messages at a 90% success rate in a power line noise environment of only 4 db signal to noise ratio.

When it is desired to use a dedicated twisted pair line as the common data line for the communication network, which usually has a lower noise level than power lines, the digital IC is adapted to transmit data to and from such twisted pair line at 4 times the data rate mentioned above i.e. at 1200 bits per second (1200 baud). Such adaptation of the digital IC can be readily accomplished by simply grounding a different one of the input terminals of the digital IC.

The digital IC may also be pin configured to accomplish all of the above described functions in a high speed communication network in which the common data line is a fiber optic cable. In this mode of operation of the digital IC the digital demodulator portion is bypassed and the remaining logic is adapted to receive and transmit data messages at the extremely high rate of 38,400 bits per second (38.4k baud). In such a fiber optic cable communication system the data is transmitted as base band data without modulation on a higher frequency carrier.

The digital IC is arranged to transmit and receive messages over the common network in a specific message format or protocol which permits the establishment of the above described microcomputer interface so that different microcomputers can communicate over the common network while providing maximum security against noise and the improper addressing of individual digital IC's by the master controller. Specifically, the message format consists of a series of 33 bits, the first two bits of which comprise start bits having a logic value of "1". The start bits are followed by a control bit which has a logic value "1" when the succeeding 24 message bits signify the address of the digital IC and instructions to be performed by the digital IC. When the control bit has a logic value of "0" the next 24 message bits contain data intended for the interfaced microcomputer when the digital IC is operated in an expanded mode. The next five message bits contain a BCH error checking code and the last message bit is a stop bit which always has a logic value of "0".

When a 33 bit message is received by the digital IC the first 27 bits thereof are supplied to a BCH code computer portion of the digital IC which computes a 5 bit BCH error code based on the first 27 bits of the received message. The computed BCH code is then compared with the succeeding 5 bit BCH error checking code of the received message, on a bit by bit basis, to ensure that the received message has been received and decoded properly.

In a similar manner when data is to be transmitted onto the network either as a reply message in the stand alone slave mode, or from the interfaced microcomputer to the network through the digital IC, the BCH computer portion of the digital IC computes a 5 bit error checking code based on the data to be transmitted and adds the computed BCH error checking code at the end of the stored data bits as the 33 bit message is being formatted and transmitted out of the digital IC to the communication network. By thus employing BCH error code computer logic in the digital IC for both received and transmitted messages, the assurance of transmitting valid, error free 33 bit messages in both directions on the network is greatly increased.

The digital IC which accomplishes all of these functions is of small size, is readily manufactured at low cost on a mass production basis and consumes very little power. Accordingly, the overall cost of the communication and control system is much less than that of the above described prior art patents while providing all of the additional features discussed above. Of particular importance is the feature of providing a low cost interface to microprocessors associated with controlled devices, such as circuit breakers, motor starters, protective relays and remote load controllers, so that these microprocessors, which are busy with other tasks, can be selectively interrupted and two-way communication established between the central controller and the selected microprocessor at a remote station.

BRIEF DESCRIPTION OF THE DRAWINGS

The invention, both as to its organization and method of operation, together with further objects and advantages thereof, will best be understood by reference to the following specification taken in connection with the accompanying drawings in which:

FIG. 7 is a block diagram illustrating the use of the digital IC with a power line at 300 baud rate;

FIG. 11 is a block diagram showing a modification of the system of FIG. 10 in which variable time out is provided;

FIG. 12 is a block diagram of the digital IC in the stand alone slave mode and illustrates the operation in response to a shed load instruction;

FIG. 15 is a flow chart for the microcomputer associated with the digital IC in the disclosed system;

FIG. 16a is a diagrammatic illustration of the coupling transformer used in the coupling network of FIG. 16;

FIGS. 18A and 18B–FIGS. 33A and 33B, when arranged in the manner shown in FIG. 34, comprise a detailed schematic diagram of the digital IC used in the disclosed communications system;

FIG. 43 is a chart showing the operation times of the waveforms in FIG. 42 at different baud rates.

GENERAL DESCRIPTION OF COMMUNICATION SYSTEM

Figure 1A:
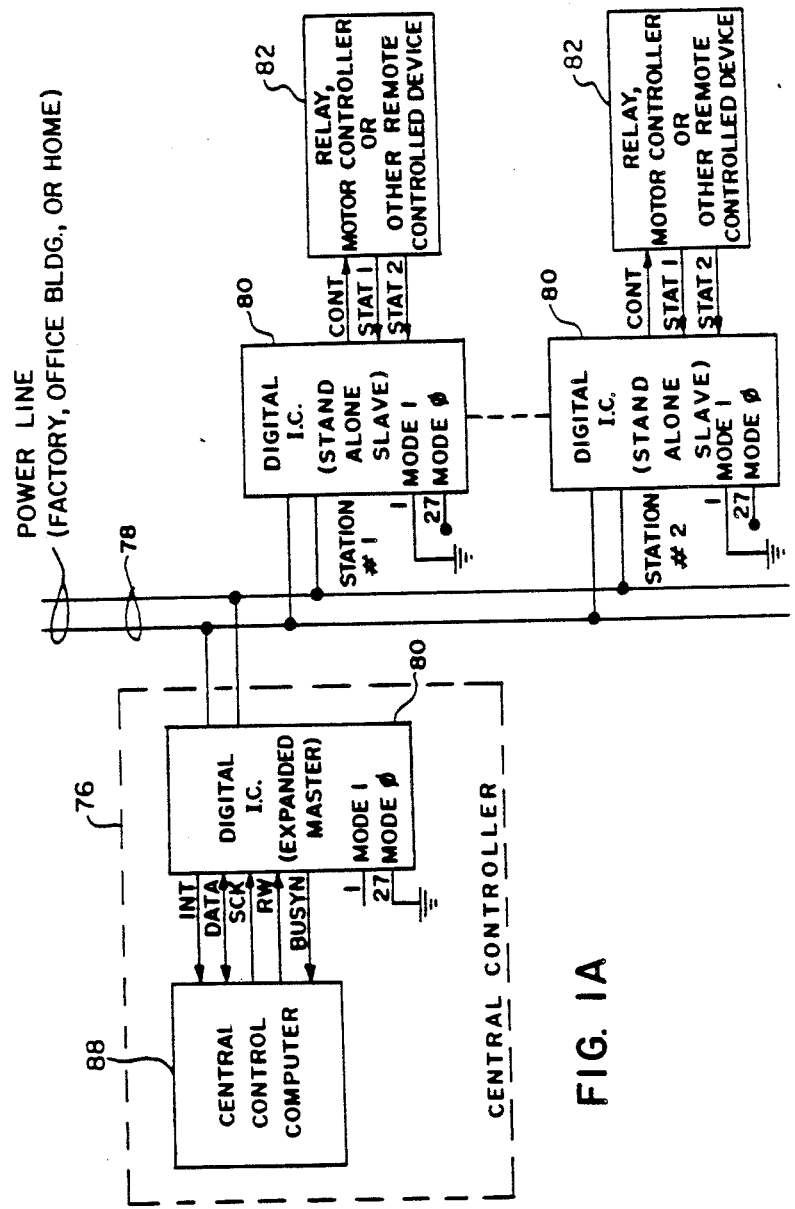
FIGS. 1A and 1B are an overall block diagrams of the described communication system.
Figure 1B:
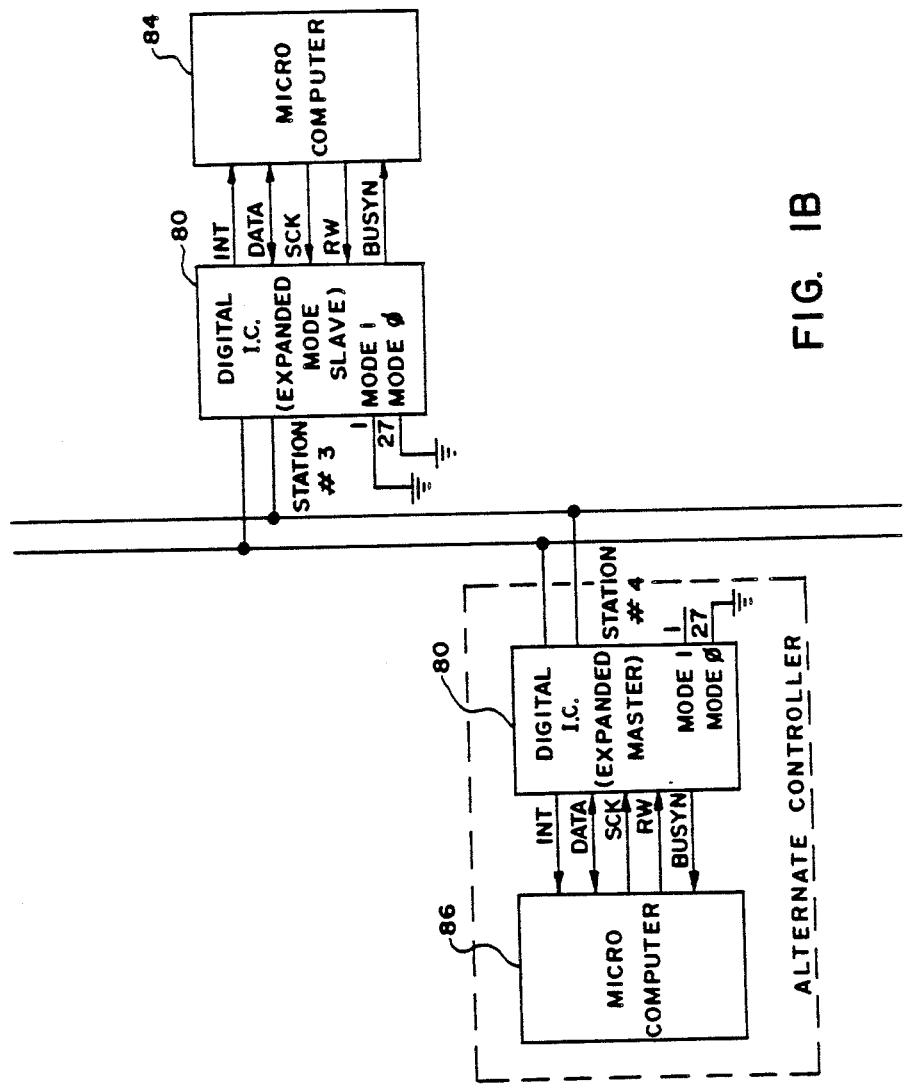

Referring now to FIG. 1, there is shown a general block diagram of the communication network wherein a central controller indicated generally at 76 can transmit messages to and receive messages from a large number of remote stations over a conventional power line indicated generally at 78. The basic building block of the communication network is a small, low cost digital IC, indicated generally at 80, which is arranged to be connected to the power line 78 so that it can receive messages from the central controller at 76 and transmit messages to the central controller over this line.

The digital IC 80 is extremely versatile and can be readily adapted to different modes of operation by simply establishing different connections to two of the external pins of this device. More particularly, as shown at remote stations #1 and #2 in FIG. 1, the digital IC 80 may be pin configured to operate in a stand alone slave mode in which it is arranged to control an associated relay, motor controller or other remote control device, indicated generally at 82, by sending a control output signal (COUT), to the controlled device 82. In the stand alone slave mode, the digital IC 80 can also respond to an appropriate command from the central controller 76 by transmitting a message back to the controller 76 over the power line 78 in which the status of 2 terminals associated with the controlled device 82, identified as STAT 1 and STAT 2, are given. Each of the digital IC's 80 is provided with a 12 bit address field so that as many as 4,095 of the devices 80 may be individually associated with different relays, motor controllers, load management terminals, or other controlled devices at locations remote from the central controller 76 and can respond to shed load or restore load commands transmitted over the power line 78 by appropriately changing the potential on its COUT line to the controlled device 82.

The digital IC 80 is also arranged so that it can be pin configured to operate in an expanded slave mode as shown at station #3 in FIG. 1. In the expanded slave mode the digital IC is arranged to respond to a particular command from the central controller 76 by establishing an interface with an associated microcomputer indicated generally at 84. More particularly, the expanded slave device 80 responds to an enable interface instruction in a message received from the central controller 76 by producing an interrupt signal on the INT line to the microcomputer 84 and permitting the microcomputer 84 to read serial data out of a buffer shift register in the digital IC 80 over the bi-directional DATA line in response to serial clock pulses transmitted over the SCK line from the microcomputer 84 to the digital IC 80. The digital I 80 is also capable of responding to a signal on the read write line (RW) from the microcomputer 84 by loading serial data into the buffer shift register in the device 80 from the DATA line in coordination with serial clock pulses supplied over the SCK line from the microcomputer 84. The digital IC 80 is then arranged to respond to a change in potential on the RW line by the microcomputer 84 by incorporating the data supplied to it from the microcomputer 84 in a 33 bit message which is formatted to include all of the protocol of a standard message transmitted by the central controller 76. This 33 bit message in the correct format is then transmitted by the IC 80 over the power line 78 to the central controller. As a result, the expanded slave device 80 enables bi-directional communication and transfer of data between the central controller 76 and the microcomputer 84 over the power line 78 in response to a specific enable interface instruction initially transmitted to the expanded slave device 80 from the central controller 76. Once the interface has been established between the devices 80 and 84 this interface remains in effect until the digital IC receives a message transmitted from the central controller 76 which includes a disable interface instruction or the expanded slave device 80 receives a message from the central controller which includes a command addressed to a different remote station. In either case the interface between the network and the microcomputer 84 is then disabled until another message is transmitted from the central controller to the expanded slave device 80 which includes an enable interface instruction. The expanded slave device 80 also sends a busy signal over the BUSYN line to the microcomputer 84 whenever the device 80 is receiving a message from the network 78 or transmitting a message to the network 78. The BUSYN signal tells the microcomputer 84 that a message is being placed on the network 78 by the central controller 76 even though control of the buffer shift register in the expanded slave device 80 has been shifted to the microcomputer 84.

The digital IC 80 may also be pin configured to operate in an expanded master mode as indicated at station #4 in FIG. 1. In the expanded master mode the device 80 is permanently interfaced with a microcomputer 86 so that the microcomputer 86 can operate as an alternate controller and can send shed and restore load messages to any of the stand alone slaves 80 of the communication network. The microcomputer 86 can also establish communication over the power line 78 with the microcomputer 84 through the expanded slave IC device 80 at station #3. To establish such two way communication, the microcomputer 86 merely transmits data to the expanded master device 80 over the bidirectional DATA line which data includes the address of the expanded slave device 80 at station #3 and an enable interface instruction. The expanded master 80 includes this data in a 33 bit message formatted in accordance with the protocol required by the communication network and transmits this message over the power line 78 to the expanded slave 80 at station #3. The expanded slave 80 at this station responds to the enable interface instruction by establishing the above described interface with the microcomputer 84 after which the bidirectional exchange of data between the microcomputers 84 and 86 is made possible in the manner described in detail heretofore.

A digital IC 80 which is pin configured to operate in the expanded master mode may also be used as an interface between a central control computer 88, which may comprise any microcomputer or main frame computer, which is employed to control the remote stations connected to the central controller 76 over the power line 78. Since each of the digital IC's 80 puts out a BUSYN signal to the associated computer when it is either receiving or transmitting a message the present communication and control system permits the use of multiple masters on the same network. Thus, considering the central controller 76 and the alternate controller at station #4 which is operating in the expanded master mode, each of these masters will know when the other is transmitting a message by monitoring his BUSYN line.

It will thus be seen that the digital IC 80 is an extremely versatile device which can be used as either an addressable load controller with status reply capability in the stand alone slave mode or can be used as either an addressable or non addressable interface between the network and a microcomputer so as to enable the bidirectional transmission of data between any two microcomputer control units such as the central controller 76 and the remote stations #3 and #4.

Network Communications Format

All communications on the network 78 are asynchronous in nature. The 33 bit message which the digital IC 80 is arranged to either transmit to the network 78 or receive from the networks 78 is specifically designed to provide maximum security and protection against high noise levels on the power line 78 while at the same time making possible the establishment of interfaces between different microcomputers as described heretofore in connection with FIG. 1. The 33 bit message has the format shown in FIG. 2 wherein the 33 bits B0-B32 are shown in the manner in which they are stored in the shift register in the digital IC 80 i.e. reading from right to left with the least significant bit on the extreme right. Each 33 bit message begins with 2 start bits B0 and B1 and ends with 1 stop bit B32. The start bits are defined as logic ones "1" and the stop bit is defined as a logic "0". In the disclosed communication and control system a logic 1 is defined as carrier present and a logic 0 is defined as the absence of carrier for any of the modulated carrier baud rates.

The next bit B2 in the 33 bit message is a control bit which defines the meaning of the succeeding message bits B3 through B26, which are referred to as buffer bits. A logic "1" control bit means that the buffer bits contain an address and an instruction for the digital IC 80 when it is configured to operate in either a stand alone slave mode or an expanded slave mode. A logic "0" control bit B2 means that the buffer bits B3 through B26 contain data intended for an interfaced microcomputer such as the microcomputer 84 in FIG. 1.

Figures 2, 3:
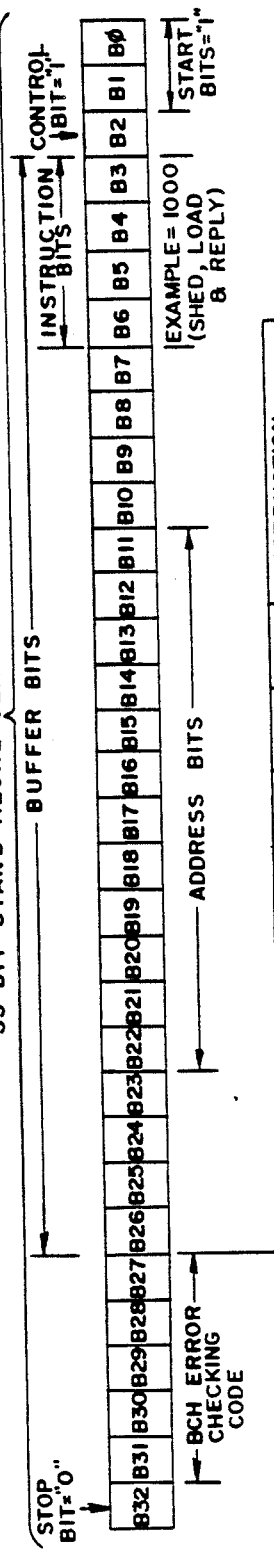
FIG. 2 is a diagram of the message bit format employed in the system of FIG. 1 for a message transmitted from the central controller to a remote station.
FIG. 3 shows the coding of the instruction bits in the message of FIG. 2.
Figures 4, 5:
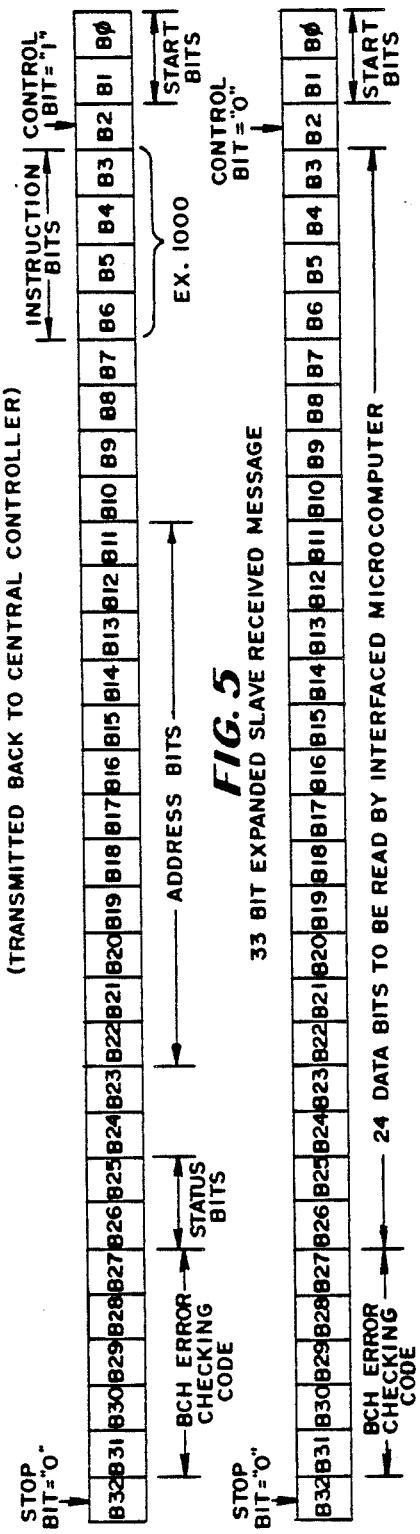
FIG. 4 is a message bit format for a reply message transmitted back to the central controller from a remote station.
FIG. 5 is a message bit format of a message transmitted from the central controller to an interfaced microcomputer.

The next four bits B3-B6 after the control bit 2 are instruction bits if and only if the preceding control bit is a "1". The instruction bits B3-B6 can be decoded to give a number of different instructions to the digital IC 80 when operated in a slave mode, either a stand alone slave mode or an expanded slave mode. The relationship between the instruction bits B3-B6 and the corresponding instruction is shown in FIG. 3. Referring to this figure, when instructions bits B3, B4 and B5 are all "0" a shed load instruction is indicated in which the digital IC 80 resets its COUT pin, i.e. goes to logic zero in the conventional sense so that the controlled device 82 is turned off. An X in bit position B6 means that the shed load instruction will be executed independently of the value of the B6 bit. However, if B6 is a "1" the digital IC 80 will reply back to the central controller 76 with information regarding the status of the lines STAT 1 and STAT 2 which it receives from the controlled device 82. The format of the reply message is shown in FIG. 4, as will be described in more detail hereinafter.

When instruction bits B3-B5 are 100 a restore load instruction is decoded in response to which the digital IC 80 sets its COUT pin and provides a logic one on the COUT line to the controlled device 82. Here again, a "1" in the B6 bit instructs the device 80 to reply back with status information from the controlled device 82 to indicate that the command has been carried out.

When the instruction bits B3-B5 are 110 an enable interface instruction is decoded which instructs an expanded slave device, such as the device 80 at station #3, to establish an interface with an associated microcomputer such as the microcomputer 84. The digital IC 80 responds to the enable interface instruction by producing an interrupt signal on the INT line after it has received a message from the central controller 76 which contains the enable interface instruction. Further operation of the digital IC 80 in establishing this interface will be described in more detail hereinafter. In a similar manner, the instruction 010 instructs the digital IC 80 to disable the interface to the microcomputer 84 so that this microcomputer cannot thereafter communicate over the network 78 until the digital IC 80 again receives an enable interface instruction from the central controller 76. In the disable interface instruction a "1" in the B6 bit position indicates that the expanded slave device 80 should transmit a reply back to the central controller 76 which will confirm to the central controller that the micro interface has been disabled by the remote device 80. The B6 bit for an enable interface instruction is always zero so that the digital IC 80 will not transmit back to the central controller data intended for the microcomputer 84.

If bits B3-B5 are 001 a block shed instruction is decoded. The block shed instruction is intended for stand alone slaves and when it is received the stand alone slave ignores the four LSB's of its address and executes a shed load operation. Accordingly, the block shed instruction permits the central controller to simultaneously control 16 stand alone slaves with a single transmitted message so that these slaves simultaneously disable their associated controlled devices. In a similar manner if the instruction bits B3-B5 are 101 block restore instruction is decoded which is simultaneously interpreted by 16 stand alone slaves to restore a load to their respective controlled devices. It will be noted that in the block shed and block restore instructions the B6 bit must be "0" in order for the instruction to be executed. This is to prevent all 16 of the instructed stand alone slaves to attempt to reply at the same time.

If the B3-B5 bits are 011 a scram instruction is decoded. In response to the scram instruction all stand alone slaves connected to the network 78 disregard their entire address and execute a shed load operation. Accordingly, by transmitting a scram instruction, the central controller 76 can simultaneously control all 4,096 stand alone slaves to shed their loads in the event of an emergency. It will be noted that the scram instruction can only be executed when the B6 bit is a "0".

If the B3-B5 bits are all "1" a status instruction is decoded in which the addressed stand alone slave takes no action with respect to its controlled device but merely transmits back to the central controller 76 status information regarding the associated controlled device 82.

Returning to the message bit format shown in FIG. 2, when the received message is intended for a stand alone slave, i.e. the control bit is "1", bits B10-B21 constitute address bits of the address assigned to the stand alone slave. In this mode bits B7-B9 and bits B22-B26 are not used. However, when an enable interface instruction is given in the expanded mode, bits B7-B9 and B22-B26 may contain data intended for the associated microcomputer 84 as will be described in more detail hereinafter.

Bits B27-B31 of the received message contain a five bit BCH error checking code. This BCH code is developed from the first 27 bits of the 33 bit received message as these first 27 bits are stored in its serial shift register. The stand alone slave device 80 then compares its computed BCH error code with the error code contained in bits B27-B31 of the received message. If any bits of the BCH error code developed within the device 80 do not agree with the corresponding bits in the error code contained in bits B27-B31 of the received message an error in transmission is indicated and the device 80 ignores the message.

FIG. 4 shows the message format of the 33 bit message which is transmitted by the stand alone slave 80 back to the central controller in response to a reply request in the received message i.e. a "1" in the B6 bit position. The stand alone slave reply message has the identical format of the received message shown in FIG. 2 except that bits B25 and B26 correspond to the status indication on STAT 1 and STAT 2 lines received from the control device 82. However, since B25 and B26 were not used in the received message whereas they are employed to transmit information in the reply message, the old BCH error checking code of the received message cannot be used in transmitting a reply back to the central controller. The stand alone slave device 80 recomputes a five bit BCH error code based on the first 27 bits of the reply message shown in FIG. 4 as these bits are being shipped out to the network 78. At the end of the 27th bit of the reply message the new BCH error code, which has been computed in the device 80 based on the condition of the status bits B25 and B26, is then added on to the transmitted message after which a stop bit of 0 is added to complete the reply message back to the central controller.

FIG. 5 shows the format of a second message transmitted to a digital IC 80 operating in an expanded mode, it being assuming that the first message included an enable interface as discussed previously. In the format of FIG. 5 the control bit is "0" which informs all of the devices 80 on the power line 78 that the message does not contain address and instruction. The next 24 bits after the control bit comprise data to be read out of the buffer shift register in the device 80 by the associated microcomputer 84.

General Description of the Device 80

Figure 6:
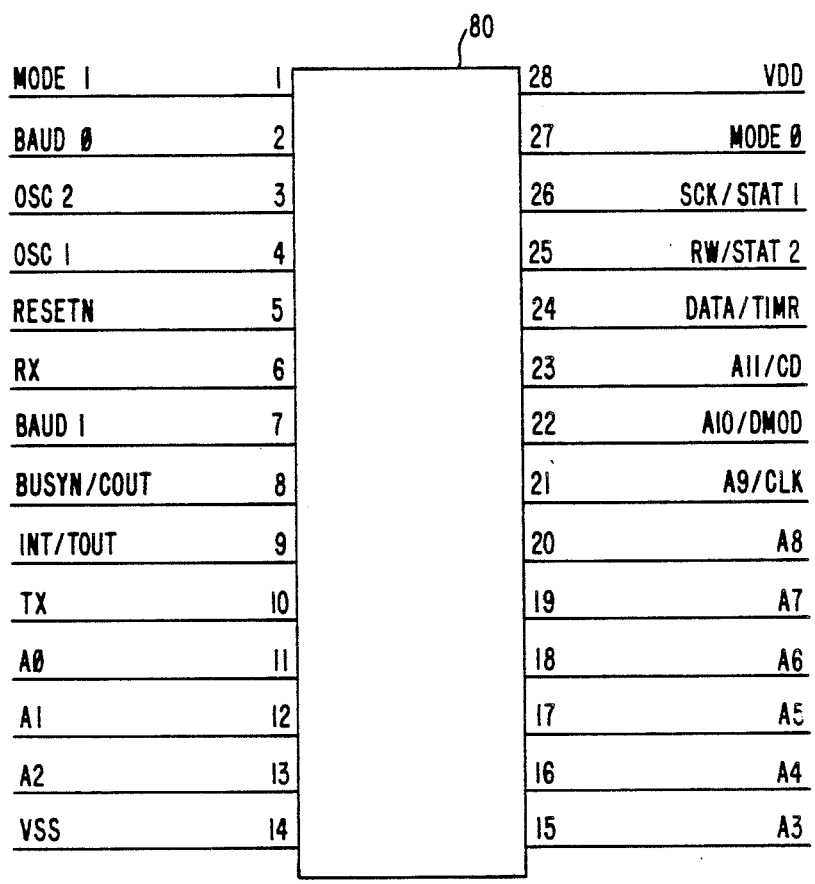
FIG. 6 is a diagram of the pin configuration of the digital IC used in the disclosed system.

In the illustrated embodiment the digital IC 80 is housed in a 28 pin dual in line package. Preferably it is constructed from a five micron silicon gate CMOS gate array. A detailed signal and pin assignment of the device 80 is shown in FIG. 6. It should be noted that some pins have a dual function. For example, a pin may have one function in the stand alone slave configuration and another function in an expanded mode configuration. The following is a brief description of the terminology assigned to each of the pins of the device 80 in FIG. 6.

TX—the transmit output of the device 80. Transmits a 33 bit message through a suitable coupling network to the common data line 78.

RX—the receive input of the device 80. All 33 bit network transmissions enter the device through this pin.

RESTN—the active low power on reset input. Resets the internal registers in the device 80.

$V_{dd}$—the power supply input of +5 volts.

$V_{ss}$—the ground reference.

XTAL1 and XTAL2—the crystal inputs. A 3.6864 mHz±0.015% crystal oscillator is required.

Baud 0 and Baud 1—the baud rate select inputs.

A0-A8—the least significant address bit pins.

A9/CLK—dual function pin. In all but the test modes this pin is the A9 address input pin. In the test mode this pin is the clock strobe output of the digital demodulator in the device 80.

A10/DEMOD—a dual function pin. In all but the test mode this pin is the A10 address input pin. In the test mode this pin is the demodulated output (DEMOD) of the digital demodulator in the device 80.

A11/CD—a dual function pin. In all put the test mode this pin is the A11 address input pin. In the test mode this pin is the receive word detect output (CD) of the digital demodulator in the device 80.

BUSYN/COUT—a dual function output pin. In the expanded slave or expanded master modes this pin is the BUSYN output of the micro interface. In the stand alone slave mode this pin is the switch control output (COUT).

INT/TOUT—a dual function output pin. In the expanded master or expanded slave modes this pin is the interrupt output (INT) of the micro interface. In the stand alone slave mode this pin is a timer control pin (TOUT).

SCK/STAT—a dual function input pin. In the expanded master and expanded slave modes this pin is the serial clock (SCK) of the micro interface. In the stand alone slave mode it is one of the two status inputs (STAT1).

RW/STAT2—a dual function input pin. In the expanded master or expanded slave mode this pin is the read-write control line of the micro interface (RW). In the stand alone slave it is one of the two status inputs (STAT2).

DATA/TIMR—a dual function pin. In the expanded master or expanded slave modes this pin is the bidirectional data pin (DATA) of the micro interface. In the stand alone slave mode this pin is a timer control line (TIMR).

All input pins of the device 80 are pulled up to the ±5 five volt supply $V_{dd}$ by internal 10k pull-up resistors. Preferably these internal pull-up resistors are provided by suitably biased transistors within the device 80, as will be readily understood by those skilled in the art.

As discussed generally heretofore the digital IC 80 is capable of operation in several different operating modes by simply changing external connections to the device. The pins which control the modes of operation of the device 80 are pins 1 and 27, identified as mode 1 and mode 2. The relationship between these pins and the selected mode is as follows:

| MODE 1 | MODE 0 | SELECTED MODE |
| --- | --- | --- |
| 0 | 0 | expanded slave |
| 0 | 1 | stand alone slave |
| 1 | 0 | expanded master |
| 1 | 1 | test |

When only the MODE 1 pin is grounded the MODE 0 pin assumes a logic "1" due to its internal pull up resistor and the digital IC 80 is operated in the stand alone slave mode. In this pin configuration the digital IC 80 acts as a switch control with status feed back. The device 80 contains a 12 bit address, a switch control output (COUT) and two status inputs (STAT1) and (STAT2). The addressed device 80 may be commanded to set or reset the switch control pin COUT, reply with status information from its two status pins, or both. The devices 80 may be addressed in blocks of 16 for one way switch control commands.

When both the MODE 1 and MODE 0 pins are grounded the device 8 is operated in an expanded slave mode. In this pin configuration the device 80 contains a 12 bit address and a microcomputer interface. This interface allows the central controller 76 and a microcomputer 84 tied to the device 80 to communicate with each other. The interface is disabled until the central controller 76 enables it by sending an enable interface command to the addressed digital IC 80. The central controller and microcomputer communicate by loading a serial shift register in the digital device 80. The central controller does this by sending a 33 bit message to the device 80. This causes the microcomputer interface to interrupt the microcomputer 84 allowing it to read the shift register. The microcomputer 84 communicates with the central controller 76 by loading the same shift register and commanding the device 80 to transmit it onto the network.

When only the mode 0 pin is grounded the MODE 1 pin assumes a logic "1" due to its internal pull up resistor and the device 80 is operated in the expanded master mode. In this mode the device 80 operates exactly like the expanded slave mode except that the micro interface is always enabled. Any network transmissions that the digital device 80 receives produce interrupts to the attached microcomputer 84, enabling it to read the serial shift register of the device 80. Also the microcomputer may place data in the shift register and force the device 80 to transmit onto the network at any time.

When both the MODE 1 and MODE 0 pins are ungrounded they assume "logic" values of "1" and the device 80 is configured in a test mode in which some of the external signals in the digital demodulator portion of the device 80 are brought out to pins for test purposes, as will be described in more detail.

As discussed generally heretofore the digital IC 80 is adapted to transmit messages to and receive messages from different types of communication network lines such as a conventional power line, a dedicated twisted pair, or over fiber optic cables. When the digital IC 80 is to work with a conventional AC power line 78, this device is pin configured so that it receives and transmits data at a baud rate of 300 bits per second. Thus, for power line applications the binary bits consist of a carrier of 115.2 kHz which is modulated by on-off keying at a 300 baud bit rate. This bit rate is chosen to minimize bit error rates in the relatively noisy environment of the power line 78. Thus, for power line applications the digital IC 80 is configured as shown in FIG. 7 wherein the baud 0 and baud 1 pins of the device 80 are ungrounded and assume logic values of "1" due to their internal pull up resistors. The RX and TX pins of the device 80 are coupled through a coupling network and amplifier limiter 90 to the power lines 78, this coupling network providing the desired isolation between transmit and received messages so that two way communication between the digital IC 80 and the power line 78 is permitted, as will be described in more detail hereinafter. When the device 80 is pin configured as shown in FIG. 7 it is internally adjusted so that it will receive modulated carrier messages at a 300 baud rate. It is also internally controlled so that it will transmit messages at this same 300 baud rate.

Figure 8:
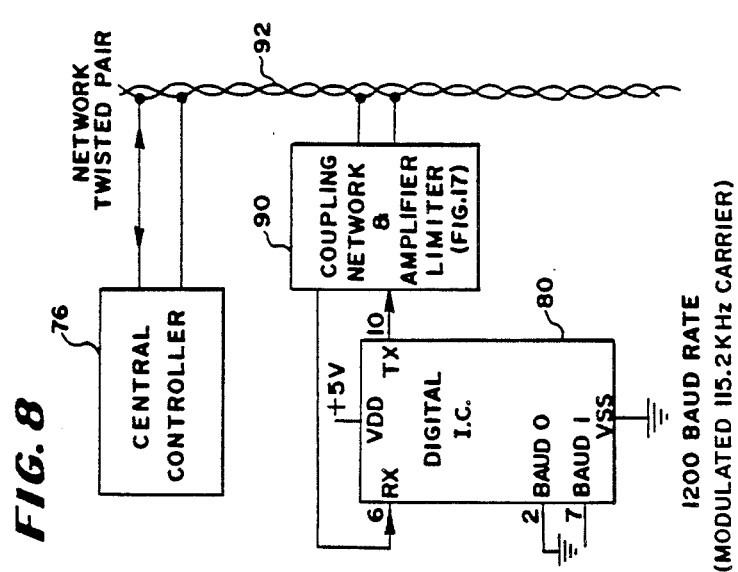
FIG. 8 is a block diagram showing the use of the digital IC with a twisted pair line at 1200 baud rate.

In FIG. 8 the digital IC 80 is illustrated in connection with a communication network in which the common data line is a dedicated twisted pair 92. Under these conditions the baud 0 pin of the device 80 is grounded whereas the baud 1 pin assumes a logic value of "1" due to its internal pull up resistor. When the device 80 is pin configured as shown in FIG. 8 it is arranged to transmit and receive modulated carrier messages at a 1200 baud rate. The 1200 baud bit rate is possible due to the less noisy environment on the twisted pair 92. In the configuration of FIG. 8 the coupling network 90 is also required to couple the device 80 to the twisted pair 92.

Figure 9:
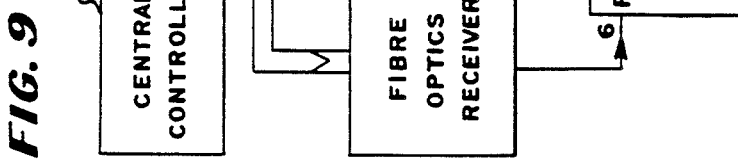
FIG. 9 is a block diagram of the digital IC used with a fiber cable transmission system at 38.4k baud rate.

For high speed data communication the digital IC 80 is also pin configurable to transmit and receive unmodulated data at the relatively high bit rate of 38.4K baud. When so configured the device 80 is particularly suitable for operation in a communications system which employs the fiber optic cables 94 (FIG. 9) as the communication network medium. More particularly, when the device 80 is to function with the fiber optic cables 94 the baud 1 terminal is grounded and the baud 0 terminal assumes a logic value of "1" due to its internal pull up resistor, as shown in FIG. 9. In the fiber optic cable system of FIG. 9 the coupling network 90 is not employed. Instead, the receive pin RX of the device 80 is directly connected to the output of a fiber optic receiver 96 and the transmit pin TX is connected to a fiber optic transmitter 98. A digital IC 80 in the central controller 76 is also interconnected with the fiber optic cables 94 by a suitable transmitter receiver pair 100. The fiber optic receiver 96 and transmitter 98 may comprise any suitable arrangement in which the RX terminal is connected to a suitable photodetector and amplifier arrangement and the TX terminal is connected to a suitable modulated light source, such as a photodiode. For example, the Hewlett Packard HFBR-1501/2502 transmitter-receiver pair may be employed to connect the digital IC 80 to the fiber optic cables 94. Such a transmitter-receiver pair operates at TTL compatible logic levels which are satisfactory for direct application to the RX and TX terminals of the device 80.

Stand Alone Slave Mode

Figure 10:
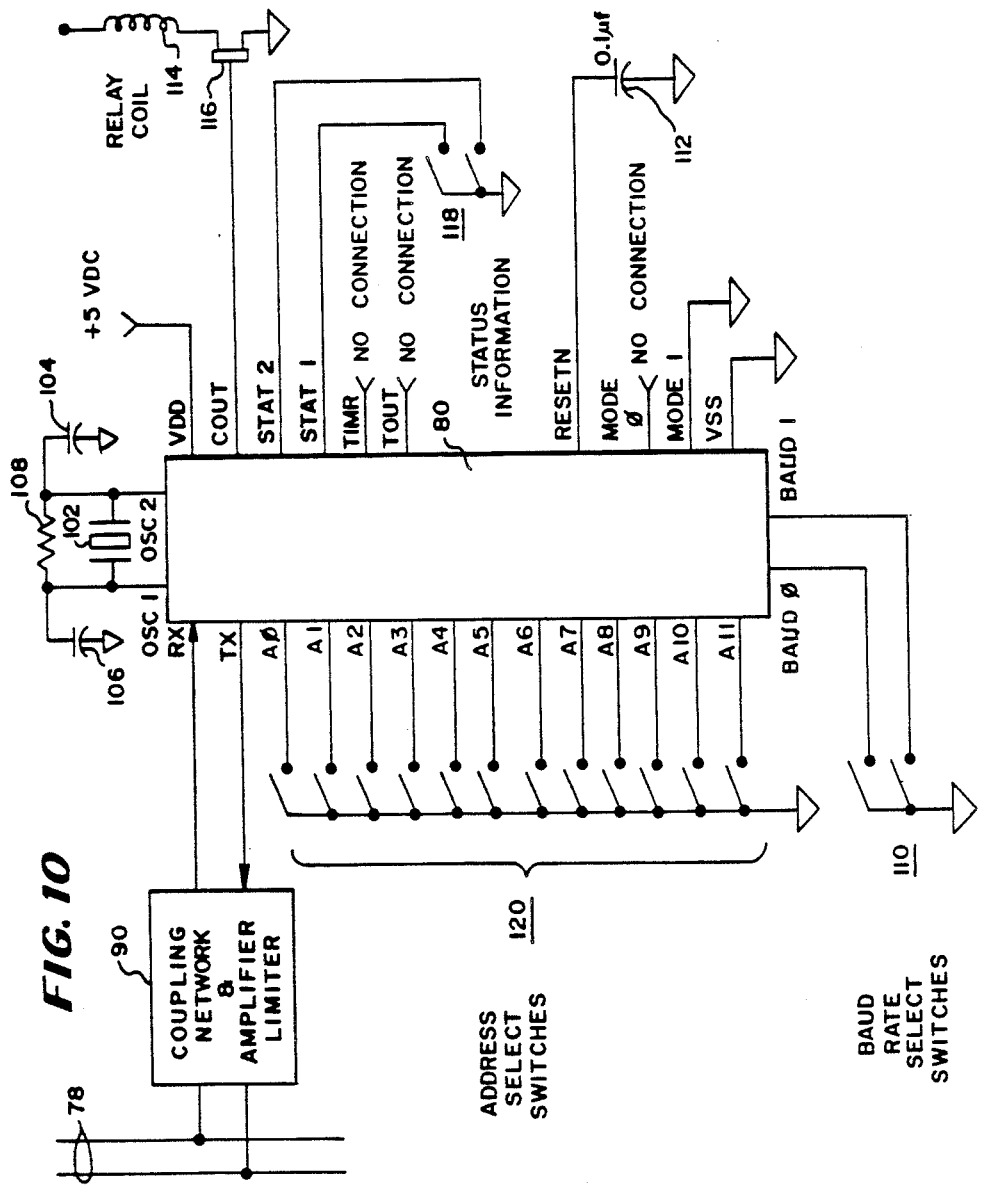
FIG. 10 is a block diagram showing the use of the digital IC in a stand alone slave mode.

In FIG. 10 a typical configuration is shown for the device 80 when operated in the stand alone slave mode. Referring to this figure, plus 5 volts DC is applied to the $V_{dd}$ terminal and the $V_{ss}$ terminal is grounded. A crystal 102 operating at 3.6864±0.015% mHz is connected to the OSC1 and OSC2 pins of the device 80. Each side of the crystal is connected to ground through a capacitor 104 and 106 and a resistor 108 is connected across the crystal 102. Preferably, the capacitors 104, 106 have a value of 33 picofarads and the resistor 108 has a value of 10 megohms. The baud rate at which the device 80 is to operate can be selected by means of the baud rate switches 110. In the embodiment of FIG. 10 these switches are open which means that the device 80 is operating at a baud rate of 300 baud which is suitable for power line network communication. The MODE 1 terminal is grounded and the MODE 0 terminal is not connected so that the device 80 is operating in a stand alone slave mode. A 0.1 microfarad capacitor 112 is connected to the RESETN pin of the device 80. When power is applied to the $V_{dd}$ terminal of the device 80 the capacitor 112 cannot charge immediately and hence provides a reset signal of "0" which is employed to reset various logic circuits in the digital IC 80. Also, a power on reset signal forces the COUT output of the device 80 to a logic "1". As a result, the controlled device, such as the relay coil 114, is energized through the indicated transistor 116 whenever power is applied to the digital IC 80. The condition of the relay 114 is indicated by the status information switches 118 which are opened or closed in accordance with the signal supplied to the controlled relay 114. Two status information switches are provided for the two lines STAT1 and STAT2 even though only a single device is controlled over the COUT control line. Accordingly, one status line can be connected to the COUT line to confirm that the COUT signal was actually developed and the other status line can be connected to auxiliary contacts on the relay 114 to confirm that the load instruction has actually been executed.

A series of twelve address switches 120 may be selectively connected to the address pins A0-A11 so as to provide a digital input signal to the address comparison circuit in the digital IC 80. Any address pin which is ungrounded by the switches 120 assumes a logic "1" value inside the device 80 through the use of internal pull up resistors on each address pin. In this connection it will be understood that the device 80, and the external components associated with it, including the coupling network 90 may all be assembled on a small PC board or card which can be associated directly with the controlled device such as the relay 114. Furthermore, the digital IC 80 and its associated components can be of extremely small size so that it can be actually located in the housing of the device which it controls. Thus, if the device 80 is employed to control a relay for a hot water heater or freezer in a residence, it may be associated directly with such relay and receive messages for controlling the relay over the house wiring of the residence. If the controlled device does not include a five volt source for powering the digital IC 80, the coupling network 90 may provide such power directly from the power line 78, as will be described in more detail hereinafter.

In some situations it is desirable to provide a variably timed shed load feature for particular stand alone slave application. For example, if the digital IC 80 is employed to control a hot water heater or freezer, it may be controlled from a central controller so that the freezer or hot water heater may be turned off (shed load instruction) during peak load periods in accordance with predetermined time schedules. Under these conditions it would be desirable to provide a variably timed facility for restoring power to the controlled freezer or hot water heater in the event that the central controller did not transmit a message instructing the digital IC 80 to restore load. Such a variably timed shed load feature may be provided in a simple manner by employing the arrangement shown in FIG. 11 wherein a variable timer 130 is associated with the digital IC 80. The variable timer 130 may comprise a commercial type MC14536 device which is manufactured by Motorola Inc and others.

In the arrangement of FIG. 11 the COUT line of the digital IC 80 is connected to the reset pin of the variable timer 130 and is also connected to an internal NOR gate U625 of the device 80 whose output is inverted. The TOUT output line of the device 80 is connected to the clock inhibit pin of the timer 130 and the decode output pin of this timer is connected to the TIMR input pin of the device 80. The device 80 in FIG. 11 is also connected in the stand alone slave mode of FIG. 10 in which mode the TOUT and TIMR lines are enabled. In the embodiment of FIG. 11 the controlled relay 114 is connected to the TOUT line rather than to the COUT pin of the device 80. The timer 130 has an internal clock whose frequency can be determined by the external resistors 132 and 134, and the capacitor 136 as will be readily understood by those skilled in the art. In addition, the timer 130 has a number of timer input terminals A, B, C and D to which shed time select switches 138 may be selectively connected to establish a desired variable timer interval.

When power is applied to the digital IC 80 in FIG. 11 a power on reset produces a logic "1" (restore load state) on the COUT pin. This signal is applied to the reset terminal of the timer 130 forcing the timer to reset and its decode output pin low. This decode output pin is connected to the TIMR line of the device 80 which is internally connected to the NOR gate U625. Since the TOUT pin is the logical OR of COUT and the decode output of the timer 130, upon power on reset TOUT is a logic 1 and the relay 114 is in a restore load state. When the COUT line is reset, in response to a shed load instruction to the device 80, the timer 130 is allowed to start counting and the TOUT pin is a logic "0" causing the load to be shed. When the timer 130 counts up to a number determined by the shed time select switches 138 its decode out pin goes high forcing TOUT high i.e. back to the restore load state and inhibiting the timer clock. Accordingly, if the central controller forgets to restore ad to the relay 114 by means of a network message transmitted to the device 80, the timer 130 will restore load automatically after a predetermined time interval.

In FIG. 12 the main component parts of the digital IC 80 are shown in block diagram form when the device 80 is operated in the stand alone slave mode and is arranged to receive a message transmitted over the network 78 which includes a shed load instruction. The incoming message is amplified and limited in the coupling network 90, as will be described in more detail hereinafter, and is applied to the RX terminal (pin 6) of the digital IC 80. It will be understood that the incoming message is a 33 bit message signal having the format described in detail heretofore in connection with FIG. 2. This incoming message is demodulated in a digital demodulator 150 which also includes the start bit detection and framing logic necessary to establish the bit intervals of the incoming asynchronous message transmitted to the device 80 over the network 78. The digital demodulator and its accompanying framing logic will be described in more detail hereinafter in connection with a description of the detailed schematic diagram of the device 80 shown in FIGS. 18 to 33.

The output of the demodulator 150 is supplied to a serial shift register indicated generally at 152. The serial shift register 152 comprises a series of 26 serially connected stages the first 24 of which are identified as a buffer and store bits B3-B26 (FIG. 2) of the received message. The next stage is the control bit register U528 which stores the control bit B2 (FIG. 2) of the received message. The final stage of the serial shift register 152 is a start bits register U641 which stores bits B0 and B1 (FIG. 2) of the received message. In this connection it will be recalled that the two start bits B0 and B1 of each message both have a logic value of "1" and hence constitute a carrier signal which extends over two bit intervals so that both bits may be registered in the single register U641. In this connection it should be noted that all logic components having U numbers refer to the corresponding logic element shown in detail in the overall schematic of the digital IC 80 shown in FIGS. 18 to 33. The serial shift register 152 is loaded from the left by the demodulated output of the demodulator 150 which is applied to the data input of the register 152, this data being clocked into the register 150 by means of buffer shift clock pulses (BSHFCLK) developed by the demodulator 150 at the end of each bit interval in a manner described in more detail hereinafter. Accordingly, the incoming message is shifted through the register 152 until the start bits register U641 is set by the two start bits B0 and B1 to a logic "1" value. In this connection it will be noted that the bits of the incoming message are stored in the buffer portion of the register 152 in the manner shown in FIG. 2 with the least significant bit B3 stored in the register next to the control bit register U528.

As the demodulated data bits are thus being loaded into serial shift register 152 they are also simultaneously supplied to a BCH error code computer indicated generally at 154. More particularly, the DEMOD output of the demodulator 150 is supplied through a switch 156 to the input of the BCH error code computer 154 and the output of this computer is connected to a recirculating input through the switch 158. The BCH error code computer 154 comprises a series of 5 serially connected shift register stages and when the switches 156 and 158 are in the position shown in FIG. 12 the computer 154 computes a 5 bit error code based on the first 27 message bits which it receives from the demodulator 150 as these bits are being stored in the serial shift register 152.

The clock pulses on the BSHFCLK line, which are used to advance the serial shift register 152, are also supplied to a message bit counter 160. The counter 160 is a six stage counter which develops an output on its end-of-word (EOW) output line when it counts up to 32. In this connection it will be noted that by using two logic "1" start bits which are counted as one, the total message length may be counted by digital logic while providing increased noise immunity by virtue of the longer start bit interval.

The message bit counter 160 also sets a latch at the end of the 26th message bit and developes an enabling signal on its GT26 (greater than 26) output line. The GT26 signal controls the switches 156 and 158 so that after the 26th message bit the DEMOD output of the demodulator 150 is supplied to a BCH comparator 162 to which comparator the output of the BCH error code computer 154 is also supplied. At the same time the switch 158 is opened by the GT 26 signal so that the BCH error code computed in the computer 154 remains fixed at a value corresponding to the first 26 bits of the received message. Since the demodulator 150 continues to supply BSHFCLK pulses to the computer 154, the BCH error code developed in the computer 154 is then shifted out and compared bit by bit with the next 5 bits of the received message i.e. B27-B31 (FIG. 2) which constitute the BCH error code portion of the incoming received message and are supplied to the other input of the BCH error code comparator 162. If all five bits of the BCH error code computed in the computer 154 correspond with the five bits of the BCH error code contained in bits B27-B31 of the received message the comparator 162 develops an output on its BCHOK output line.

The digital IC 80 also includes an address decoder indicated generally at 164 which comprises a series of 12 exclusive OR gates and associated logic. It will be recalled from the previous description of FIG. 2 that bits B11-B22 of a received message contain an address corresponding to the particular stand alone slave with which the central controller wishes to communicate. Also, it will be recalled from the preceding description of FIG. 10 that the address select switches 120 are connected to the address pins A0-A11 of the digital IC 80 in accordance with the address assigned to each particular stand alone slave. The address decoder 164 compares the setting of the address select switches 120 with the address stored in bits B11-B22 of the buffer portion of the serial shift register 152. If the two addresses coincide the decoder 164 develops an output on its address OK (ADDOK) output line.

The digital IC 80 also includes an instruction decoder 166 which decodes the outputs of the buffer stages corresponding to bits B3-B6 (FIG. 2) which contain the instruction which the addressed stand alone slave is to execute. Assuming that bits B3-B5 all have a logic value of "0", a shed load instruction is decoded, as shown in FIG. 3, and the instruction decoder 166 produces an output on its shed load line (SHEDN).

As discussed generally heretofore, the control bit B2 of a message intended for a stand alone slave always has a logic value of "1" indicating that bits B3-B26 of this message include address bits and instruction bits which are to be compared and decoded in the decoders 164, 166 of the digital IC 80. When the control bit register U528 in the serial shift register 152 is set an enabling signal is supplied over the CONTROL output line of the register U528 to the execute logic circuits 170. The BCHOK output line of the comparator 162, the EOW output line of the message bit counter 160 and the ADDOK output line of the address decoder 164 are also supplied to the execute logic circuits 170. Accordingly, when the message bit counter 160 indicates that the end of the message has been reached, the comparator 162 indicates that all bits of the received BCH error code agreed with the error code computed by the computer 154, the address decoder 164 indicates that the message is intended for this particular stand alone slave, and the control bit register U528 is set, the logic circuits 170 develop an output signal on the EXECUTE line which is ended with the SHEDN output of the instruction decoder in the NAND gate U649 the output of which is employed to reset a shed load latch U651 and U692 so that the COUT output pin of the digital IC 80 goes to a logic value of "0" and power is removed from the controlled device 82 (FIG. 1). The stand alone slave thus executes the instruction contained in the received message to shed the load of the controlled device 82. As discussed generally heretofore when power is applied to the digital IC 80 the shed load latch is initially reset by the signal appearing on the PONN line so that the COUT line goes high when +5 v. power is applied to the device 80.

When the message bit B6 (FIG. 3) has a logic value of "1" the stand alone slave not only executes a shed load instruction in the manner described in connection with FIG. 12 but also is arranged to transmit a reply message back to the central controller as shown in FIG. 4. In this reply, message bits B25 and B26 contain the two status inputs STAT1 and STAT2 which appear on pins 26 and 25, respectively, of the digital IC 80. Considered very generally, this reply message is developed by shifting out the data which has been stored in the serial shift register 152 and employing this data to on-off key a 115.2 kHz carrier which is then supplied to the TX output pin of the device 80. However, in accordance with an important aspect of the disclosed system, the status signals appearing on the STAT 1 and STAT 2 input pins of the device 80, which represent the condition of the controlled relay, are not employed to set the status bits B25 and B26 of the reply message until after 15 bits have been read out of the serial shift register 152. This gives considerable time for the relay contacts to settle down before their status is added to the reply message being transmitted back to the central controller.

Figure 13A:
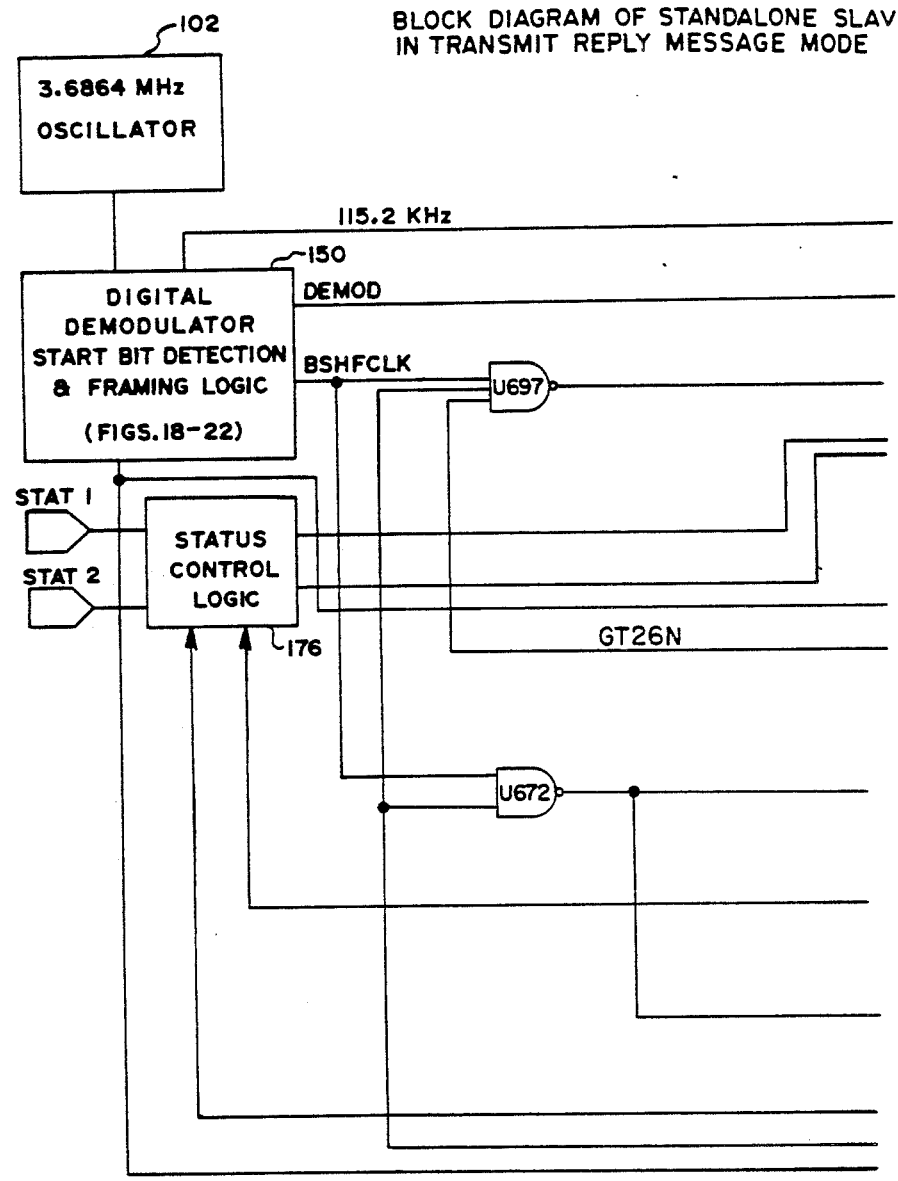
FIGS. 13A–13C are block diagrams of the digital IC in the stand alone, slave mode in transmitting a reply message back to the central controller.
Figure 13B:
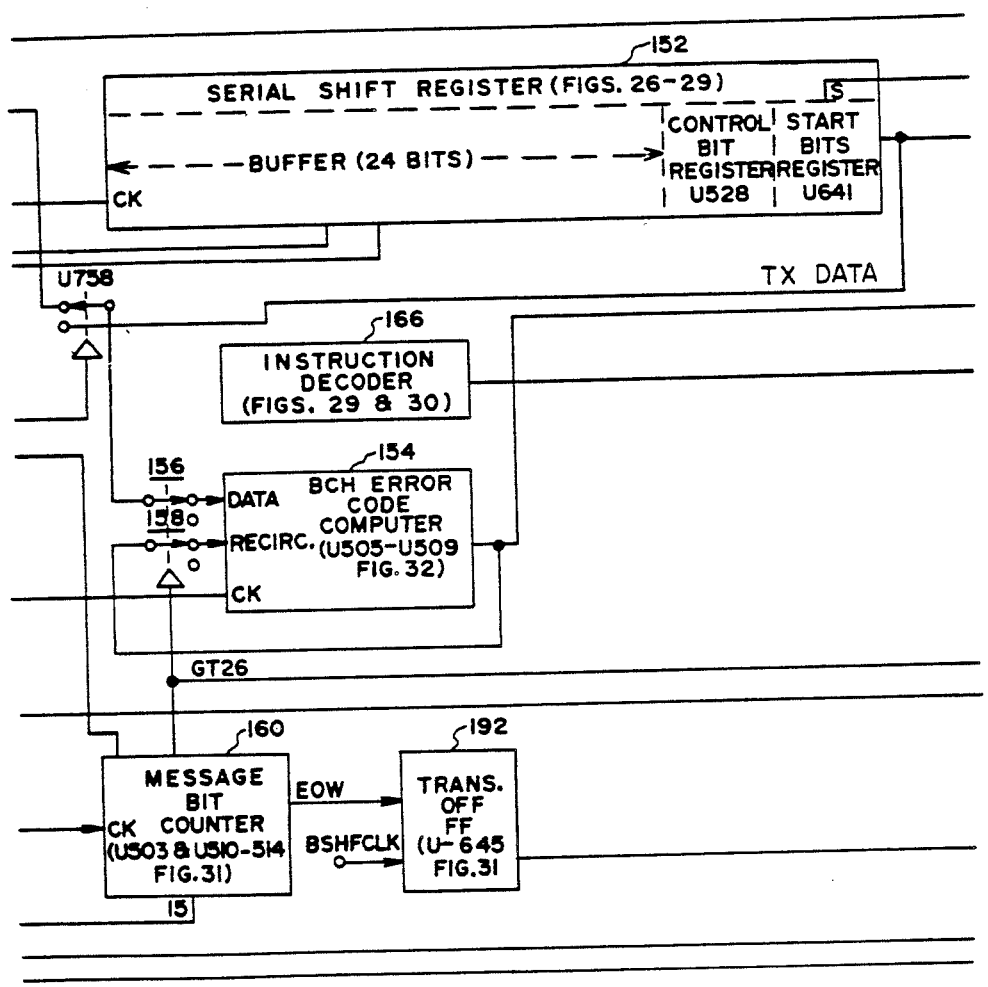
Figure 13C:
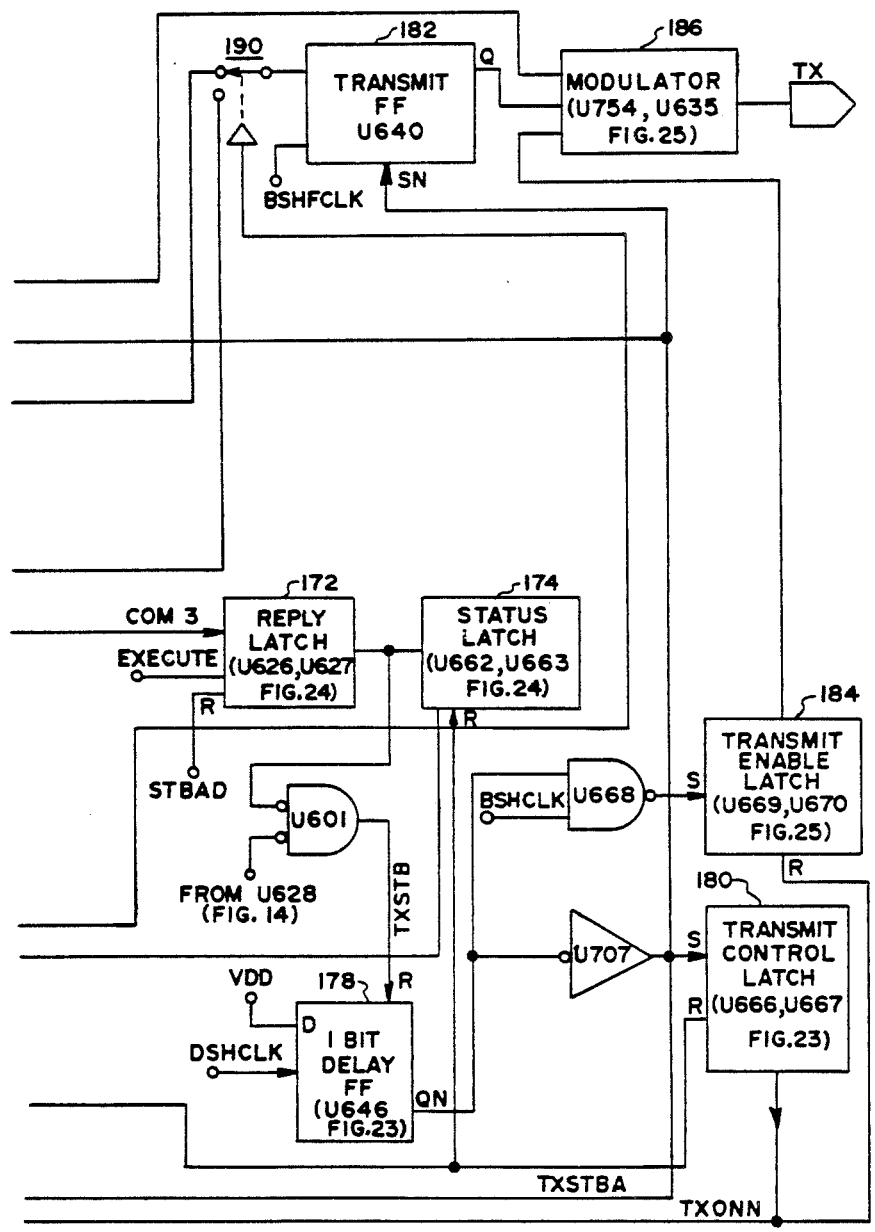

In FIG. 13 the operation of the stand alone slave in formatting and transmitting such a reply message back to the central controller is shown in block diagram form. Referring to this figure, it is assumed that a message has been received from the central controller and has been stored in the serial shift register 152 in the manner described in detail heretofore in connection with FIG. 12. It is further assumed that the control bit B2 of the received message has a logic value of "1" and that the message bit B6 stored in the buffer portion of the register 152 has a logic value "1" which instructs the stand alone slave to transmit a reply message back to the central controller. When the B6 bit has a "1" value the instruction decoder 166 produces an output signal on its COM 3 output line. Also, at the end of the received message the execute logic circuits 170 (see FIG. 12) produce an EXECUTE signal when the conditions described in detail heretofore in connection with FIG. 12 occur. When an EXECUTE signal is produced a reply latch 172 provides an output which is employed to set a status latch 174. The status latch 174 provides a control signal to the status control logic 176. However, the condition of the status pins STAT 1 and STAT 2 is not employed to set corresponding stages of the buffer portion of the serial shift register 152 until after 15 bits have been shifted out of the register 152. At that time the message bit counter 160 provides an output on its "15" output line which is employed in the status control logic 176 to set the corresponding stages of the buffer portion of the register 152, these stages corresponding to the location of bits B25 and B26 in the reply message after 15 bits have been shifted out of the register 152.

Considering now the manner in which the received message which has been stored in the serial shift register 152 is shifted out to form a reply message, it will be recalled that a message which is transmitted over the network 78 requires two start bits having a logic value of "1". However, when the message was received it was initially detected by detecting the presence of carrier on the network 78 for a duration of 2 bits and, hence, the two start bits of the received message are stored as a single bit in the start bits register U641. When a reply message is to be transmitted over the network it is necessary to provide a modulated carrier of two bits duration in response to the single start bit stored in the register U641. To accomplish this, a transmit strobe signal (TXSTB) is derived from the reply latch 172 and is coupled through the NOR gate U601 to reset a one bit delay flip-flop 178 which has its D input connected to the five volt supply $V_{dd}$. As a result the QN output of the flip-flop 178 is inverted to provide a transmit strobe A (TXSTBA) signal which sets a transmit control latch 180. When the latch 180 is set it provides a transmit on (TXONN) signal which is employed to release the framing counters in the demodulator 150 so that they begin to provide BSHFCLK pulses at one bit intervals.

For the first 26 bits of the reply message the output of the start bits register U641 is connected through a switch 190 to a transmit flip-flop 182 which is also set by the TXSTBA signal and is held in a set condition so that it does not respond to the first BSHFCLK pulse which is applied to its clock input. At the same time the QN output of the one bit delay flip-flop 178 is combined with the first BSHFCLK pulse in the NAND gate U668 so as to provide a signal which sets a transmit enable latch 184. When the transmit enable latch 184 is set it provides an enabling signal to the modulator 186 to which is also supplied a carrier signal having a frequency of 115.2 kHz. from the digital demodulator 150. When the transmit flip-flop 182 is initially set by the TXSTBA line going low, it provides a 1 on its Q output to the modulator 186. Accordingly, when the transmit enable latch 184 provides an enabling signal to the modulator 186 a carrier output is supplied to the TX output pin of the device 80 and is supplied to the network 78. During this initial transmission of carrier during the first start bit interval the data in the serial shift register 152 is not shifted out because BSHFCLK pulses to the clock input of the register 152 are blocked by the NAND gate U697. The NAND gate U697 has as its second input a signal from the GT26N output line of the message bit counter 160 which is high until 26 bits have been shifted out of the register 152. However, a third input to the NAND gate U697 is the TXSTBA line which went low when the 1 bit delay flip-flop 178 was reset. Accordingly, the first BSHFCLK pulse is not applied to the clock input of the register 152 although this pulse does set the transmit ENABLE latch 184 and enable carrier output to be supplied to the TX output pin for the first bit interval. However, a short interval after the first BSHFCLK pulse, a delayed shift clock pulse (DSHFHCLK), which is also developed in the framing logic of the demodulator 150, is supplied to the clock input of the 1 bit delay flip-flop 178 so that the TXSTBA line goes high shortly after the first BSHFCLK pulse occurs. When the TXSTBA line goes high the BSHFCLK pulses pass through the NAND gate U697 and shift data out of the register 152 and the serially connected transmit flip-flop 182 to the modulator 186 so that the single start bit stored in the register U641 and the remaining bits B2–B26 of the received message control the modulation of the carrier supplied to the TX output pin. In this connection it will be noted that the BSHFCLK pulses are also supplied to the clock input of the transmit flip-flop 182 so as to permit the serial shift of data to the TX output pin. However, as discussed above, when the TXSTBA line is low it holds the flip-flop 182 set so that it does not respond to the first BSHFCLK pulse.

Considering now the manner in which the STAT 1 and STAT 2 status signals from the controlled device are added to the reply message, it will be recalled that the buffer stages are not set in accordance with the signals on the STAT 1 and STAT 2 pins until 15 bits have been shifted out of the register 152 in order to allow time for the relay contacts of the controlled device to assume a final position. It will also be recalled that the B25 and B26 bits of the received message are reserved for status bits to be added in a reply message so that the last active bit in the received message is B24. When the B24 bit has been shifted 15 times it appears in the B9 stage of the buffer portion of the serial shift register 152. Accordingly, the conditions of the status pins STAT 1 and STAT 2 can be set into the B10 and B11 stages of the buffer after the 15th shift of data in the register 152. To this end, the message bit counter 160 develops a signal on the "15" output line which is sent to the status control logic 176. This logic was enabled when the status latch 174 was set in response to a COM 3 signal indicating that the reply was requested. Accordingly, the status control logic then responds to the "15" signal by setting the B10 and B11 stages in accordance with the potentials on the STAT 1 and STAT 2 pins. In this connection it will be understood that the B10 and B11 stages of the buffer initially contained part of the address in the received message. However, after the received message has been shifted 15 bits during transmission of the reply message the stages B10 and B11 are free to be set in accordance with the status pins STAT 1 and STAT 2 and this status will be transmitted out as a part of the reply message in the B25 and B26 bit positions.

As discussed generally heretofore, it is necessary to compute a new BCH error code for the reply message which is transmitted back to the central controller due to the fact that the status bits B25 and B26 may now contain status information where they were not used in the received message. As soon as the transmit control latch 180 is set the TXONN signal controls a switch U758 so that the DEMOD output of the demodulator 50 is removed from the data input of the BCH error code computer 154 and the output of the serial shift register 152 is connected to this input through the switch 156. However, during the initial 1 bit delay of the flip flop 178 BSHFCLK pulses are blocked from the clock input of the comparator 154 by the NAND gate U672 the other input of which is the TXSTBA line which is low for the first start bit. After the first BSHFCLK pulse the TXSTBA line goes high and succeeding BSHFCLK pulses are supplied to the computer 154. The two start bits of the transmitted message are thus treated as one bit by the computer 154 in the same manner as the two start bittivs of a received message are decoded as one bit for the register U641.

As the data stored in the register 152 is shifted out to the transmit flip-flop 182, this data is also supplied to the data input of the BCH error code computer 154 through the switch 156. Also, the recirculating input of the computer 154 is connected through the switch 158, as described heretofore in connection with FIG. 12. Accordingly, as the 26 bits stored in the register 152 are shifted out of this register, the computer 154 is computing a new BCH error code which will take into account the status information in bits B25 and B26 thereof. After the 26th bit has been shifted out of the register 152 a new five bit error code is then present in the computer 154. When the message bit counter 160 produces an output on the GT26 line the switches 156 and 158 are opened while at the same time the output of the computer 154 is connected through the switch 190 to the input of the transmit flip-flop 182 in place of the output from the serial shift register 152. Since BSHCLK pulses are still applied to both the BCH error code computer 154 and the transmit flip-flop 182 the five bit error code developed in the computer 154 is successively clocked through the transmit flip-flop 182 to the modulator 186 so as to constitute the BCH error code portion of the transmitted reply message.

When the switch 156 is opened after the 26th bit, a zero is applied to the data input of the BCH error code computer 154 so that as the five bit error code is shifted out of the BCH error code computer 154 the shift register stages are back filled with zeroes. After the five error code bits have been shifted out, the next BSHFCLK pulse clocks a zero out of the computer 154 and through the transmit flip-flop 182 to the modulator 186 to constitute the B32 stop bit which has a logic value of "0". This completes transmission of the 33 bit message onto the network 78.

When the message counter 160 has counted to 32 bits its EOW line is supplied to a transmit off flip-flop 192 so that a transmit off signal (TXOFFN) is developed by the flip-flop 192. The TXOFFN signal is employed to reset the status latch 174 and the transmit control latch 180. When the transmit control latch 180 is reset its TXONN output line resets the transmit ENABLE latch 184. The reply latch 172 is reset by timing pulses STBAD developed in the framing logic of the demodulator 150, as will be described in more detail hereinafter.

Expanded Slave Mode

Figure 14A:
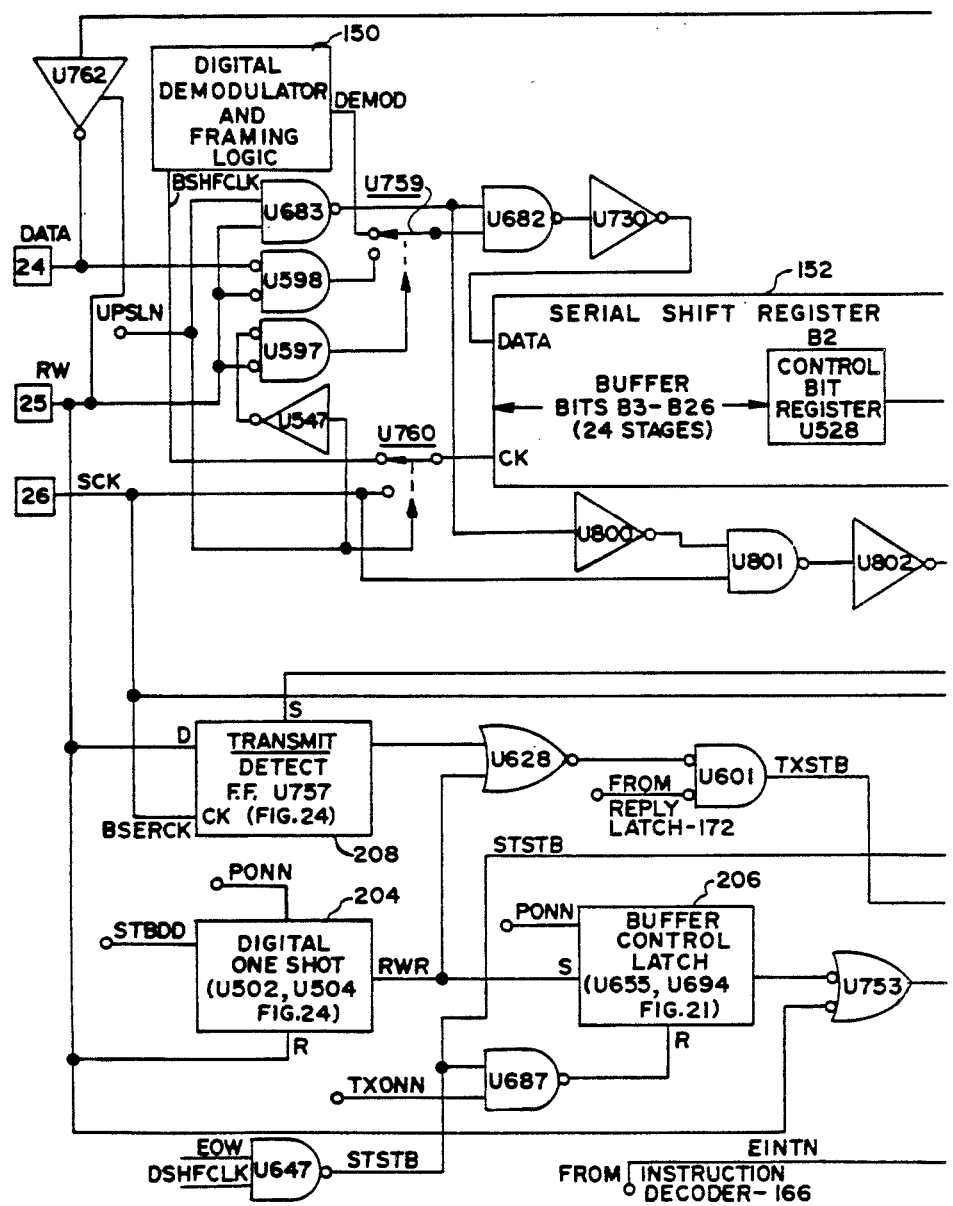
FIGS. 14A–14B are block diagrams of the digital IC in an expanded slave mode in responding to an enable interface instruction.
Figure 14B:
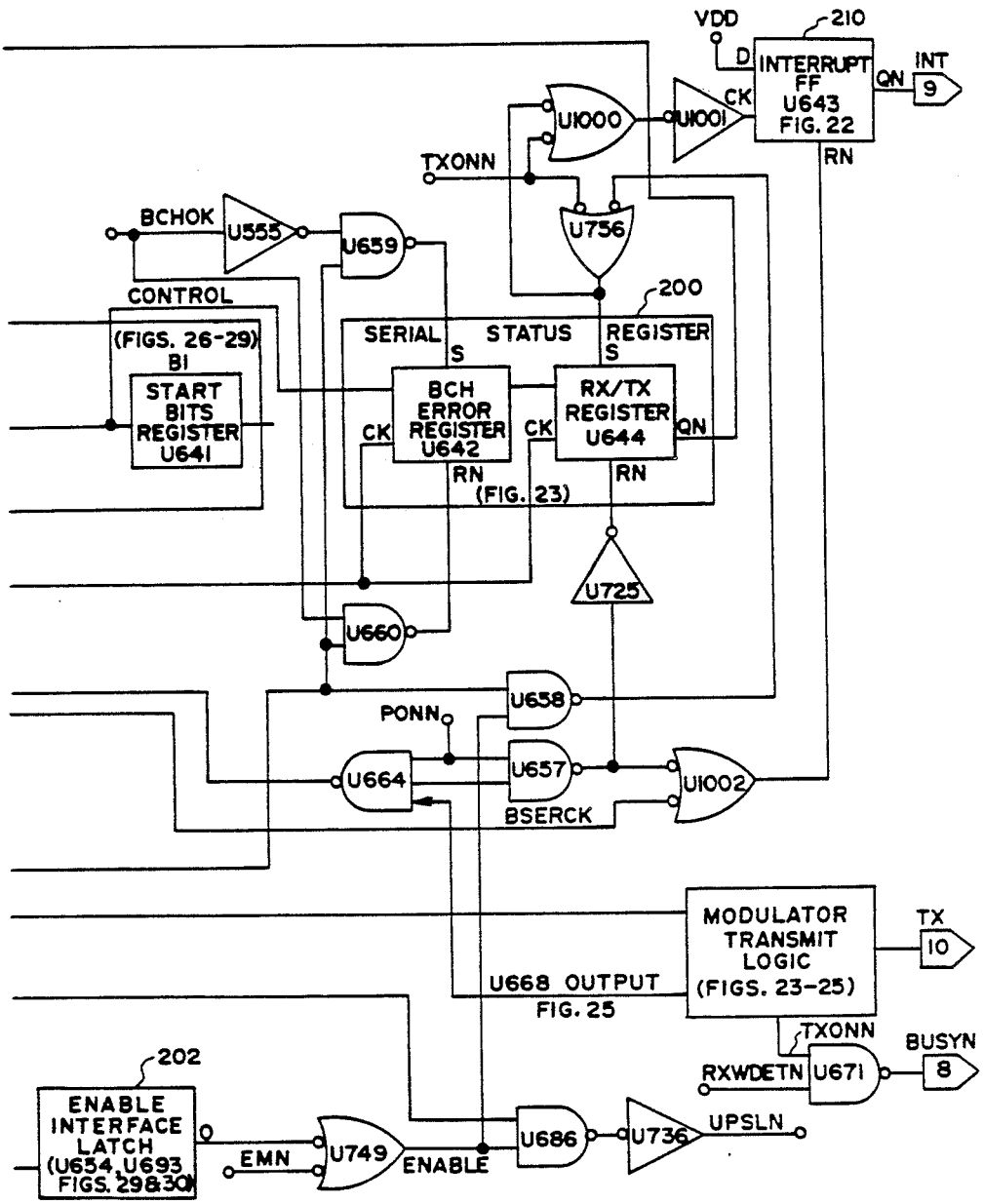

In FIG. 14 there is shown a block diagram of the digital IC 80 when operated in an expanded slave mode and showing the operation of the device 80 in response to an enable interface instruction. It will be recalled from the previous description that in the expanded mode, pin 24 (DATA) of the digital IC is used as a bi-directional serial data line by means of which data stored in the serial shift register 152 may be read out by an associated microcomputer, such as the microcomputer 84 (FIG. 1), or data from the microcomputer can be loaded into the register 152. Also, pin 26 of the device 80 acts as a serial clock (SCK) input by means of which serial clock pulses supplied from the associate microcomputer 84 may be connected to the clock input of the register 152 to control the shift of data from this register onto the data output pin 24 or the clocking of data placed on the DATA pin into the register 152. Also, pin 25 of the device 80 (RW) is connected as a read-write control line which may be controlled by the associated microcomputer 84 to control either the reading of data from the register 152 or the writing of data into this register from the microcomputer 84. The RW line is also used by the microcomputer 84 to force the digital IC 80 to transmit the data present in its register 152 onto the network 78 in the 33 bit message format of this network. Pin 9 of the device 80 functions as an interrupt line (INT) to the microcomputer 84 in the expanded mode and supplies an interrupt signal in response to an enable interface instruction which informs the micro 84 that a message intended for it has been stored in the register 152. An interrupt signal is also produced on the INT line afer the device 80 has transmitted data loaded into the register 152 onto the network. Pin 8 of the device 80 supplies a busy signal (BU- SYN) to the associated micro 84 whenever a message is being received by the device 80 or a message is being transmitted by this device onto the network 78.

It will be understood that the block diagram of FIG. 14 includes only the circuit components and logic gates which are involved in setting up an interface with the associated micro 84 and the bidirectional transmission of data and control signals between the micro 84 and the device 80. In FIG. 14 it is assumed that a message has been received from the central controller which contains an instruction to establish an interface with the associated microcomputer 84 in bits B3–B5 of the message and that the instruction decoder 166 has decoded this instruction by producing an output on its enable interface output line (EINTN). Also, when the device 80 is operating in an expanded slave mode pins 1 and 27 are grounded and the expanded mode line EMN is high.

In the expanded mode of operation of the digital device 80, a serial status register 200 is employed which includes a BCH error register U642 and an RX/TX register U644. The BCH error register U642 is serially connected to the output of the control bit register U528 in the serial shift register 152 over the CONTROL line. The RX/TX register U644 is serially connected to the output of the BCH error register U642 and the output of the register 644 is supplied through an inverting tri-state output circuit U762 to the bi-directional serial DATA pin 24.

It will be recalled from the previous discussion of FIG. 12 that when the digital device 80 receives a message from the central controller which includes an instruction it will not execute that instruction unless the BCH comparator 162 (FIG. 12) provides a BCHOK output which indicates that each bit of the BCH error code in the received message compares equally with the BCH error code computed in the device 80. The BCH error register U642 is set or reset in accordance with the BCHOK output from the BCH comparator 162. The BCH error register U642 is reset when the initial message is received requesting that the interface be established because this instruction would not have been executed if it was not errorfree. However, once this interface has been set up the central controller may send additional messages to the microcomputer 84. During receipt of each of these additional messages the BCH comparator 162 compares the BCH error code contained in the received message with the BCH error code computed by the computer 154 and will indicate an error by holding the BCHOK line low if all bits of the two codes are not the same. If the BCHOK line is low the BCH error register U642 is set. However, since the interface has already been set up, this second message stored in the register 152, which contains an error, may be read out by the microcomputer 84 by successively clocking the SCK line and reading the DATA line. The presence of a logic "1" in the BCH error register position (second bit) of the data read out by the microcomputer 84 indicates to the microcomputer 84 that an error in transmission has occurred and that the microcomputer may wish to ask the central controller to repeat the message.

The RX/TX register U644 is employed to indicate to the microcomputer 84 whether or not the serial shift register 152 is loaded or empty when it receives an interrupt signal on the INT line. If the register 152 has been loaded with a received message from the central controller the RX/TX register U644 is set. When the micro reads out the data stored in the register 152, the serial shift register 152 and the serial status register 200 are back filled with zeroes so that when the readout is completed a zero will be stored in the RX/TX register U644. When data is then loaded into the register 152 and transmitted out to the network this zero remains stored in the RX/TX register since it is not used during transmission. Accordingly, when an interrupt is produced on the INT line after the message is transmitted, the RX/TX register U644 remains at zero so as to the indicate to the microcomputer that the message has been sent and the register 152 is empty.

When the digital IC 80 is arranged to receive a message from the network 78, the switches U759 and U760 have the position shown in FIG. 14 so that the output of the demodulator 150 is supplied to the data input of the serial shift register 152 and the received message may be clocked into register 152 by means of the BSHFCLK pulses applied to the clock input of the register 152. However, as soon as an enable interface command has been executed in the IC 80 control of the register 152 switches to the associated microcomputer 84 by actuating the switches U759 and U760 to the opposite position. This insures that data which has been stored in the register 152 during the received message is preserved for transmission to the microcomputer 84. It is important to switch control of the register 152 to the microcomputer 84 immediately because the micro might not be able to respond immediately to its interrupt on the INT line and an incoming message might write over the data in the register 152 before the micro reads out this data.

While the interface is established to the microcomputer 84 no more network transmissions will be demodulated and placed in the serial shift register 152 until the microcomputer 84 relinquishes control. However, after control is shifted to the microcomputer 84, the digital demodulator 150 continues to demodulate network messages and when a network message is received produces a signal on its RXWDETN output line. This signal is transmitted through the NAND gate U671. The output of the NAND gate U671 is inverted to produce a BUSYN output signal to the associated microcomputer 84. The microcomputer 84 is thus informed that the device 80 has detected activity on the network 78. This activity might be that the central controller is attempting to communicate with the microcomputer through the enabled slave mode digital IC 80. When the digital IC 80 is transmitting a message back to the central controller over the network, as described heretofore, the TXONN signal developed by the transmit control latch 180 (FIG. 13) also supplies an active low signal to the BUSYN output pin to inform the microcomputer 84 that a message is being transmitted by the digital IC 80 to the central controller over the network 78.

Considering now in more detail the manner in which control of the register 152 is shifted from the network to the microcomputer 84, when the enable interface command is decoded by the instruction decoder 166 it produces an EINTN output which sets an enable interface latch 202. The low output of the latch 202 is combined with the master slave signal EMN, which is high in the expanded slave mode, in the NAND gate U749 so as to provide an active high signal on the ENABLE output of the NAND gate U749 which is one input of the NAND gate U686. Assuming that the other input of the NAND gate U686 is also a 1, the output of U686 goes low which is inverted in the inverter U736 so that the UPSLN line goes high. The UPSLN line is employed to control the switches U759 and U760 and when it is high switches the data input of the register 152 to the bidirectional serial DATA line through inverter U547 and the clock input of the register 152 to the serial clock SCK line. More particularly, the UPSLN line directly controls switch U760 so that the SCK serial clock line is connected to the clock input of the register 152. Also, the UPSLN line through the inverter U547 is one input of the NOR gate U597 the other input of which is the RW line which is normally high due to an internal pull up resistor in the digital IC 80. Accordingly, a high on the UPSLN line causes the switch U759 to disconnect the demod output of the modulator 150 from the data input of the register 152 only when the RW line is low.

When the microcomputer 84 wishes to read the data stored in the serial shift register 152 it does so by providing serial clock pulses to the SCK line. At the same time the RW line is high which controls the tri-state output circuit U762 to connect the output of the RX/TX register U644 to the bidirectional DATA line. Accordingly the DATA pin will contain the state of the RX/TX register U644 which can be read by the microcomputer 84. When the UPSLN line is high and the RW line is also high the output of the NAND gate U683 is low which is inverted by the inverter U800 and applied as one input to the NAND gate U801 the other input of which is the SCK line. The output of the NAND gate U801 is inverted by inverter U802 and is supplied to the clock inputs of the BCH error register U642 and the RX/TX register U644 so that these registers are also shifted by pulses produced by the micro on the SCK line. Accordingly, when the micro clocks the SCK pin once all of the data in the serial shift register 152 and the serially connected serial status register 200 is shifted to the right so that the state of the BCH error register U642 will be present at the DATA pin. The micro can then read the DATA pin again to obtain the state of this register. This clocking and reading process continues until the micro has read out of the DATA pin all of the data in the serial shift register 152 and the serial status register 200. In this connection it will be noted that the start bit register U641 is bypassed during the readout operation since its information is used only in transmitting a message to the network. As indicated above, the stages of the serial status register 200 are included in the chain of data which may be shifted out to the microcomputer 84 because these stages contain information which is useful to the microcomputer 84.

It will also be noted that when an enable interface signal is produced and the UPSLN line is high, the RW line is also high which produces a zero on the output of U683. The fact that both the UPSLN line and the RW line are high forces switch U759 to the DEMOD position. However, since the output of U683 is low the data input to the serial shift register 152 will always be logic zeros. Accordingly, as data is being read out of the register U644 on the DATA pin 24 the register 152 and the serial status register 200 are being back filled with zeros. After the entire contents of these registers has been read out the RX/TX register U644 contains a zero so that a zero appears on the DATA pin thereafter. As indicated above, when the micro receives a second interrupt on the INT line after a message has been transmitted the micro can read the DATA pin and verify that the message has been sent.

Considering now the manner in which the stages of the serial status register 200 are set at the end of either a received message or a transmitted message to provide the above-described information to the micro, at the end of a received message the message bit counter 160 (FIG. 12) produces an EOW signal which is combined with DSHFCLK pulses from the digital demodulator 150 in the NAND gate U647 (FIG. 14) to provide a status strobe signal STSTB. The STSTB signal is combined with the BCHOK signal in the NAND gate U660 so that the BCH error register U642 is reset if the received message was error free. The BCHOK signal is inverted in the inverter U555 whose output is also combined with the STSTB signal in the NAND gate U659 so that the BCH error register U642 is set if there was an error in the received message. The STSTB signal is also combined with the ENABLE signal in the NAND gate U658 the output of which is supplied to one input of a NAND gate U756 the other input of which is the TXONN line which is high when the device 80 is not transmitting a message. Accordingly, the RX/TX register U644 is set at the end of a received message.

When the device 80 transmits a message to the network the TXONN line is low so that at the end of such transmission the STSTB signal does not set the register U644. However, as indicated above, the register U644 is back filled with a zero as data is read out of the register 152. Accordingly, the micro can read the DATA pin, to which the output of the register U644 is connected, and determine that a message has been transmitted to the network and the register 152 is empty. The register U644 is reset when power is applied to the device 80 and when the interface is disabled and the ENABLE signal disappears. This reset is accomplished through the NAND gate U657 and inverter U725 which together act as an AND gate the inputs of which are the PONN signal and the ENABLE signal.

After the micro has read out the data stored in the serial shift register 152 and the status register 200 it can either switch control back to the network immediately or it can load data into the serial shift register 152 and then command the device 80 to transmit the data loaded into the register 152 onto the network in a 33 bit message having the above described network format. The micro switches control back to the network immediately by pulling the RW line low and then high. However, the low to high transition on the RW line, which is performed by the microcomputer 84, occurs asynchronously with respect to the framing logic in the demodulator 150. Accordingly, it is important to make sure that the device 80 sees the zero to one transition which the microcomputer 84 places on the RW line. This transition is detected by a digital one shot 204 the two stages of which are clocked by the STBDD timing pulses from the framing logic in the demodulator 150. The stages of the one shot 204 are reset by the RW line so that during the period when the RW line is held low by the microcomputer 84 the output line RWR of the one shot 204 remains high. However, upon the zero to one transition on the RW line the digital one shot 204 is permitted to respond to the STBDD pulses and produces an output pulse on the RWR line of guaranteed minimum pulse width due to the fact that it is derived from the framing logic timing pulses in the demodulator 150. The RWR line thus goes low for a fixed interval of time in response to a zero to one transition on the RW line.

When the RWR line goes low it sets a buffer control latch 206 the output of which is connected to one input of the NAND gate U753. The other input of the NAND gate is the RW line. Accordingly, after the zero to 1 transition on the RW line this line is high so that the output of the NAND gate U753 is no longer a "1" and the UPSLN line goes from high to low. When this occurs the switches U759 and U760 are returned to the positions shown in FIG. 14 so that buffer control is shifted from the micro back to the network.

Considering now the situation where the micro wishes to load data into the serial shift register 152 and then command the device 80 to transmit the data in the register 152 onto the network, the micro first pulls the RW line low which enables data to be transmitted from the DATA line through the NOR gate U598, the switch U759, the NAND gate U682 and the inverter U730 to the data input of the register 152. As stated previously, a high on the UPSLN line has also caused the switch U760 to connect the SCK serial clock line to the clock input of the register 152. Data from the micro may now be placed on the DATA pin and clocked into the register 152 by the positive clock edges of the SCK clock pulses. The data entering the register 152 begins with a control bit having a logic value of "0" followed by the least significant bit of the buffer bits B3–B26 and ends up with the most significant bit of the buffer bits. It should be noted that the micro does not load the start bits register U641.

After this data has been loaded into the register 152 the micro pulls the RW pin high. The low to high transition on the RW line after SCK pulses have been supplied to the SCK line is interpreted by the device 80 as meaning that data has been loaded into the register 152 and that this data should now be transmitted out to the network in the 33 bit message format of the network. To detect this condition a transmit detect flip flop 208 is employed. More particularly, the clock pulses developed on the SCK line by the microcomputer 84, identified as BSERCK pulses, are applied to the clock input of the flip-flop 208 and the RW line is connected to its D input. When the RW line is low and a BSERCK pulse is transmitted over the SCK line from the microcomputer 84 the Q output line of the flip-flop 208 goes low. This output is supplied to the NOR gate U628 the other input of which is the RWR line. Accordingly, when the RW line is again pulled high at the end of transmission of data into the register 152 the RWR line goes low so that the output of the NOR gate U628 goes high. This output is supplied as one input to a NOR gate U601 and passes through this gate so as to provide a low on the TXSTB line. A low on the TXSTB line causes the device 80 to transmit the data stored in the serial shift register 152 onto the network in the 33 bit network format in exactly the same manner as described in detail heretofore in connection with FIG. 13 wherein the device 80 transmitted a reply message back to the central controller. However, since the micro does not load data into the start bits register U641, it is necessary to set this register before a message is transmitted. This is accomplished by the TXSTBA line which goes low at the beginning of a transmitted message and sets the register stage U641 as shown in FIG. 13. Accordingly, when the TXSTBA line goes high at the end of the 1 bit delay provided by the flip-flop 178, the start bits register U641 is set and its logic "1" can be shifted out to form the second half of the two bit start signal of the transmitted message as described previously.

When the transmit enable latch 184 (FIG. 13) is set at the start of transmission of this message, the output of the NAND gate U668 (FIG. 13) is employed to set the transmit detect flip flop 208 through the NAND gate U664 the other inputs of which are the power on signal PONN and the ENABLE signal. When an STSTB signal is produced at the end of this transmitted message in response to the delayed clock pulses DSHFCLK the TXONN line is low so that the output of a NAND gate U687, to which these two signals are inputted, remains high leaving the buffer control latch 206 set. This means that buffer control, which was switched to the network at the beginning of transmission, remains that way.

In order to signal the associated microcomputer 84 that an interface is being set up between the expanded slave mode device 80 and the micro so that two-way data transmission over the network is possible, the device 80 produces a high on the INT pin 9 as soon as an enable interface instruction is decoded by the decoder 166. More particularly, when the RX/TX register U644 is set at the end of a received message containing the enable interface instruction, as described previously, the output of the NAND gate U756 is supplied as one input to the NAND gate U1000 the other input of which is the TXONN line. Since the TXONN line is high except during transmission a clock pulse is supplied to the interrupt flip-flop 210, also identified as U643. The D line of the flip-flop 210 is connected to the 5 volt supply so that when this flip-flop receives a clock pulse its QN output goes low, which is inverted and supplied to the INT pin 9 of the device 80. This signals the associated microcomputer that an interface has been established between it and the expanded slave device 80 so that the micro may read the data stored in the serial shift register 152 from the DATA pin and load data into this register in the manner described in detail heretofore. As soon as the micro produces the first pulse on the SCK line, either in reading data from the register 152 or writing data into the register 152, this SCK pulse resets the interrupt flip flop 210 and removes the interrupt signal from the INT line. More particularly, this SCK pulse is supplied to one input of a NOR gate U1002 the other input of which is the output of a NAND gate U657. The output of the NAND gate U657 is high when the interface is enabled and power is on the device 80 so the first SCK pulse resets the interrupt flip flop 210.

If the micro loads the serial shift register 152 and instructs the expanded slave device 80 to transmit this message back to the network the TXONN line goes low during such transmission, as described in detail heretofore in connection with FIG. 13. During such transmission the NAND gates U756 and U1000 are blocked so that the RX/TX register U644 is not set at the end of the transmitted message. However, when the TXONN line goes high again after the message has been transmitted the interrupt flip-flop 210 is again clocked so that a signal is produced on the INT pin thus signalling the micro that transmission of a message back to the central controller has been completed. The fact that transmission has been completed can be verified by the micro by reading the DATA pin which is tied to the output of the RX/TX register U644 and would show a "0" stored in this register. In this connection it will be noted that the micro can read the DATA pin any time that the RW line is high to enable the tristate output U762, even though control of the register 152 has been shifted back to the network. Clocking of the interrupt flip-flop 210 is timed to coincide with the trailing edge of the BUSYN signal on pin 9 so that the INT line goes high at the same time that the BUSYN line goes high.

While the microcomputer 84 may be programmed in any suitable manner to receive data from and transmit data to the expanded mode slave digital IC 80, in FIG. 15 there is shown a general or high level flow chart for the microcomputer 84 by means of which it may respond to the interface and establish bidirectional communication with and data transmission to the network 78 through the digital IC 80. Referring to this figure, it is assumed that the associated digital IC 80 has received a message which includes an enable interface command but has not yet produced an interrupt on the INT line. Under these conditions the RW line is high and the SCK line is low, as indicated by the main micro program block 212. As soon as an interrupt occurs on the INT line the micro reads the DATA line, as indicated by the block 213 in the flow chart of FIG. 15. As described generally heretofore, the RX/TX register U644 is set at the end of a received message which includes an enable interface command so that the DATA line, under these conditions is high. Accordingly, the output of the decision block 214 is YES and the micro then reads the contents of the register 152 in the digital IC 80, as indicated by the process block 215. As described generally heretofore, the micro performs this read out by clocking the SCK line 27 times and reading the DATA line on the leading edge of each SCK pulse. After the 27th SCK pulse a zero will be stored in the RX/TX register U644, as described heretofore in connection with FIG. 14.

After it has read the contents of the register 152 the micro has to decide whether it wishes to reply back to the central controller or whether it wishes to switch control of the register 152 back to the network without a reply, as indicated by the decision block 216 in FIG. 15. Assuming first that the micro wishes to switch control back to the network without a reply, as indicated by the process block 217, the micro accomplishes this by holding the SCK line low and pulling the RW line low and then back high. When control is switched back to the network, the program returns to the main micro program to await the occurrence of another interrupt on the INT line in response to a message from the central controller. In this connection it will be recalled that as soon as the micro sends one pulse over the SCK line to read out the contents of the register 152 the interrupt FF U643 is reset and the INT pin goes low again.

After reading the contents of the register 152, the microcomputer 84 may wish to reply to the central controller by loading data into the register 152 and commanding the digital IC 80 to transmit a 33 bit message signal to the network including this data. Under such conditions the output of the decision block 216 is YES and the microcomputer 84 can load data into the register 152 as indicated by the process block 219. As described heretofore, the micro loads data into the register 152 by pulling the RW line low and then serially placing data bits on the DATA line and clocking each bit into the register 152 by the positive clock edges of SCK pulses it places on the SCK line. The data entering the chip begins with the control bit, followed by the least significant bit of the buffer bits and ends up with the most significant bit of the buffer bits. The SCK line is thus clocked 25 times to load the register 152.

After the register 152 is loaded the micro reads the BUSYN line to determine whether it is high or low, as indicated by the decision block 220. It will be recalled that the BUSYN line goes low if a message on the network is demodulated by the digital demodulator portion of the digital IC 80 even though control of the register 152 has been shifted to the micro computer 84. Also, a burst of noise may be interpreted by the demodulator 150 as an incoming signal. Under these conditions the microcomputer 84 should not command the IC 80 to transmit a message onto the network. If the BUSYN line is high the micro then gives a transmit command to the digital IC 80, as indicated by the process block 221. As described heretofore, this command is performed by pulling the RW line high after it has been held low during the loading of data into the digital IC 80. Control is then returned to the main micro program, as indicated in FIG. 15.

After the digital IC 80 has transmitted the data which has bee loaded into the register 152 onto the network 78 it produces an interrupt high on the INT line at the end of the transmitted message. In response to this interrupt the data line is again read by the micro as indicated by the block 213. However, at the end of a transmitted message the data line is no longer high since the RX/TX register U644 contains a zero at the end of a transmitted message, as described heretofore. Accordingly, the output of the decision block 214 is negative and the program proceeds to the decision block 222 to determine whether further transmission is required from the microcomputer 84 to the central controller. If such transmission is required, further data is loaded into the register 152, as indicated by the block 219. On the other hand, if no further transmission is required the INT line is reset as indicated by the process block 222. As described generally heretofore, this is accomplished by holding the RW line high while applying one SCK pulse to the SCK line. This single SCK pulse resets the interrupt flip flop 210 (FIG. 14) and removes the interrupt signal from the INT line.

It will thus be seen that the present communication system provides an extremely flexible arrangement for bidirectional communication between the central controller and the microcomputer 84 through the digital IC 80. After the interface is set up the micro reads the message transmitted from the central controller to the IC 80 and can either switch control back to the central controller to receive another message or may transmit a message of its own to the central controller. Furthermore, the micro can send a series of messages to the central controller by successively loading data into the register 152 and commanding the digital IC 80 to transmit this data back to the central controller, as indicated by blocks 219, 220 and 221 in FIG. 15. In this connection it will be understood that after the interface is initially set up in the first message transmitted by the central controller, subsequent messages from this central controller to the micro use all 24 buffer bits as data bits and the control bit is a "0". All other devices 80 on the same network, whether in the stand alone slave mode or the expanded mode, will interpret such a message as not intended for them due to the fact that the control bit is reset, even though the data transmitted may have a pattern corresponding to the address of one of these other devices 80. The transmission of data back and forth between the central controller and the microcomputer 84 continues until the central controller disables the interface.

The interface may be disabled by a direct disable interface instruction to the device 80 associated with the microcomputer, in which case the message transmitted by the central controller will have a control bit set ("1") and will have address bits corresponding to the address of this device 80. The device 80 will respond to the disable interface instruction by resetting the enable interface latch 202 (FIG. 14). In the alternative, the central controller can disable the interface implicitly by simply transmitting a message over the network which is addressed to another digital IC 80 in which the control bit is set. The interfaced digital IC 80 will also receive this message but will recognize the occurrence of a control bit of "1" together with an address which is not its own and will disable the interface in response to this, condition, as will be described in more detail hereinafter. However, in the expanded slave mode this implicit mode of disabling the interface will not be effective if a BCH error is detected in the received message. This is done because the received message might have been intended for the interfaced microcomputer but a noise impulse caused the control bit to be demodulated as a "1" instead of a zero. Under these conditions, the BCHOK line will not go high at the end of the received message and this condition is used to maintain the interface, as will be described in more detail hereinafter.

Expanded Master Mode

As discussed generally heretofore, the digital IC 80 may also be pin configured to operate in an expanded master mode as indicated at station #4 in FIG. 1. In the expanded master mode the device 80 is permanently interfaced with a microcomputer 86 so that the microcomputer 86 can operate as an alternate controller and can send shed and restore load signals to any of the stand alone slaves 80 of the communication network if the central controller 76 is inactive and does not place any messages on the network. This interface is permanently established when the MODE1 pin 1 of the device 80 at station #4 is ungrounded, as shown in FIG. 1, so that the EMN line in FIG. 14 is always low and the ENABLE line is always held high through the NAND gate U749. The expanded master device 80 at station #4 should have an address which is different from the address of any of the other devices 80 on the line 78 so as to permit the central controller to communicate with the microcomputer 86.

The microcomputer 86 can also establish communication over the power line 78 with the microcomputer 84 through the expanded slave IC device 80 at station #3. To establish such two way communication, the microcomputer 86 merely transmits data to the expanded master device 80 over the bidirectional DATA line which data includes the address of the expanded slave device 80 at station #3 and an enable interface instruction. The expanded master 80 includes this data in a 33 bit message formatted in accordance with the protocol required by the communication network and transmits this message over the power line 78 to the expanded slave 80 at station #3. The expanded slave 80 at this station responds to the enable interface instruction by establishing the above described interface with the microcomputer 84 after which the bidirectional exchange of data between the microcomputers 84 and 86 is made possible in the manner described in detail heretofore.

A digital IC 80 which is pin configured to operate in the expanded master mode is also used as an interface between the central control computer 88, which may comprise any microcomputer or main frame computer, which is employed to control the remote stations connected to the central controller 76 over the power lines 78. The expanded master device 80 associated with the central controller 76 should also have an address assigned to it which is different from the address assigned to any of the other digital IC's on the line 78, including the digital IC 80 at station #4 associated with the microcomputer 86. This is true even though the interface to the central control computer 88 is always enabled as discussed previously in connection with the expanded master device 80 at station #4.

Since the expanded master digital IC's 80 associated with the central computer 88 and the microcomputer 86 each produces a BUSYN signal whenever it is receiving a message from the network, the presently described communications and control system permits the use of multiple masters on the same network line. If, for example, the microcomputer 86 wishes to send a message to any other point in the system, including the central controller 76, the microcomputer 86 can monitor its BUSYN line to see if any message is on the network at that time. In the same manner, the central controller 76 can monitor its BUSYN line before sending a message to be sure the microcomputer 86 is not sending or receiving a message at that time.

Coupling Network-90

As will be recalled from the preceding general discussion, the coupling network 90 provides bidirectional coupling between the network 78 and the digital IC 80 which is tuned to the carrier frequency of 115.2 kHz. The coupling network 90 also provides amplification of the received signal and limits this signal in both the positive and negative directions to five volts peak to peak before it is applied to the RX input terminal of the device 80. The coupling network 90 also couples the transmitter output terminal TX to the power line and drives it with sufficient power to provide a signal of 1 volt runs amplitude on the power line 78 when the device 80 is transmitting a message onto the network.

Figures 16A, 16C, 17:
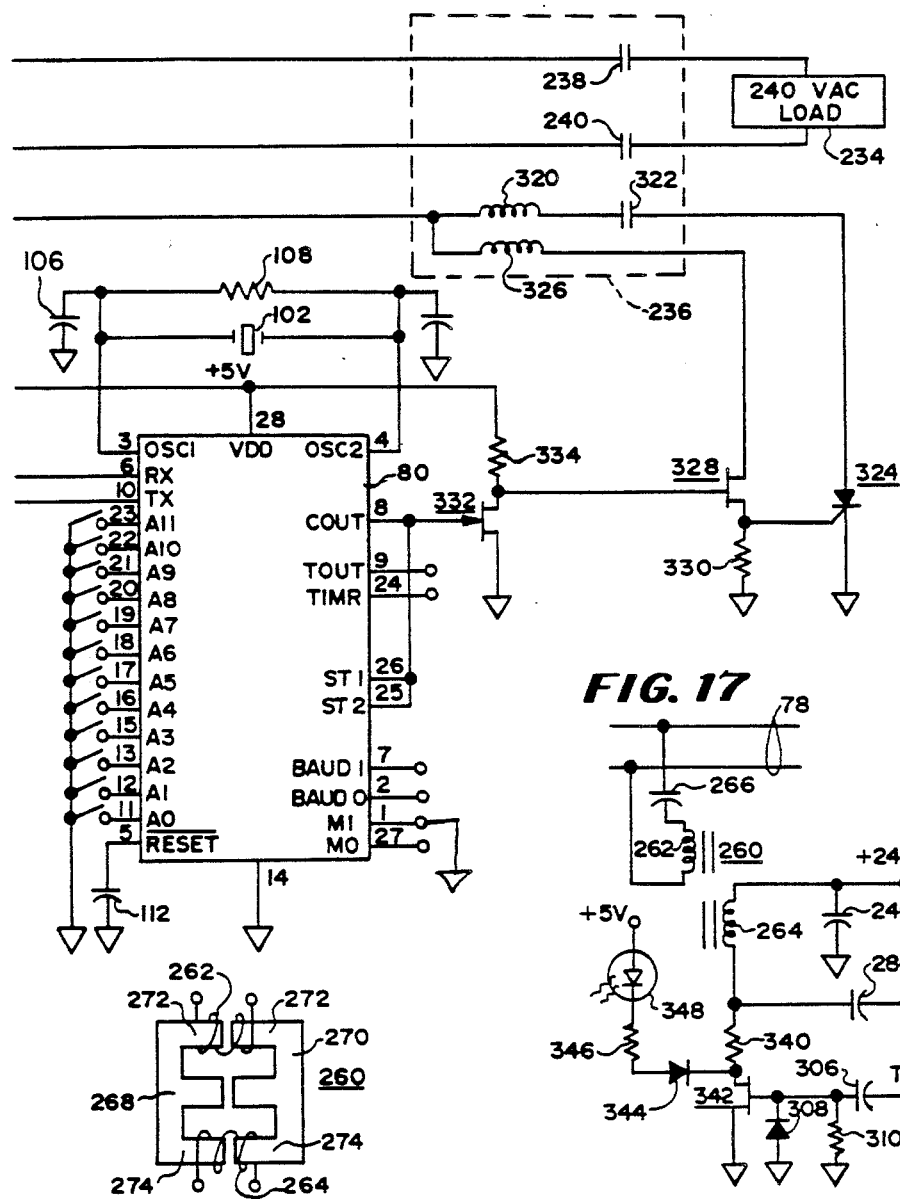
FIGS. 16A–16C are detailed schematics of the coupling network employed with the digital IC in the disclosed communication system.
FIG. 17 is a detailed schematic diagram of an alternative coupling network embodiment.
Figure 16B:
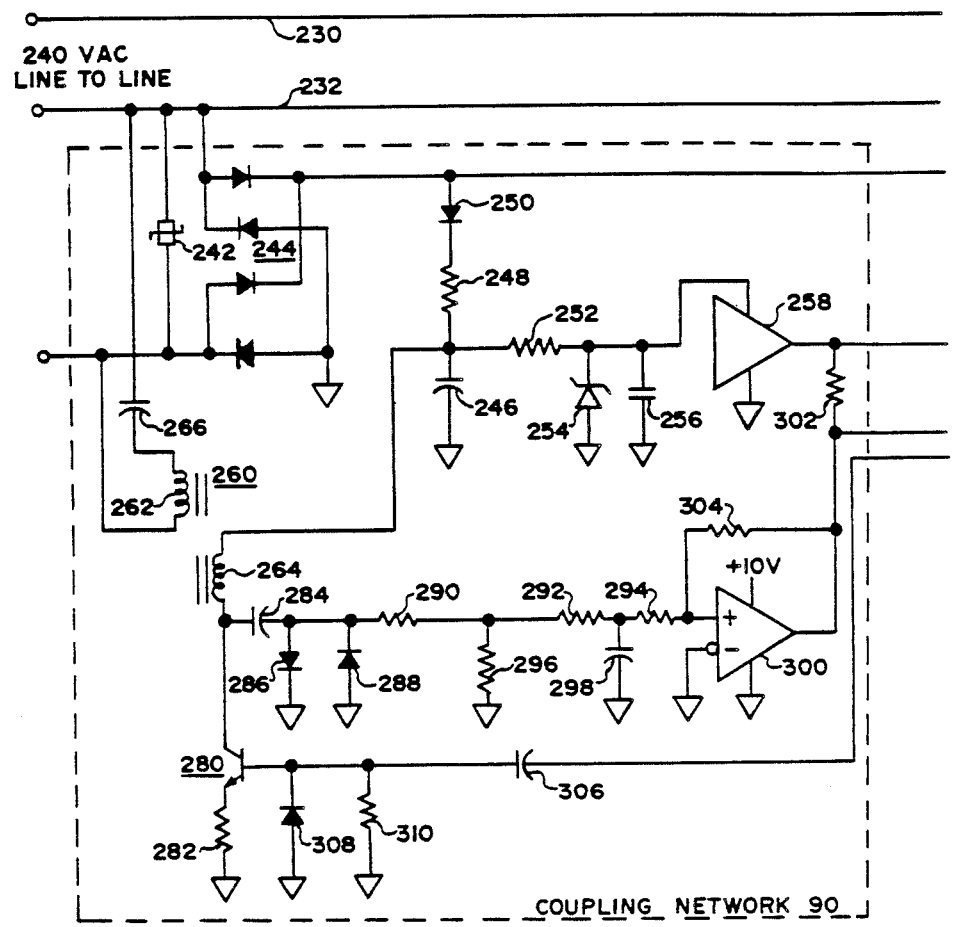

In FIG. 16 a coupling network 90 is shown which is particularly suitable for applications wherein the device 80 is to be associated with a controlled unit, such as a hot water heater or freezer, in a residence. In such applications a +5 V supply for the device 80 is not usually available and the coupling network 90 of FIG. 16 is arranged to function from the conventional power line and develop a suitable power supply for the device 80. Referring to this figure, the power lines 230 and 232, which may be a 240 volt AC line, supply power to a load 234, which may comprise a hot water heater or freezer in a residence, through a power relay indicated generally at 236 which has the normally closed power relay contacts 238 and 240. A protective device 242 is connected between the power line 232 and neutral, this voltage normally being 120 volts AC. A full wave rectifier 244 rectifies the AC voltage on the line 232 and the output of the rectifier 244 is connected through a diode 250, a resistor 248 and a filter capacitor 246 to ground so that a DC voltage of approximately 150 volts is developed across the capacitor 246.

In order to provide a suitable voltage level for energizing the device 80, the voltage across the capacitor 246 is connected through a resistor 252 to a Zener diode 254 across which a voltage of +10 V. is developed, a capacitor 256 being connected across the Zener diode 254 to provide additional filtering. A voltage regulator, indicated generally at 258, is connected across the Zener diode 254 and is arranged to developed a regulated +5 volts at its output which is connected to the Vdd pin 28 of the device 80. The voltage regulator 258 may, for example, comprise a type LM309 regulator manufactured by National Semiconductor Inc.

A transformer 260 is employed to provide bidirectional coupling between the network 78 and the device 80. The transformer 260 includes a primary winding 262 and a secondary winding 264, the primary winding 262 being connected in series with a capacitor 266 between the power line 232 and neutral. The two windings 262 and 264 of the transformer 260 are decoupled so as to permit the winding 262 to function as a part of a tuned resonant circuit which includes the capacitor 266, this resonant circuit being tuned to the carrier frequency of 115.2 kHz. More particularly, as shown in FIG. 16A the core structure of the transformer 260 is formed by two sets of opposed E shaped ferrite core sections 268 and 270 opposed E shaped ferrite core sections 268 and 270 the opposed legs of which are separated by a small air gap. Preferably, these core sections are made of type 814E250/3E2A ferrite material made by the Ferrox Cube Corp. The winding 262 is wound on the opposed upper leg portions 272 of the sections 268 and 270 and the winding 264 is wound on the bottom leg sections 274. The windings 262 and 264 are thus decoupled by the magnetic shunt formed by the opposed center legs of the core sections 268 and 270 so as to provide substantial decoupling between these windings. The winding 262 has an inductance of 0.2 millihenries and consists of 100 turns of AWG#36 wire. The winding 264 has an inductance of 7.2 millihenries and consists of 600 turns of AWG#40 wire. The turns ratio between the primary winding 262 and the secondary 264 is thus 1:6. The air gaps between the opposed legs of the core sections 268, 270 are preferably 63 mils.

The upper end of the winding 264 is connected to the 150 volt potential developed across the capacitor 246 and the bottom end of this winding is connected to the collector of a high voltage NPN transistor 280 the emitter of which is connected to ground through a small resistor 282. Preferably, the transistor 280 is a type MJE 13003 which is manufactured by Motorola Inc. In the alternative, a high voltage FET type IR720 manufactured by International Rectifier Co. may be employed as the transistor 280. The bottom end of the winding 264 is also connected through a capacitor 284 and a pair of reversely connected diodes 286, 288 to ground.

When a modulated carrier message is transmitted over the power line 232 to the remote location of the device 80, the on-off keyed carrier signal may have an amplitude in the millivolt range if the message has been transmitted a substantial distance over the power line. The winding 262 and capacitor 266 of the coupling network 90 act as a first resonant circuit which is tuned to the carrier frequency of 115.2 kHz and has a Q of approximately 40. The winding 264 and the capacitor 284 also act as a resonant circuit which is tuned to the carrier frequency. Preferably, the capacitor 266 is a polypropylene 400 V. capacitor having a capacitance of 0.01 microfarads. The capacitor 284 preferably has a value of 270 picofarads. If the signal on the line 232 has an amplitude of 10 millivolts, for example, approximately Q times the input voltage will be developed across the winding 262 i.e. a signal of 400 millivolts amplitude. The signal developed across the winding 264 is increased by a factor of 6 due to the turns ratio of the transformer 260, and is coupled through the capacitor 284 to a filter network which includes the series resistors 290, 292, and 294. A shunt resistor 296 is connected between the resistors 290 and 292 and ground and a small capacitor 298, which preferably has a value of 100 picofarads, is connected between the junction of the resistors 292 and 294 and ground.

The output of this filter circuit is supplied to one input of a comparator 300 the other input of which is connected to ground. The comparator 300 may, for example, comprise one section of a quad comparator commercial type LM239 manufactured by National Semiconductor, Inc. The comparator is energized from the +10 V. supply developed across the Zener diode 254 and its output is supplied to the RX pin 6 of the device 80. This output is also connected through the resistor 302 to the five volt output of the regulator 258. A small amount of positive feedback is provided for the comparator 300 by means of the resistor 304 which is connected between the output of the comparator 300 and the plus input terminal thereof, the resistor 304 preferably having a value of 10 megohms. The slight positive feedback provided by the resistor 304 creates a small dead band at the input of the comparator 300 so that a signal of approximately 5 millivolts is required to develop a signal in the output and noise voltages below this level will not be reproduced in the output of the comparator 300. However, when the incoming signal exceeds a five millivolt level it is greatly amplified, due to the extremely high gain of the comparator 300 so that an amplified carrier signal of five volts amplitude is developed across the resistor 302 and is applied to the RX input terminal of the device 80.

Considering now the operation of the coupling network 90 during the transmission of a message from the device 80 to the network, the modulated carrier signal which is developed on the TX pin 10 of the device 80 is coupled through a capacitor 306 to the base of the transistor 280. This base is also connected through a diode 308 to ground and through a resistor 310 to ground. The transistor 280 is a high voltage NPN transistor so that the collector of this transistor can be connected through the transformer winding 264 to the 150 volt supply appearing across the capacitor 246. The capacitor 306 is provided to couple the TX output of the device 80 to the base of the transistor 280 because when power is applied to the device 80 the TX output pin 10 assumes a five volt potential which would destroy the transistor 280 if the capacitor 306 were not provided.

The transistor 280 is turned on and off by the modulated carrier signal which is coupled to the base of this transistor through the capacitor 306 and hence develops a voltage of approximately 150 volts across the winding 264 during the carrier on portions of the transmitted message. When the transistor 280 is turned off there is a substantial current being draws through the winding 264, which cannot change instantaneously, so that a large back EMF pulse is also developed across the winding 264. The reversely connected diodes 286 and 288 protect the receiver input circuitry in both polarities from the high voltage pulses which are developed across the winding 264 during the transmit mode. However, it will be understood that the diodes 286 and 288 do not conduct for small amplitude signals and hence the received carrier signal may be coupled through the capacitor 284 to the comparator 300 without interference from the diodes 286 and 288.

The large carrier voltage developed across the winding 264 is stepped down in the transformer 260 and drives the power line 232 so that the 33 bit message developed by the device 80 may be transmitted over a substantial distance to the central controller. At the carrier frequency the power line 232 will have a very low impedance of approximately 10 ohms whereas the reactance of the capacitor 266 is about 300 ohms at the carrier frequency. Accordingly, the power line is essentially driven in a current mode.

Considering now the manner in which the device 80 controls the relay 236 and its associated load 234 in response to a shed load instruction, the relay 236 is provided with a high current coil 320 which controls the high current relay contacts 238, 240, the coil 320 being connected in series with the normally closed contacts 322 and an SCR 324 to ground. The other side of the relay coil 320 is connected to the unfiltered full wave rectified output of the rectifier 244. A relatively low current holding coil 326 is also connected from this point to the drain electrode of an FET 328 the source of which is connected through the resistor 330 to ground. The COUT pin 8 of the device 80 is connected to the gate electrode of an FET 332 the drain electrode of which is connected to the +5 V. supply through the resistor 334 and the source is connected to ground. The drain of the FET source is connected to the gate of the FET 328.

When power is applied to the device 80 the COUT pin goes high which causes the FET 332 to conduct and the voltage developed across the resistor 334 holds the FET 328 nonconductive. Accordingly, there is no current flow through the resistor 330 and the SCR 324 is held off. When a shed load instruction is received by the device 80 the COUT line goes low which turns off the FET 332 and causes the FET 328 to conduct. The voltage produced across the resistor 330 turns on the SCR 324 so that the relay coil 320 is energized and opens the main relay contacts 238 and 240. At the same time, the normally closed contacts 322 in series with the coil 320 are opened. However, since the FET 328 is conducting the relay coil 326 is energized and holds the contacts 238, 240 and 322 open. However, the coil 326 has an impedance substantially greater than the coil 320 so that only a small current is required to hold the contacts of the relay 236 open. When a restore load instruction is received by the device 80, the COUT line again goes high and the FET is rendered nonconductive so that the coil 326 is no longer energized and the normally closed contacts of the relay 236 are again closed. Since the relay 236 has no auxiliary contacts to provide status feedback, the STAT1 and STAT2 pins 26 and 25 are connected back to the COUT pin 8 of the device 80.

If it is desired to have a variable time out feature, as discussed in detail heretofore in connection with FIG. 11, the TOUT pin 9 and the TIMR pin 24 of the device 80 in FIG. 16 may be connected in the manner shown in FIG. 11 to provide a variable time out feature in association with the relay 236.

It will be understood that the coupling network 90 can be of very small physical size due to the fact that the coupling transformer 260 is relatively small. The coupling network 90, the device 80 and the control devices 332, 328 and 324 may all be located on a small circuit board which can be mounted within the housing of the relay 236 so as to provide an addressable relay in a simple and economical manner. Furthermore, existing relays can be converted into addressable relays by simply installing such a board and making appropriate connections to the power line.

It will be appreciated that in many instances the controlled device associated with the digital IC 80 will have a low voltage D.C. power supply which is provided for other logic circuits in the controlled device. In such instance, the coupling network of FIG. 16 can be modified as shown in FIG. 17 to operate directly from a low voltage D.C. power source. Referring to this figure, only the portions of the network of FIG. 16 are shown which are changed from the arrangement of FIG. 16. Specifically, the upper end of the winding 264 is connected to a +24 volt supply (assumed to be available from the controlled device) and the bottom end of the winding 264 is connected through a resistor 340 to the drain electrode of an FET 342 the source of which is connected to ground. Preferably the FET is a power FET commercial type 2N6660. The gate of the FET 342 is connected to ground through the diode 308 and through the capacitor 306 to the TX terminal of the device 80. The drain of the FET 342 is also coupled through a diode 344 and a resistor 346 to a light emitting diode 348. In the circuit of FIG. 17 the voltage regulator 258 and comparator 300 are of a suitable commercial type to be energized directly from the +24 V. supply. Since a lower D.C. voltage is available in the circuit of FIG. 17 both of the windings 262 and 264 of the transformer 260 of FIG. 17 have the same number of turns, i.e. 100 turns of AWG #36 wire, and the capacitors 266 and 284 are both 0.01 ufd. capacitors.

In operation, the circuit of FIG. 17 receives an on-off modulated carrier signal from the power line 78 which is coupled through the transformer 260 without step up because both windings 262 and 264 have the same number of turns. The signal developed across the winding 264 is coupled through the capacitor 284 and the input filter and comparator 300, as described in connection with FIG. 16, to the RX terminal of the device 80. In the transmit mode the modulated carrier signal on the TX terminal is supplied through the capacitor 306 to the gate of the FET 342 so as to turn this device on and off which produces a modulated carrier current in the transformer winding 264 which is transmitted to the power line 78. Since the windings 262 and 264 have the same number of turns in the embodiment of FIG. 17 there is no step down of the transmitted signal in passing through the transformer and hence the level of the transmitted message in the power line 78 is about the same as the embodiment of FIG. 17 even though the 24 V. supply is approximately one sixth of the +150 V. supply in the embodiment of FIG. 16. The LED 348 will indicate the periods during which the device 80 is transmitting a message to the network 78.

DETAILED DESCRIPTION OF THE DIGITAL DEVICE 80

FIGS. 18 to 33, inclusive, when arranged in the manner shown in FIG. 34, comprise a detailed schematic diagram of the digital IC 80 described generally heretofore. Generally speaking, in this schematic diagram the logic signals which are developed at the outputs of various portions of the schematic are given a letter abbreviation which ends with "N" whenever that particular signal is an active low output. Otherwise the signal is active high.

Digital Demodulator 150 Considering now in more detail the digital receiver-demodulator 150 and its associated start bit detection and framing logic, it should first be pointed out that while this demodulator is particularly suitable for demodulating power line carrier information in high noise environments and lends itself to implementation in digital large-scale integration circuitry, such as the device 80, this demodulator is of broad general application and can be used wherever it is required to demodulate ASK modulated binary data. The demodulator may be used by itself since it is readily implemented in digital logic or may be used as a part of a larger system as in the digital IC 80.

As discussed generally heretofore, the receiver-demodulator 150 is arranged to demodulate data transmitted over a power line. Power line carrier signals are affected by three types of noise: Gaussian noise, coherent signals, and impulsive noise. The carrier signal plus noise is fed into the digital demodulator 150 through the coupling network 90 which includes an input filter which couples the device 80 to the power line 78, as described in detail heretofore in connection with FIG. 16. This input filter produces oscillations (ringing) in response to the impulsive noise inputs. On the one hand it is desirable to reduce the noise power bandwidth of the input filter, i.e. high Q, while at the same time there is a need for a relative low Q input filter to reduce the ring down time associated with impulsive noise. The filtering action of the digital demodulator 150 attempts to reconcile these two conflicting requirements.

As discussed generally heretofore, the carrier modulation system employed in the digital IC 80 is on-off keying of a carrier frequency of 115.2 kHz at 300 baud. This modulation system was chosen in preference to phase shift modulation at the data rates required because of the significant phase disturbances associated with the power line 78. The carrier frequency of 115.2 kHz is chosen based upon spectral analyses of typical power line systems and the 300 baud bit rate is chosen to provide maximum throughput with acceptable error rates.

The general approach in the digital demodulator 150 is to require phase coherence in the short term i.e. over one and a half carrier cycles, for frequency detection, and to sense continued phase coherence in the longer term i.e., 1/6th of a bit, or 64 carrier cycles at 300 baud, to discriminate against impulsive noise. Impulsive noise also produces frequency information that is coherent in the short term but is not perfectly coherent in the longer term. The reason that the longer term is not extended to an entire bit or a longer fraction of a bit is that the power line produces phase discontinuities that are significant over the time interval involved. An example of a phase discontinuity being produced on the power line is a line impedance disturbance caused by rectifiers beginning to conduct or ending conduction in association with a capacitative input filter. These phase discontinuities are detected and lead to bit errors. By choosing the integration time of 1/6th of a bit, each phase disturbance can lead only to a degradation of 1/6th of a bit.

The digital demodulator 150 thus senses both frequency and phase of an incoming signal over a 1/6th-of a bit interval (approximately 556 microseconds at 300 baud). If the input frequency is correct and maintains phase coherence for at least three fourths of the 1/6th bit interval, a counter is incremented. After six of these 1–6th bit intervals are processed, the counter contents are examined. If the counter counts up to four or more (assuming that it started out at 0), the demodulator outputs a demodulated logic 1. If the counter contents are less than 4, the demodulator outputs a demodulated logic 0.

Figure 35:
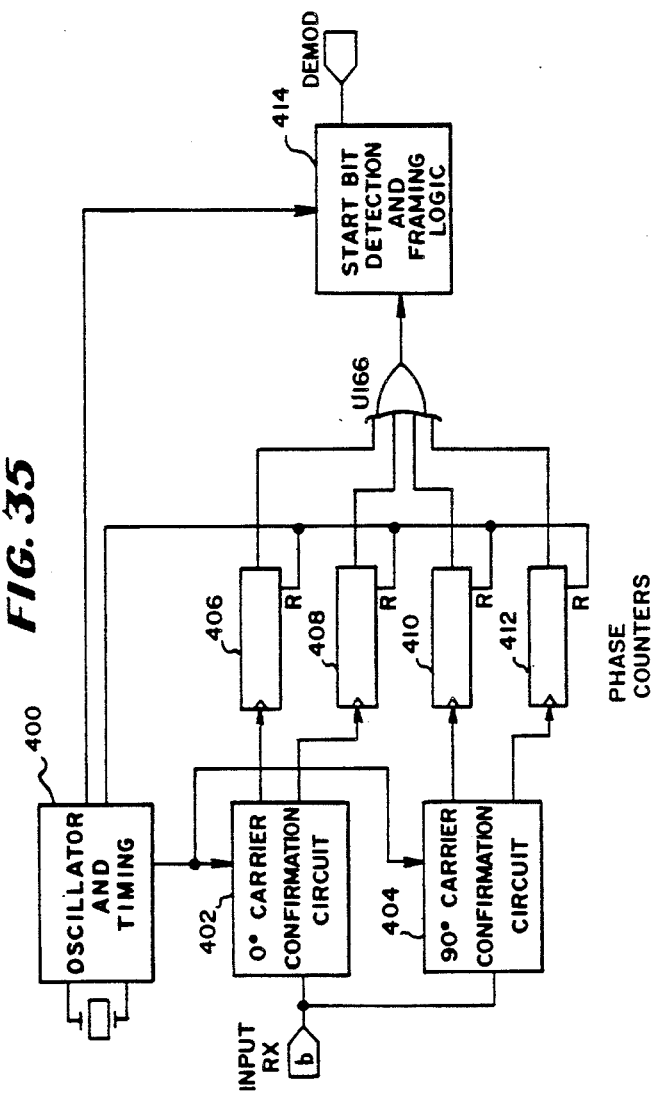
FIG. 35 is a block diagram of the digital demodulator used in the digital IC of the disclosed communication system.

Referring first to the block diagram of the digital demodulator 150 shown in FIG. 35, an oscillator and timing subsystem 400 is employed to provide all of the timing signals and strobes for the other portions of the demodulator 150. A 3.6864 MHz ±0.015% oscillator is employed to drive these timing circuits. The carrier input signal which is amplified and limited in the coupling network 90 and is applied to the RX input terminal of the device 80, is inputted to a pair of carrier confirmation circuits 402 and 404, these circuits working 90° out of phase with respect to each other. Each of the carrier confirmation circuits 402 and 404 examines the input signal and determines if it is within an acceptable band of frequencies centered about the carrier. This is done on a cycle by cycle basis. Each carrier confirmation circuit has two outputs. One output produces a pulse if the signal is within the pass band and the sampled phase of the input signal is a logic 1. The other produces a pulse if the signal is within the pass band and the sampled phase of the input signal is a logic 0. The four outputs of the carrier confirmation circuits 402 and 404 are used as clock inputs to a series of four phase counters 406, 408, 410, 412 which are reset every 1–6th of a bit. At 300 baud each bit contains 384 cycles of the 115.2 kHz carrier. Therefore, a sixth of a bit contains 64 carrier cycles. Should any one of the phase counters 406–412 count up to 48 or more, thereby indicating phase coherence over three fourths of the sixth bit interval, a logic 1 is produced at the output of a four input OR gate U166, the four inputs of which are the outputs of the phase counter 406–412.

The output of the OR gate U166 is connected to the start bit detection and framing logic indicated generally at 414. Considered generally, the first logic 1 input to the circuit 414 triggers the start bit detector. The start bit detector then releases the reset on a counter and increments it at intervals of one sixth of a bit. This counter then counts 11 more sixth bit intervals. At the end of each sixth bit interval the output of the OR gate U166 is strobed and causes this same counter to increment if it is a logic 1. At the end of the 12th interval, the counter is examined. If the counter contents are 8 or more, two valid start bits are assumed. The counter then resets and six one-sixth bit intervals are counted off. At the end of each interval again the output of the OR gate U166 is strobed and increments the counter if it is a logic 1. The counter is examined at the end of each six one-sixth bit intervals. If the counter indicates 4 or more a demodulated logic 1 is provided on the demode output line. If the counter indicates less than 4 a logic zero is demodulated. This process is repeated 30 more times to yield a complete word of 32 bits (including the two start bits). If in the beginning the counter does not count up to eight over a two bit interval, the start bit logic 414 resets itself and looks for the next logic 1 out of the OR gate U166.

Figure 36:
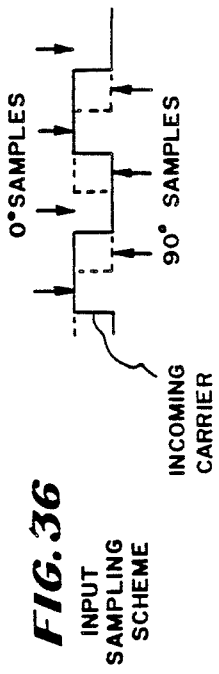
FIG. 36 is a timing diagram of the operation of the carrier confirmation portion of the digital demodulator of FIG. 35.

Considering now in more detail the carrier confirmation circuits 402 and 404, each of these circuit samples the carrier input at twice the carrier frequency of 115.2 kHz. The only difference between the two circuits is in the phase of the sampling, the circuit 402 sampling 90° out of phase with respect to circuit 404. Referring to FIG. 36, the 0° strobe samples of the carrier confirmation circuit 402 are indicated by the downwardly directed arrows relative to the incoming carrier and the 90° strobe samples of the carrier confirmation circuit 402 are indicated by the upwardly directed arrows. It can be seen from FIG. 36 that because of the quadrature sampling of the circuits 402 and 404 the uncertainty of sampling the carrier input signal around its edges is eliminated because if one of the circuits 402 or 404 is sampling the carrier signal in the area of transition from high to low the other circuit is sampling the carrier signal in the middle of the square wave carrier input. Accordingly, by simultaneously counting the outputs of both of the carrier confirmation circuits 402 and 404 one can be sure that one of them is sampling the incoming carrier square wave signal away from its edges.

Each of the circuits 402 and 404 stores its three most recent samples, each sample representing a half cycle strobe of the incoming carrier. After every other sample the circuit will produce a pulse on one of two outputs provided the three stereo samples form a one-zero-one or a zero-one-zero pattern. The pulse will appear at one output if the most recent sample is a logic 1 and will appear at the other if the most recent sample is a logic 0. It can thus be seen that an output pulse will occur on one output on each of the circuits 402 or 404 every 8.68 microseconds should the alternating pattern of half cycle samples continue. By requiring 3 consecutive samples of the input to be opposite in phase, the demodulator 150 places a more strict criterion on acceptance of an input as the valid carrier signal than would a circuit which looks only at the two most recent half cycle samples. This technique of requiring three consecutive samples of the input to be opposite in phase has been found to be very effective in rejecting noise in the intervals with no signal present and the carrier confirmation circuits 402 and 404 are effective in rejecting all frequencies except the odd harmonic multiples of the carrier frequency.

Figure 18A:
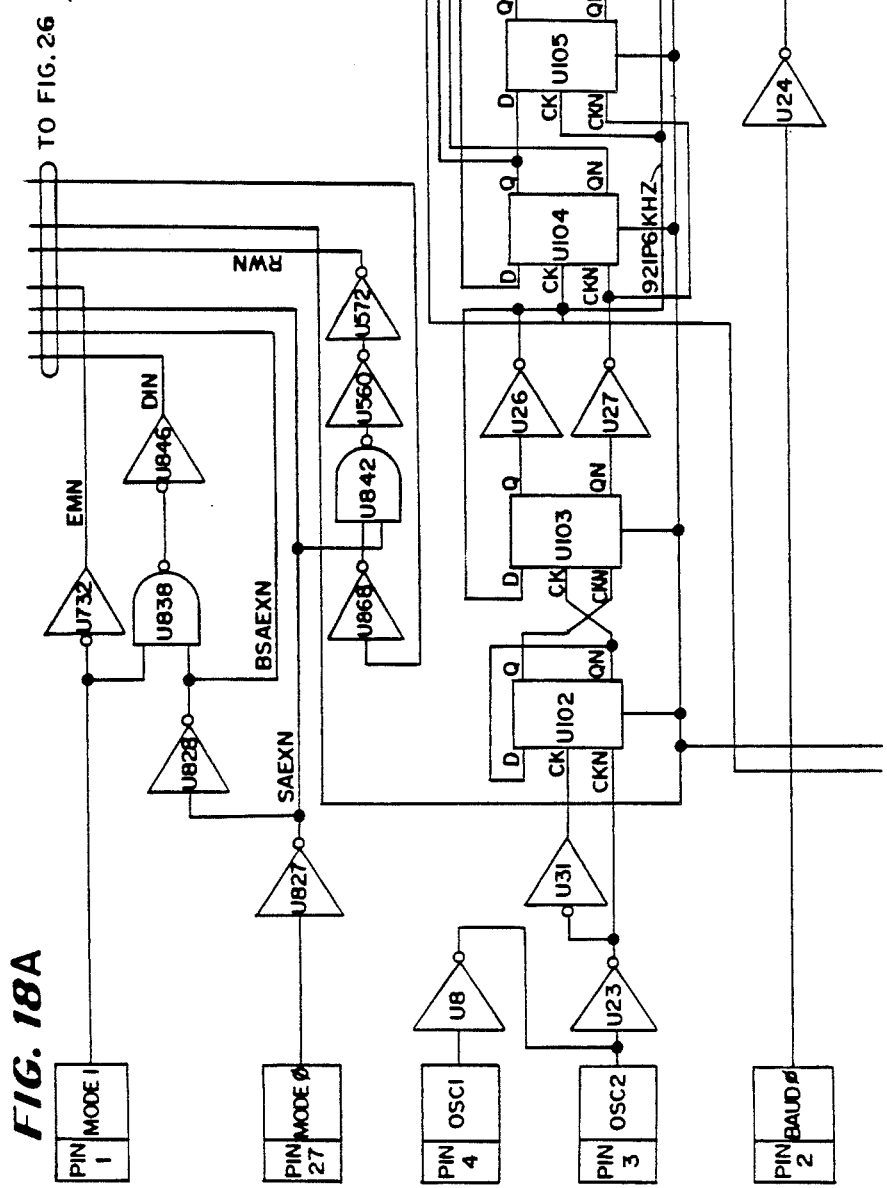
Figure 18B:
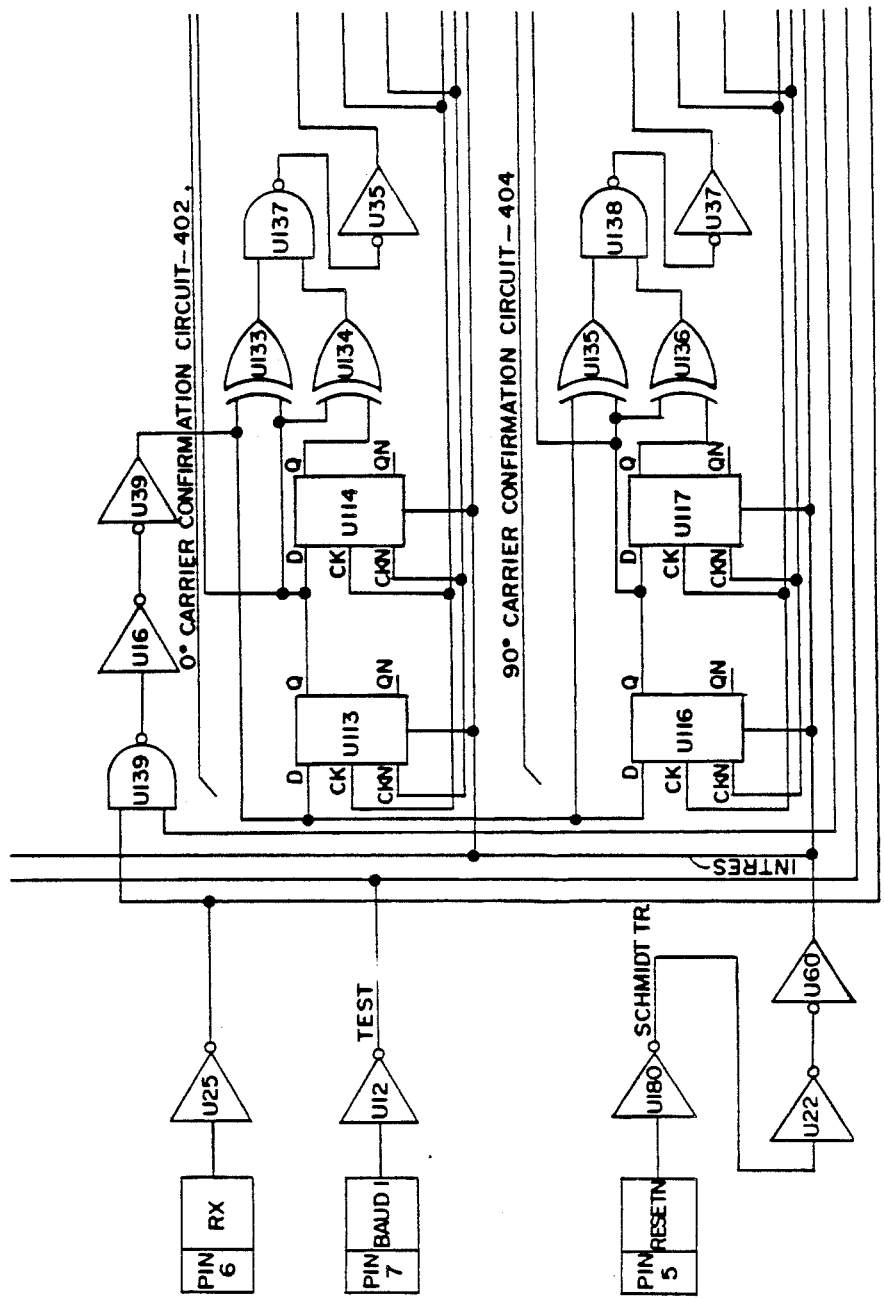
Figure 19A:
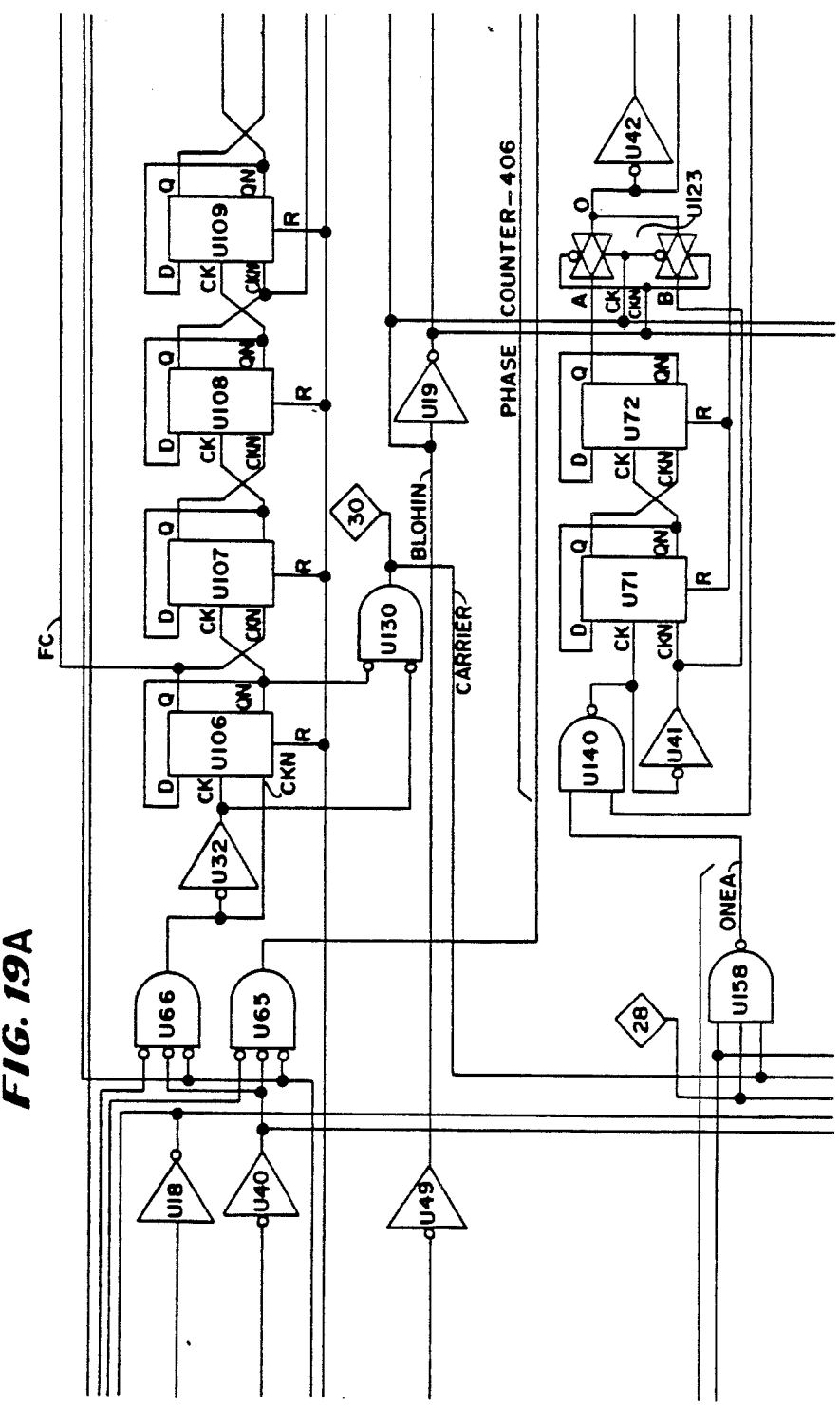
Figure 19B:
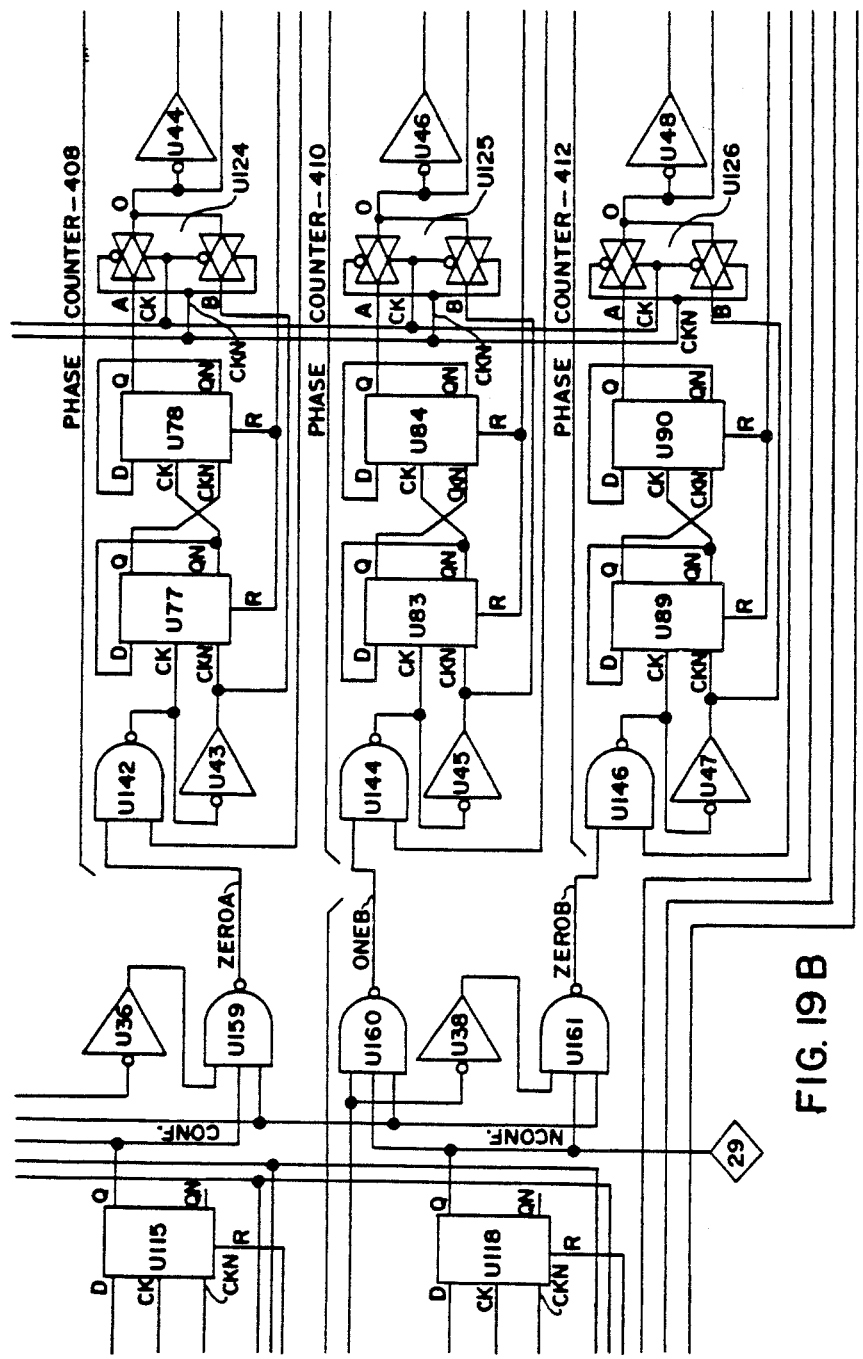
Figure 20A:
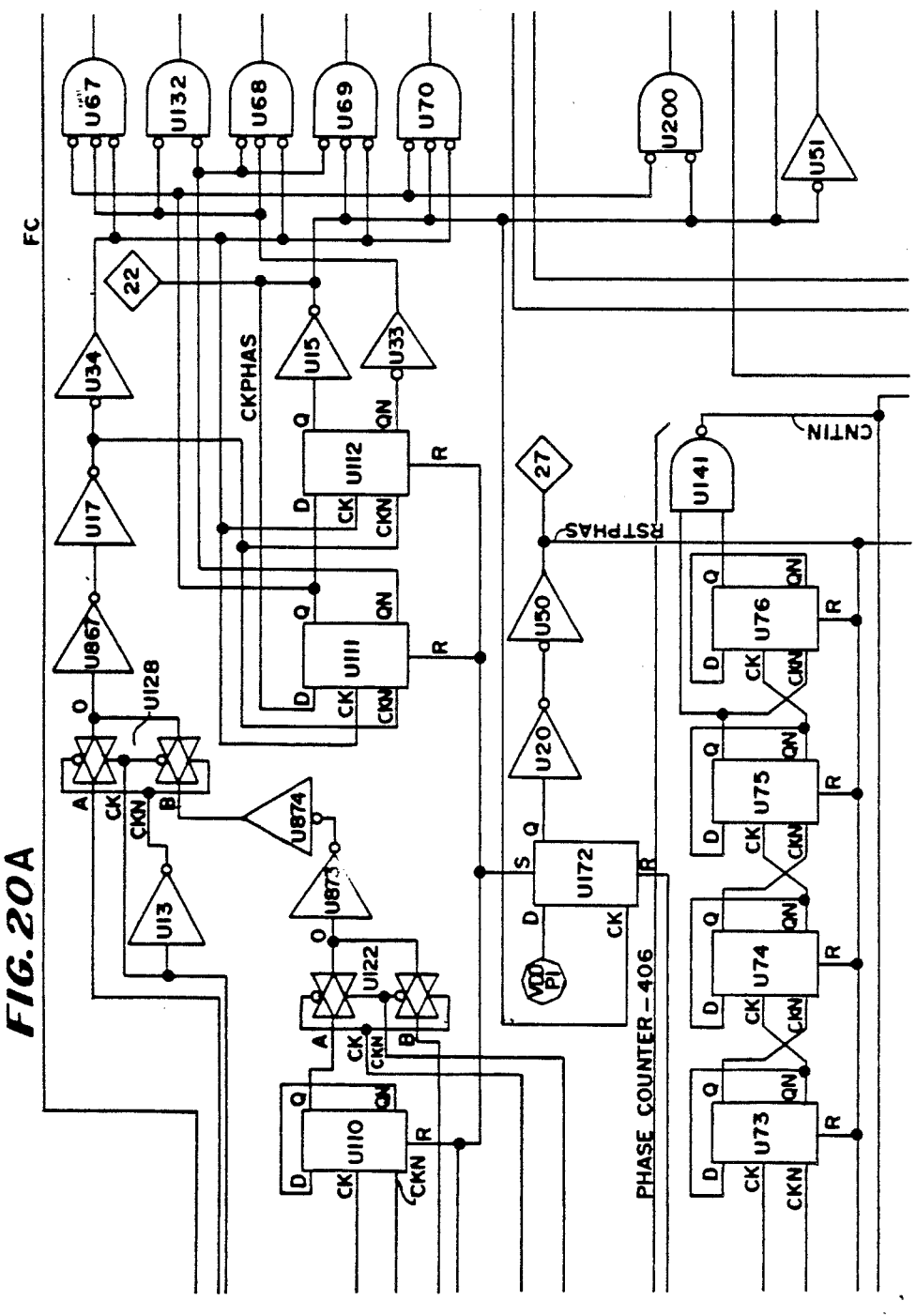
Figure 20B:
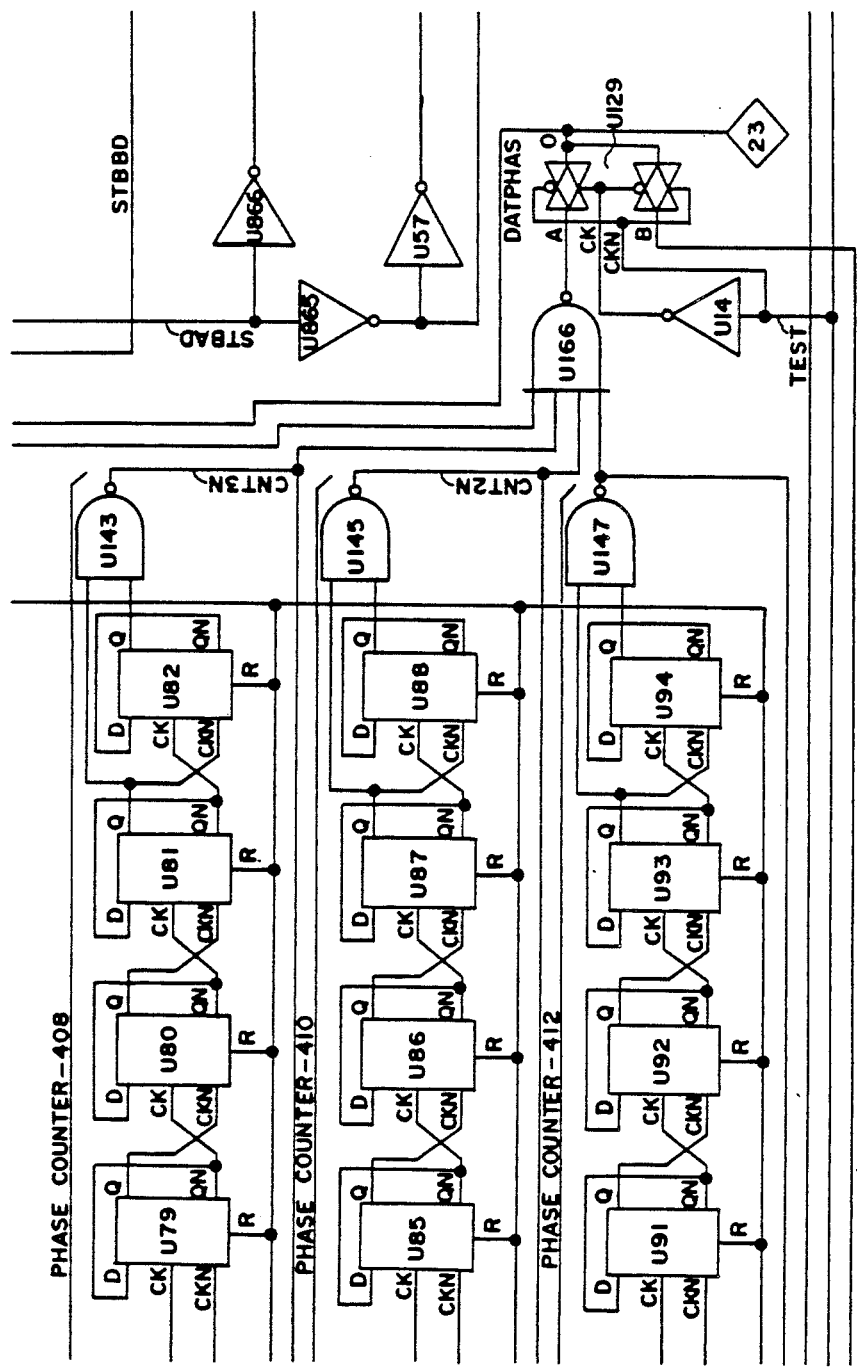
Figure 21A:
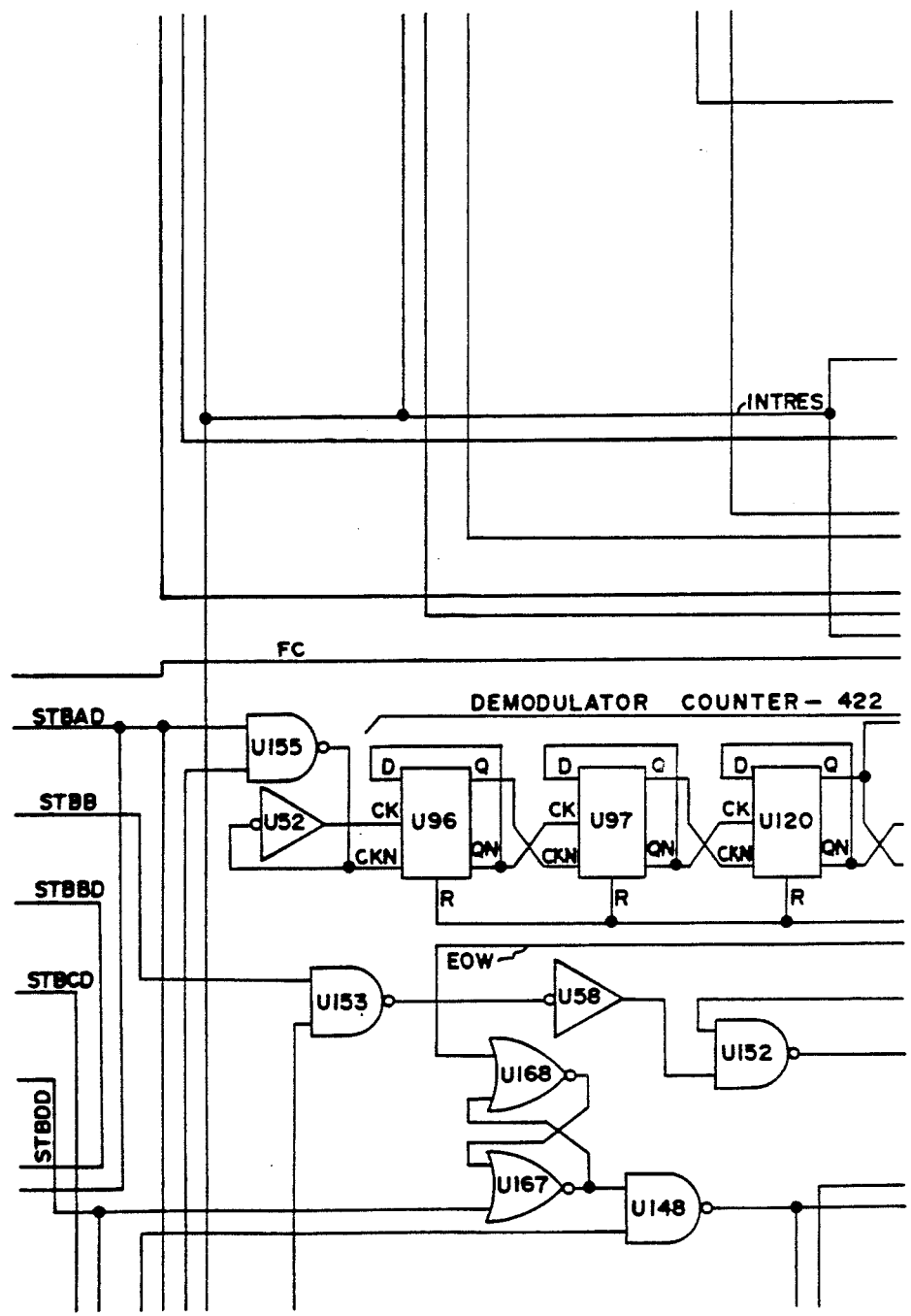
Figure 21B:
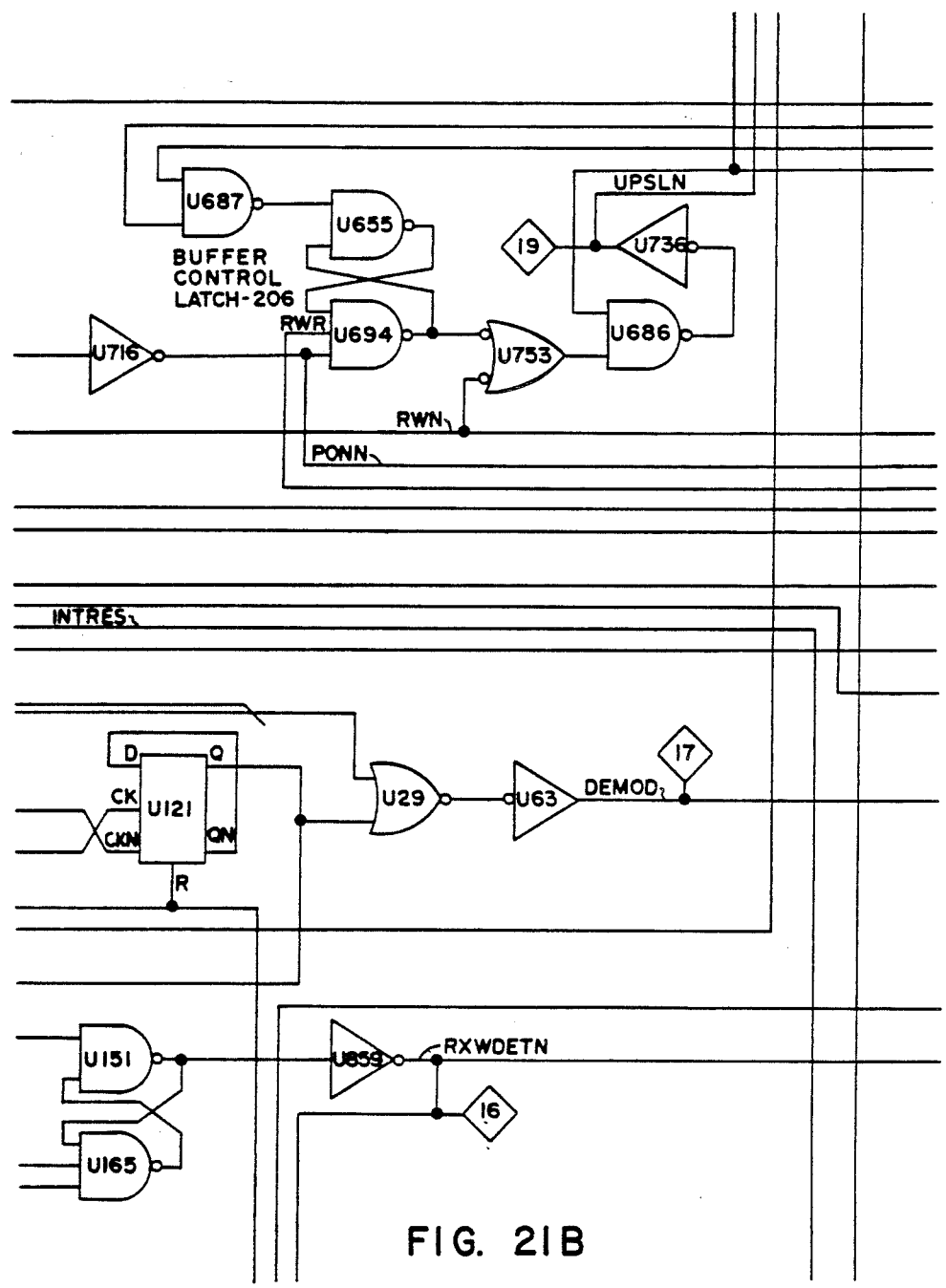
Figure 22A:
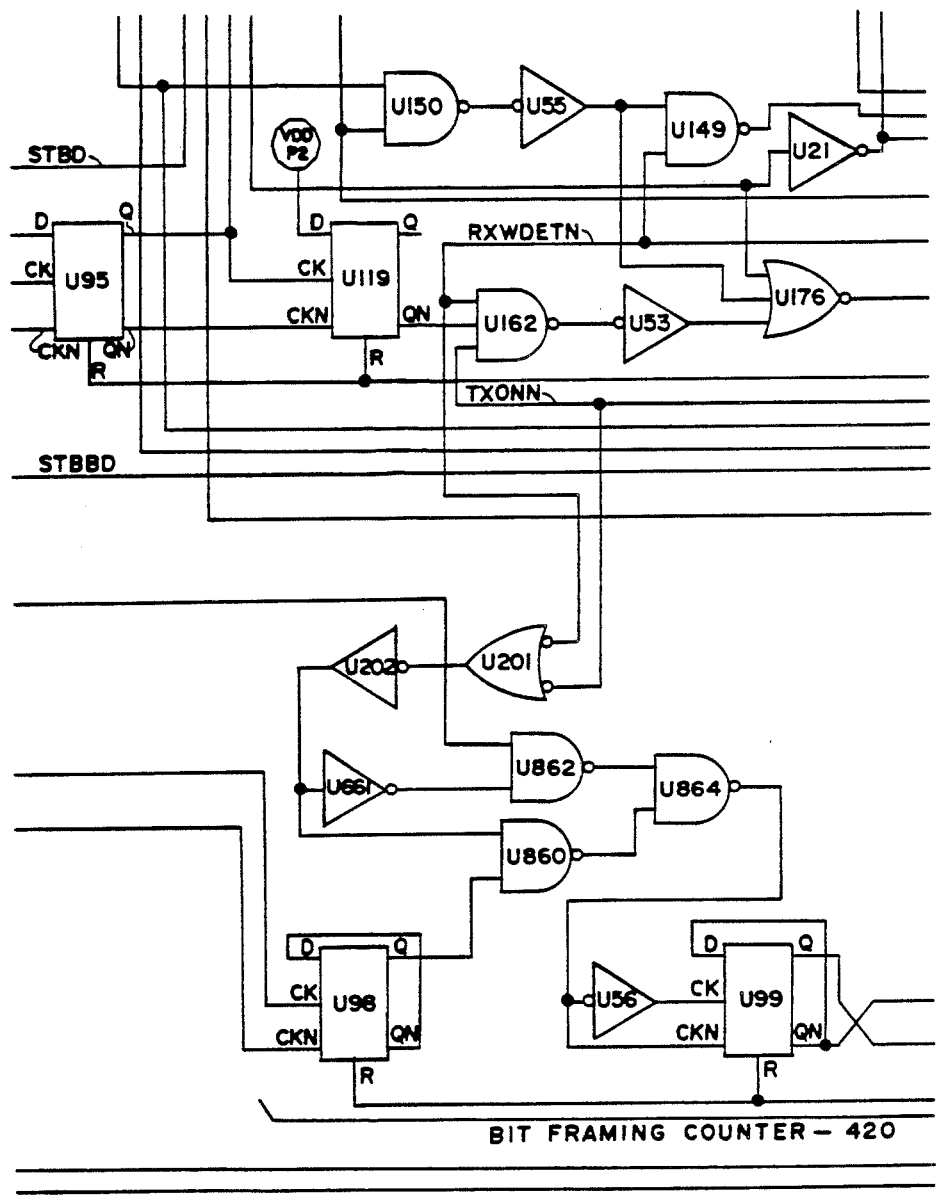
Figure 22B:
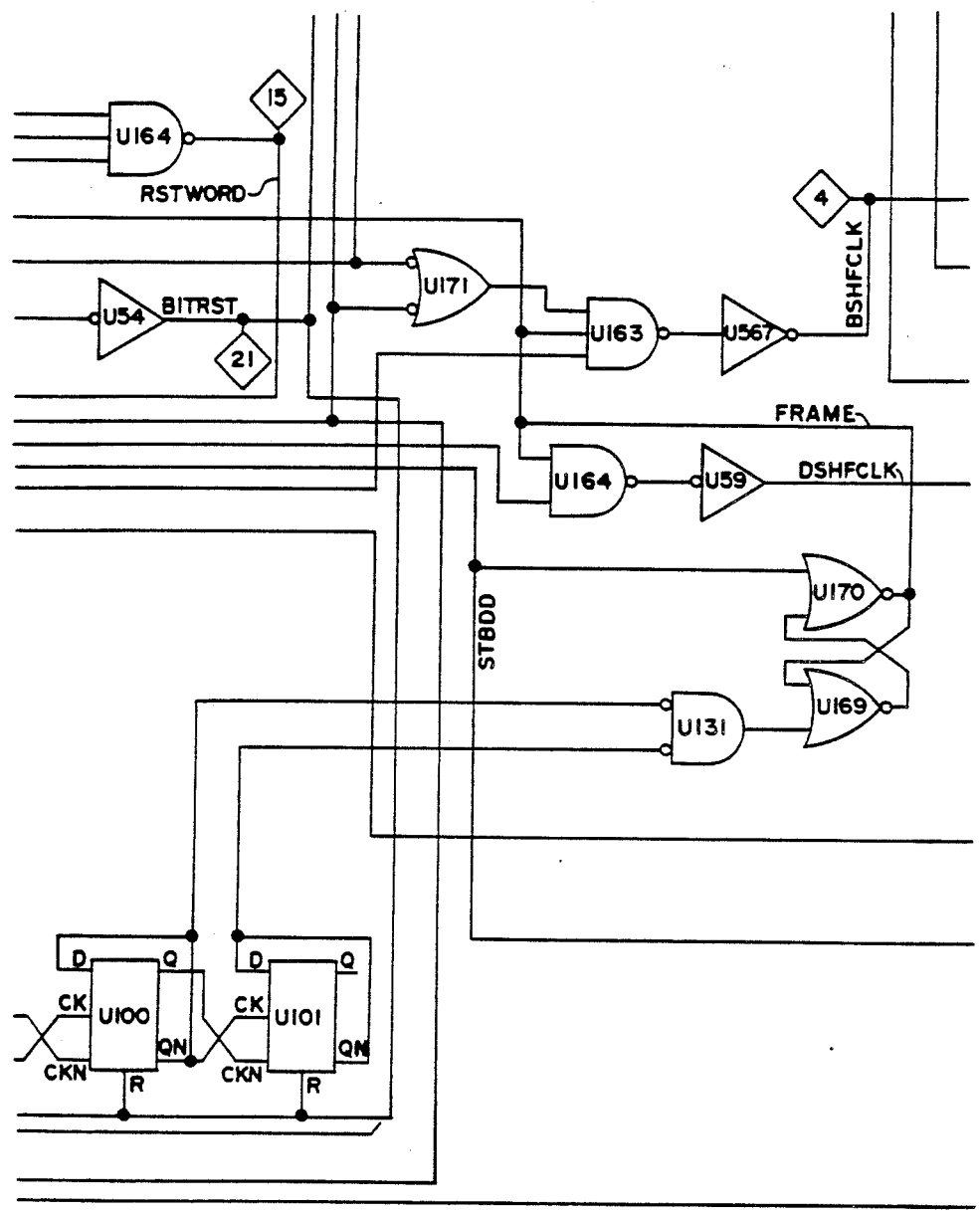
Figure 23A:
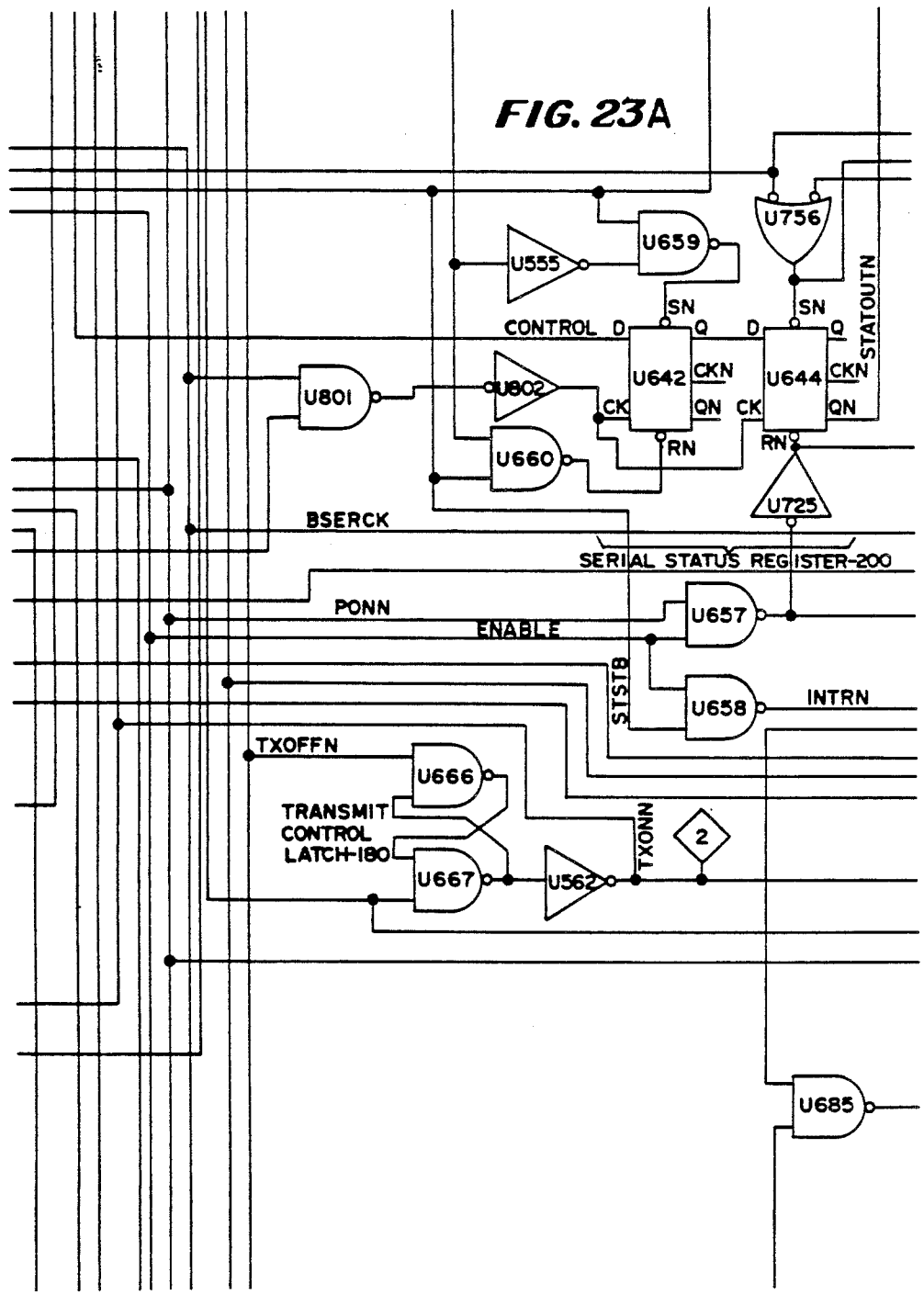
Figure 23B:
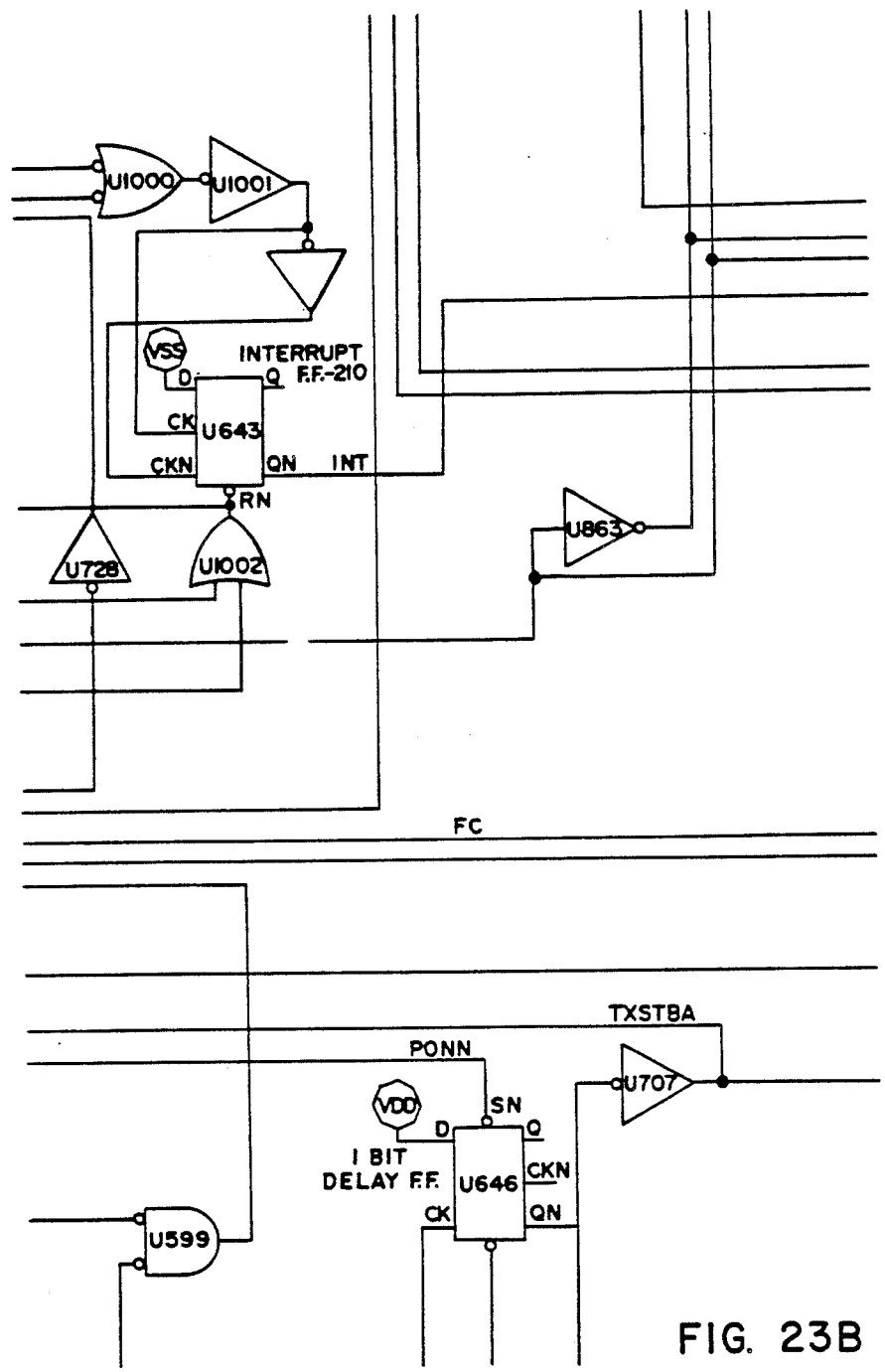
Figure 24A:
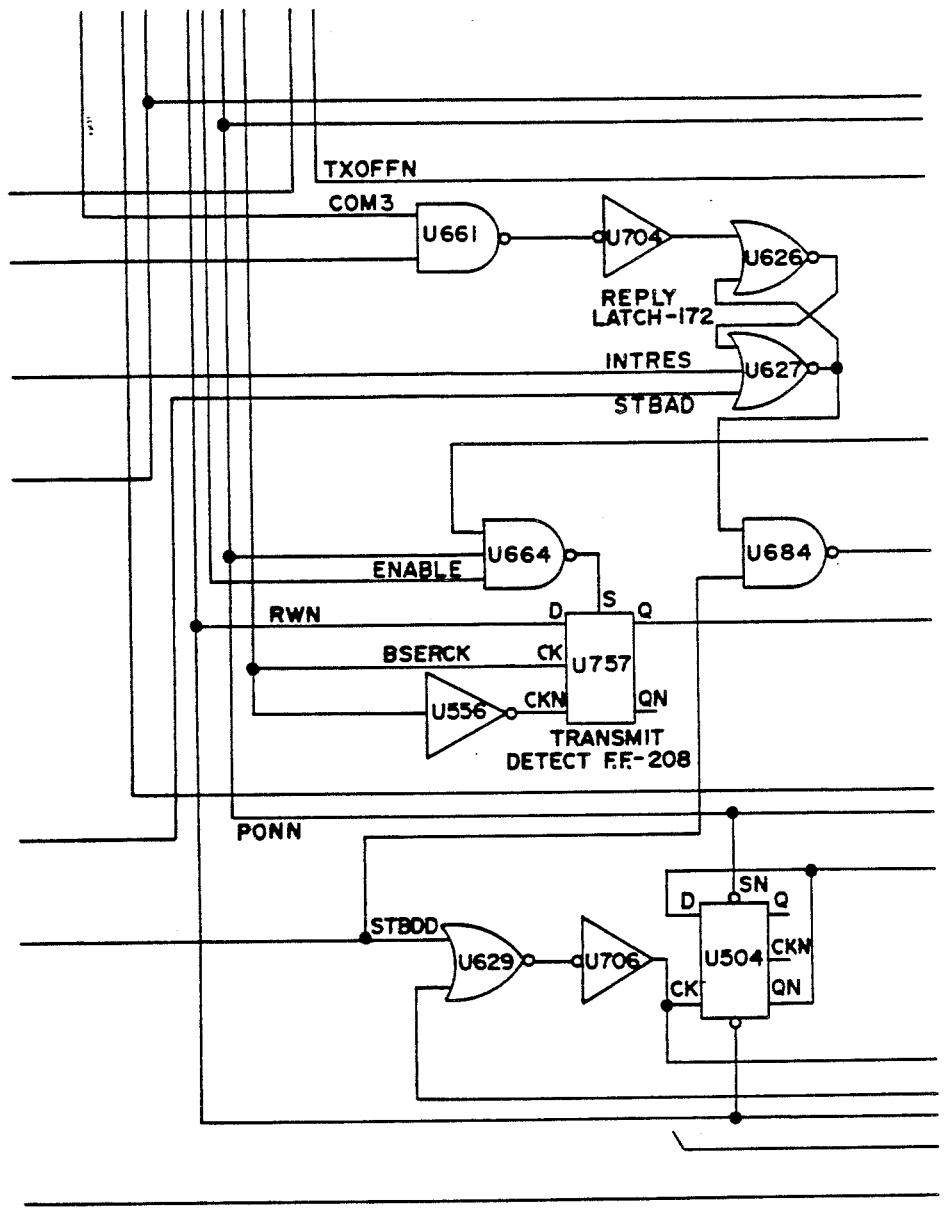
Figure 24B:
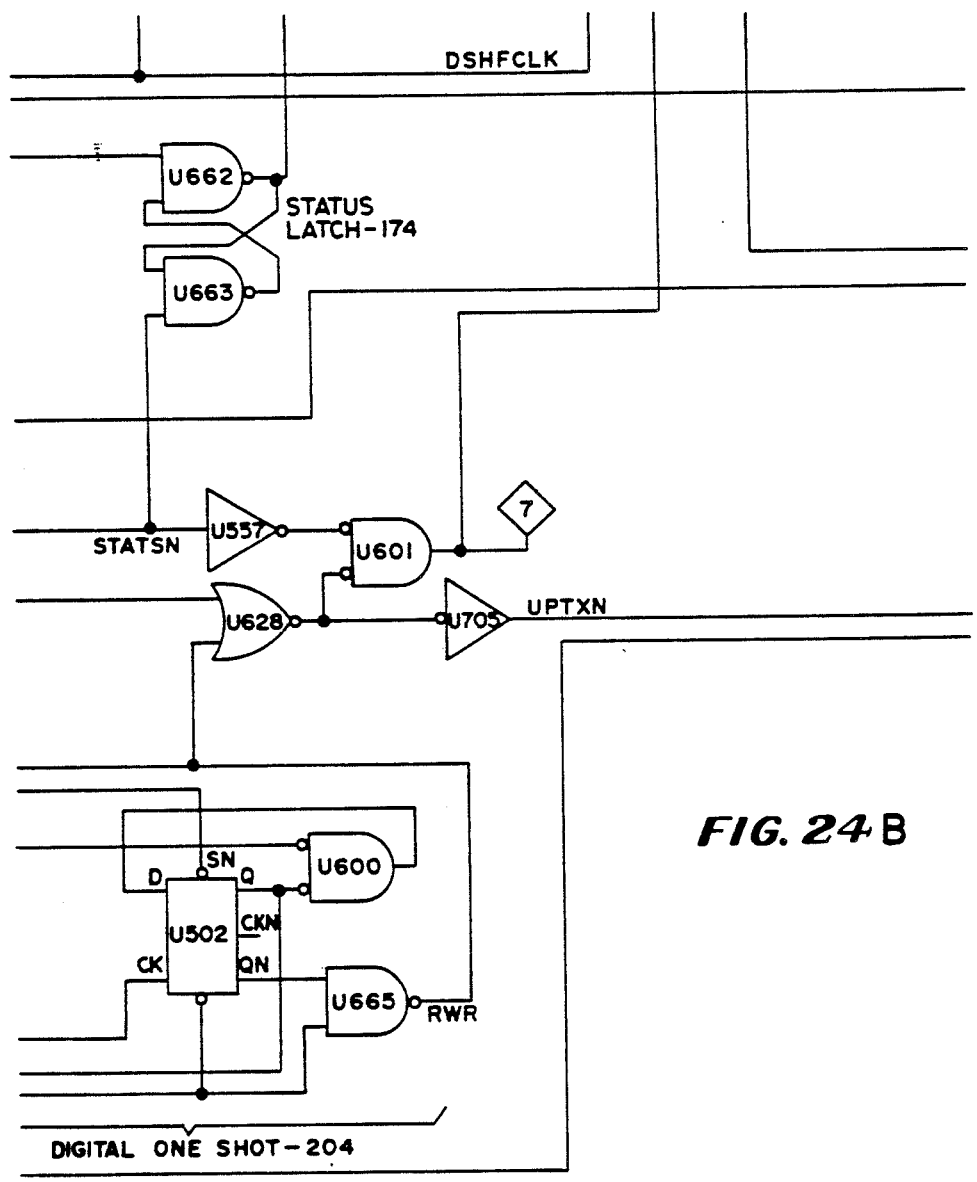
Figure 25A:
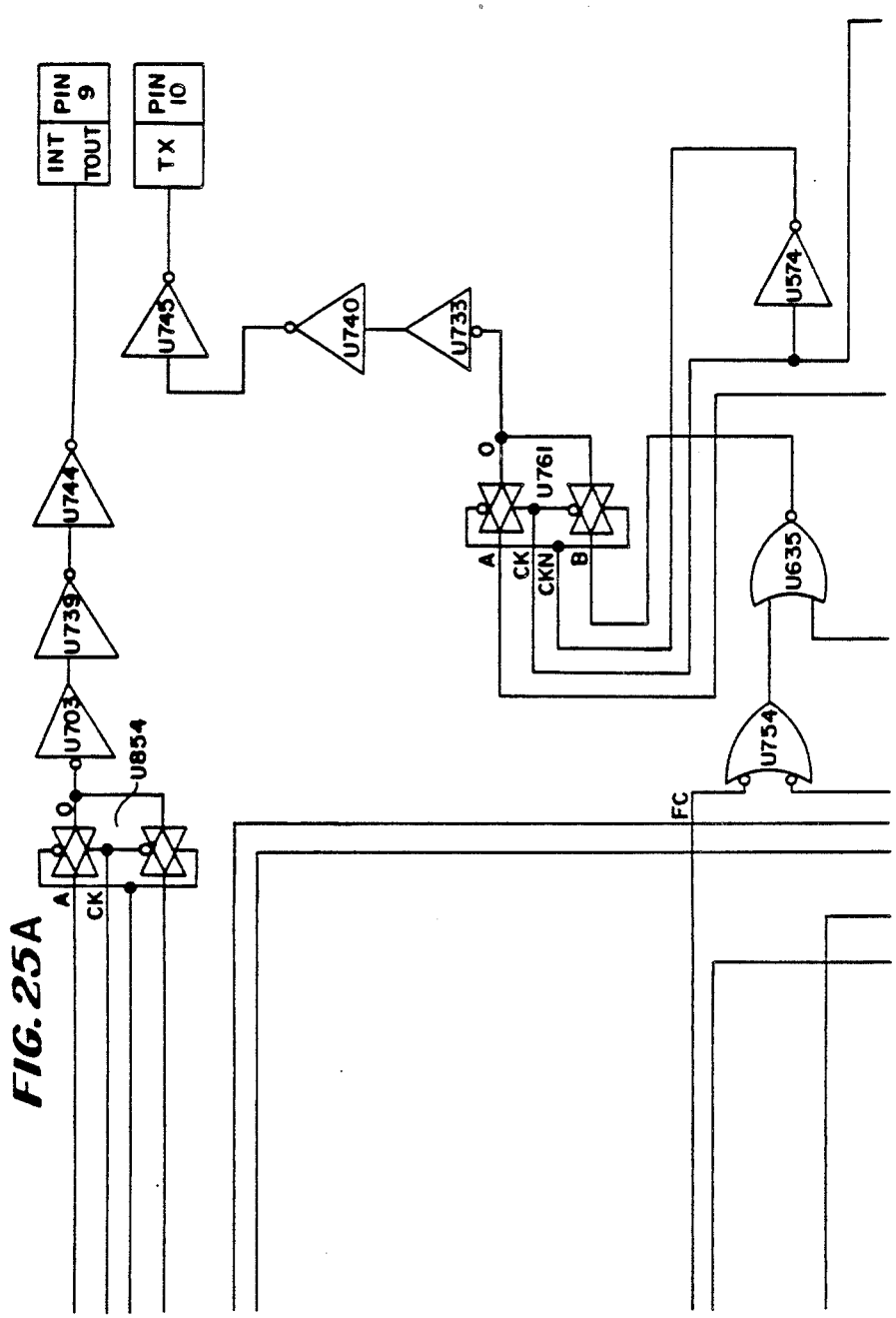
Figure 25B:
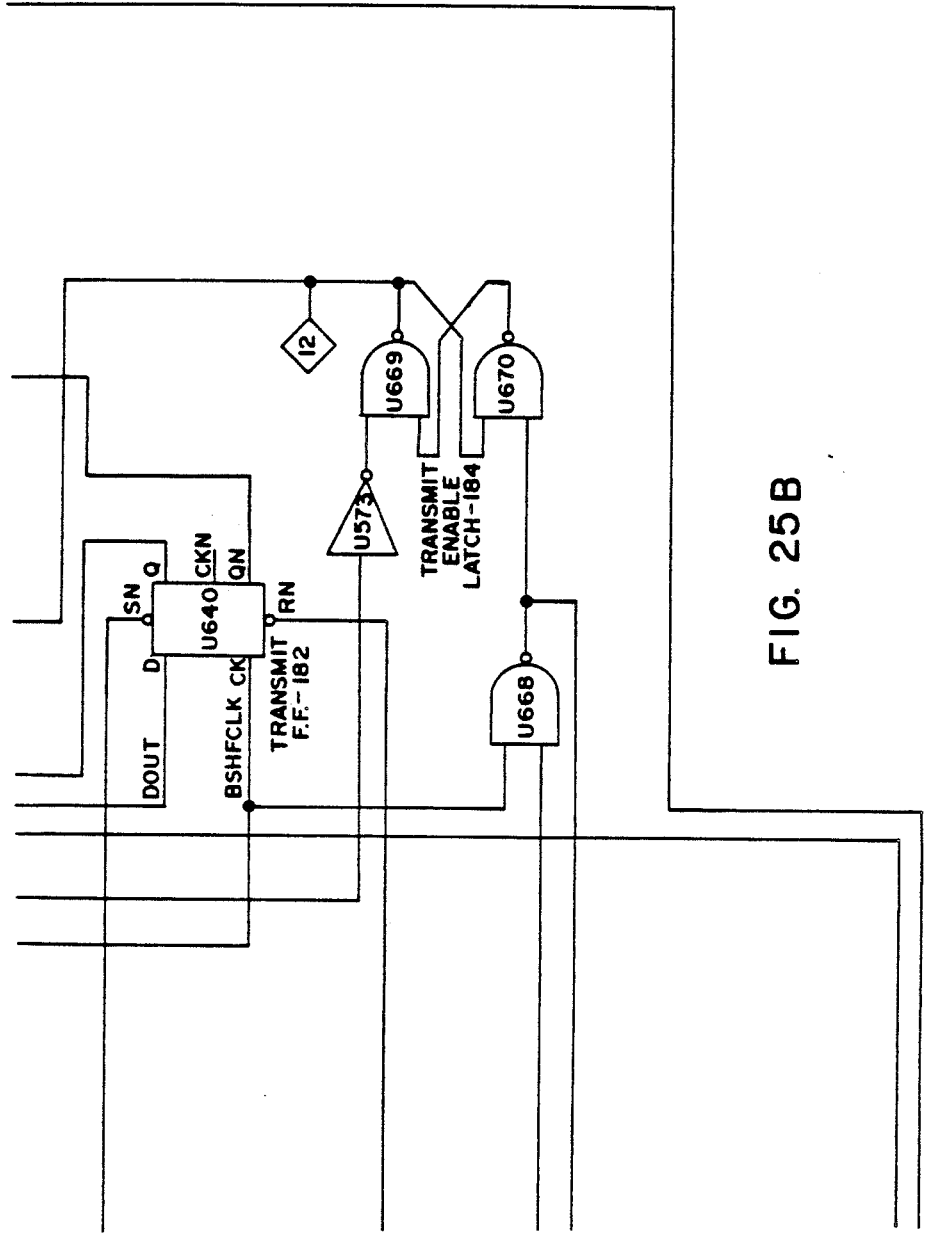
Figure 26A:
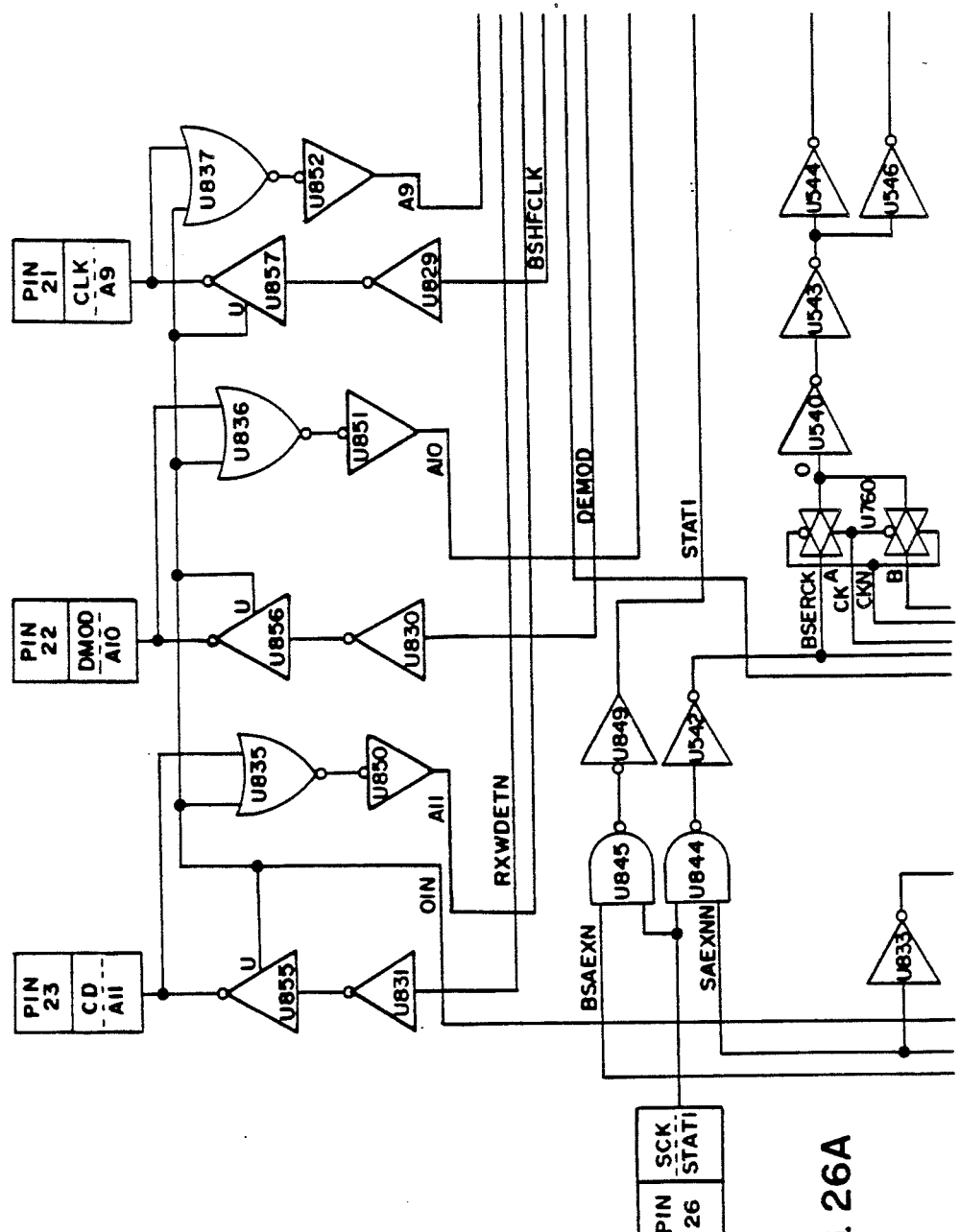
Figure 26B:
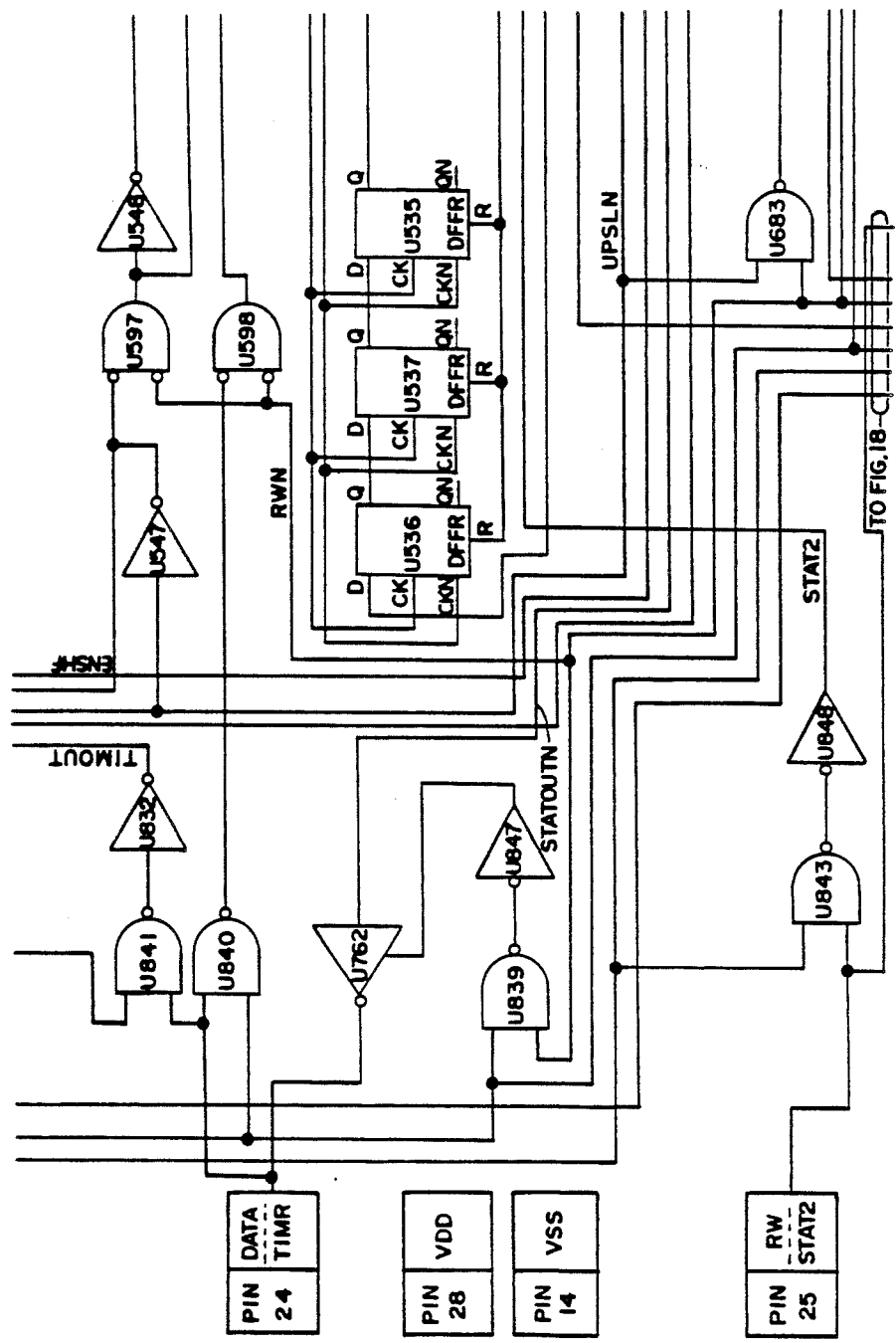

Considering now the details of the carrier confirmation circuits 402 and 404, and referring to FIGS. 18 and 19 wherein these circuits are shown in the detailed schematic diagram of the device 80, the 3.6864 MHz oscillator signal which is developed by the crystal oscillator connected to pins 3 and 4 of the device 80 is divided down in the divider stages U102 and U103 so as to provide a 921.6 kHz signal which is used to clock a two stage Johnson counter comprising the stages U104 U105. The Q and QN outputs of the stage U105 comprise oppositely phased square waves of a frequency twice the carrier frequency of 115.2 kHz. These outputs are supplied through the inverters U18 and U40 to act as clock signals for the carrier confirmation circuits 402 and 404. However, the circuit 402 is clocked when U18 goes positive and U40 goes negative whereas the circuit 404 is clocked when U18 goes negative and U40 goes positive so that the circuits 402 and 404 strobe the incoming carrier 90° apart on the carrier wave.

In order to provide a circuit which stores the 3 most recent samples of the incoming carrier a two stage shift register is clocked at twice carrier frequency. Thus, considering the carrier confirmation circuit 402, the shift register stages U113 and U114 are clocked at twice the carrier frequency, as described heretofore, the output of each stage being exclusively ORed with its input by means of the exclusive OR gates U133 and U134, respectively. The exclusive-OR outputs of the gates 133 and 134 are anded in the NAND gate U137 the output of which is inverted in the inverter U35 and applied to the D input of a register stage U115. The incoming carrier on the RX pin 6 is applied through the inverter U25, the NAND gate U139, and the inverters U16 and U39 to the D input of the first register stage U113. The other input of the NAND gate U139 is controlled by the TXONN signal so that no carrier input is supplied to the carrier confirmation circuits 402 and 404 while the device 80 is transmitting.

Assuming that a one-zero-one pattern exists on the D input to shift register stage 113, the Q output of this stage and the Q output of register stage U114, this means that the past sample, which is zero, is stored in U113 and the sample before that, which is a one, is stored in U114. However, the present sample on the D input of U113 has not yet been stereo. Under these conditions, the outputs of the exclusive OR gates U133 and U134 will be one, the output of the NAND gate U137 will be a zero which is inverted and applied to the D input of the register stage U115. On the next clock pulse the Q output of U115 will be a one. If, at the time of this clock pulse the D input to U113 remains a one, this one is clocked into U113 so that its Q output is a one which represents the stored present sample at the time of this clock pulse. The Q output of the stage U115 is supplied as one input to the NAND gates U158 and U159 and the Q output of the stage U113 is supplied directly as another input to the NAND gate U158 and through the inverter U36 as another input of the NAND gate U159.

A strobe signal occurring at carrier frequency is applied as a third input to the NAND gates U158 and U159. More particularly, the stages of the Johnson counter U104 and U105 are combined in the NOR gates U66 and U65 to provide twice carrier frequency signals which are applied to a ripple counter comprising the stages U106-U110. The input and output of the first stage U106 is combined in NOR gate U130 to provide a strobe at carrier frequency for the NAND gates U158 and U159. In this connection it will be noted that the Q output of the stage 115 is always a 1 irrespective of the 101 or 010 patterns set up at the inputs and outputs of the stages U113 and U114. However, the Q output of the stage U113 is supplied directly to the NAND gate U158 and through the inverter 136 to the NAND gate U159. Accordingly, only one of these NAND gates will be enabled depending upon the condition of the Q output of the stage U113. When this output is a 0 the NAND gate U159 will produce a pulse on the ZEROA output line whereas when the Q output of the stage U113 is a one the NAND gate U158 will produce a pulse on the ONEA output line.

It will thus be seen that the pulse on either the ONEA output or the ZEROA output of the carrier confirmation circuit 402 means that over the relatively short term of one and a half carrier cycles the input carrier is generally in phase with the timing signals established in the device 80 through the crystal oscillator 102. The term generally is used because a given pattern may continue to be produced even though the incoming carrier shifts in phase by a substantial amount, as shown by the dotted line in FIG. 36. If the same pattern continues, thus indicating that the incoming signal continues to be in phase with the timing circuits of the device 80, an output will continue to be produced on either the ONEA output or the ZEROA output of the circuit 402 each carrier cycle.

The carrier confirmation circuit 404 operates substantially identically to the circuit 402 except that it is clocked opposite to 402 so that the incoming carrier signal is strobed at a 90° point relative to the carrier confirmation circuit 402. Thus, if the circuit 402 is strobing the incoming carrier near the edges of the carrier, and hence may not give a reliable 101 or 010 pattern, the carrier confirmation circuit 404 will be strobing the incoming carrier midway between its edges so that a reliable pattern is obtained by the circuit 404.

As described generally heretofore, the phase counters 406-412 are employed separately to count the number of pulses developed on the four outputs of the confirmation circuits 402 and 404 during a time interval equal to 1/6th of a bit. If any of these counters reaches a count of 48 during the 64 carrier cycles which occur during a 1/6th bit interval at 300 baud, or 12 out of 16 at 1200 baud, it is assumed that a valid carrier signal existed for that 1/6th bit interval and an output is supplied to the OR gate U166. More particularly, referring to FIGS. 19 and 20 wherein the counters 406-412 are shown in detail, and considering the phase counter 406, the ONEA output of the carrier confirmation circuit 402 is supplied through the NAND gate U140 as the clock and notclock input to a ripple counter comprising the stages U71-U76. At 300 baud, when the counter 406 reaches a count of 48 the Q outputs of the "16" stage U75 and the "32" stage U76 are combined in the NAND gate U141 the zero output of which is supplied to the NAND gate U166 which ORs the zeroes outputted by the counters 406-412 and corresponds to the OR gate U166 of FIG. 26. When the counter 406 reaches a count of 48 the output of the NAND gate U141 is supplied back to the other input of the NAND gate U140 to disable the input of the counter 406 during the remainder of the 1/6th bit interval. In a similar manner, the phase counter 408 counts the pulses developed on the ZEROA output of the carrier confirmation circuit 402, the phase counter 410 counts the pulses on the ONEB output of the carrier confirmation circuit 404 and the phase counter 412 counts the pulses on the ZEROB output of the circuit 404.

The digital demodulator 150 is thus capable of receiving a transmitted message even though the received carrier signal drifts continuously by a substantial amount throughout a received message transmitted at 300 baud. This is achieved by providing the phase counting channels 406-412 all of which only counts over an interval of one sixth bit. The received message may drift sufficiently relative to one of these channels during one sixth of a bit to alter the 101 or 010 pattern of one of the carrier confirmation circuits 402 or 404 but the other will not have the pattern altered over this interval. Thus, referring to FIG. 36, if the received carrier drifts to the left by a substantial amount as indicated by the dotted line in FIG. 36, the 101 pattern of the 0° samples will not change but the 90° sample pattern changes from 101 to 010 by virtue of this carrier drift. The 0° samples will thus give a valid one sixth bit count with this amount of carrier drift even though the 90° samples will not. By ORing the outputs of all of the phase connectors 406-412 several one sixth bit intervals may be successively counted through different phase counters and thereby accommodate substantial drift in either direction between the received carrier and the sampling strobes developed in the demodulator 150. As a result, the 33 bit received message may be demodulated without the use of a phase lock loop or other synchronizing circuit and even though the crystal oscillators at the central controller and the remote station are operating asynchronously and at slightly different frequencies.

As discussed generally heretofore the phase counters 406-412 also count the phase coherences of the carrier confirmation circuits 402 and 404 over only a 1/6th bit interval so as to avoid any phase disturbances which may be produced on the power line used as the network transmission medium. Accordingly, the phase counters 406-412 are reset after each 1/6th bit interval. More particularly, the output of the ripple counter U006-110, the input of which is clocked at twice carrier frequency, is supplied through the switch U122, the inverters U873 and 874, the switch U128 and the inverters U867 and U17 to a two stage Johnson counter comprising the stages U111 and U112. The output of this counter is a signal at 1/64th carrier frequency which is equal to a 1/6th bit interval at a 300 baud rate. Accordingly, the output of the inverter U15, which is connected to the Q output of the stage U112, is employed to reset the phase counters 406-412. More particularly, the output of the inverter U15 is supplied as a clock input to the flip flop U172 the D input of which is connected to the +5 V supply. The Q output of the stage U172 is coupled through the inverters U20 and U50 to the RSTPHAS line (reset phase counters) and resets all of the phase counters 406-412. The stage U172 is reset by the output of the NOR gate U65 which is delayed with respect to the output of the NOR gate U66 which controls the ripple counter U106-U110.

Figure 37:
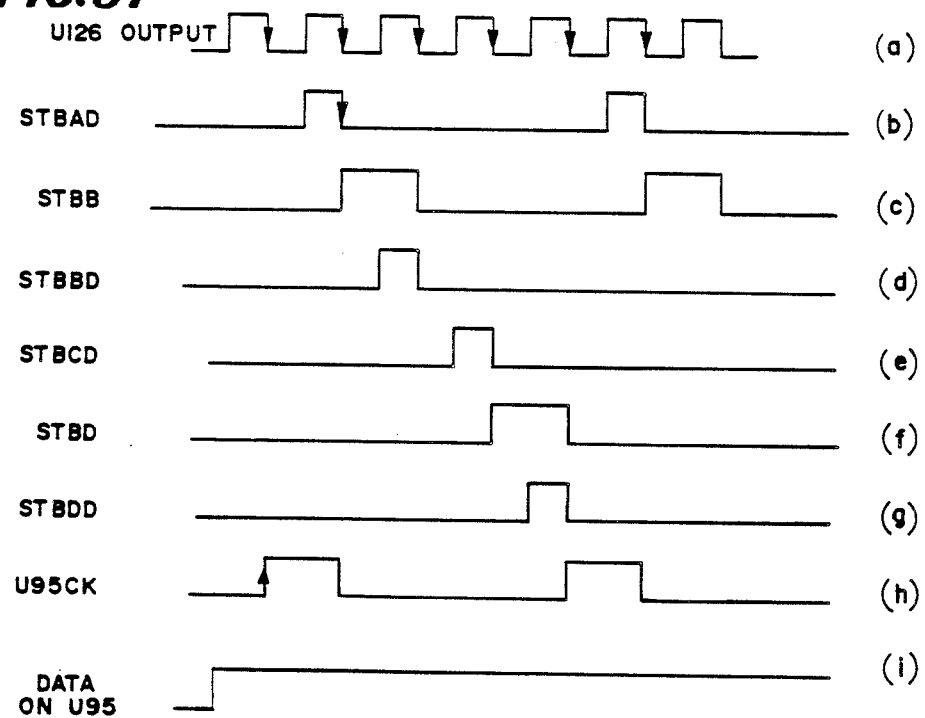
FIG. 37 a series of timing waveforms and strobe signals employed in the start bit detection and timing logic of the digital IC of the disclosed communication system.

Considering now in more detail the start bit detection and framing logic portion of the demodulator 150, the Johnson counter comprising the stages U111 and U112 is employed to develop a number of timing signals which are employed in the start bit detection and framing logic circuits. More particularly, the inputs and outputs of the stages U111 and U112 are combined in a series of NOR gates U67-U70, U132 and U200 to provide a number of strobe signals. The nomenclature and timing of these strobe signals is shown in FIG. 37 wherein the waveform 37(a) is the output of the switch U128 which occurs at 24 times bit rate at 300 baud. The output of the NOR gate U67 is identified as STBAD and is shown in FIG. 37(b). The output of the NOR gate U132, identified as STBB, shown in FIG. 37(c). The output of the NOR gate U68, identified as STBBD, is shown in FIG. 37(d). The output of the NOR gate U69, identified as STBCD is shown in FIG. 37(e). The output of the NOR gate U200, identified as STBD, is shown in FIG. 37(f) and the output of the NOR gate U70, identified as STBDD, is shown in FIG. 37(g).

Should one of the phase counters 406-412 counts to 48 during a 1/6th bit interval and the OR gate U166 produces an output, a bit framing counter 420 (FIG. 22) has its reset released and is incremented by one. The bit framing counter 420 is initially set to count 12 1/6th bit intervals to provide a frame of reference to determine whether the incoming signal comprises two start bits both having logic "1" values. At the same time a demodulator counter 422 (FIG. 21) is employed to count the number of outputs produced by the OR gate U166 from any of the phase counters 406-412 during the two bit interval established by the bit framing counter 420. If the demodulator counter 422 counts to 8 or more during this two bit interval a valid start bit is assumed. On the other hand, if the counter 422 has a count of less than 8 when the counter 420 has counted to 12 the framing logic is reset and waits for the next logic 1 out of the OR gate U166. More particularly, when the OR gate U166 produces an output it is supplied through the switch U129 to the D input of the flip flop U95 (FIG. 22) which is clocked by the output of the Johnson counter stage U112 near the end of each 1/6th bit interval. When the flip flop U95 goes high it clocks a flip flop U119 the D input of which is connected to the +5 V supply so that the QN output of U119 goes low. This output, through the NAND gate U162, the inverter U53, the NOR gate U176 and the inverter U54, controls the bit reset line (BITRST) so that the reset on both of the counters 420 and 422 is released. Also, the bit framing counter 420 is incremented by 1 by means of the STBAD pulse (FIG. 37(b)) which is supplied through the inverter U865 to clock the first stag U98 of the counter 420. Also, when U95 goes high it is anded with the STBAD pulse in the NAND gate U155 which increments the demodulator counter 422 by 1.

When the bit framing counter 420 has counted to 12, which occurs two bit intervals later, the "4" and "8" output stages U100 and U101 thereof are supplied to the NOR gate U131 the output of which sets a frame latch comprising the NOR gates U169 and U170. This latch produces an output on the FRAME line which is anded with the STBB pulses (FIG. 37(c)) in the NAND gate U153 the output of which is inverted in the inverter U58 and supplied as an input to the NAND gate U152. The other input of the NAND gate U152 is the Q output of the last stage U121 of the demodulator counter 422. Accordingly, if during the first two bit interval the demodulator counter 422 has received 8 or more clock pulses from the flip flop U95, which indicates that the phase counters 406-412 have collectively produced an output for 8 of the 12 1/6th bit intervals corresponding to the two start bits of a received message, the Q output of the last stage U121 will be high and the output of the NAND gate U152 is employed to set a received word detect latch U151 and U165. When this latch is set the RXWDETN line, which is the inverted output of this latch, goes low for the remainder of a received message. This RXWDETN signal passes through the NAND gate U171 to one input of a three input NAND gate U163 the other two inputs of which are the frame output of the latch U169, U170 and the STBBD strobe pulses (FIG. 37(d)). Accordingly, when the RXWDETN line goes low after the frame latch has been set the NAND gate U163 produces an output which is inverted in the inverter U567 to produce shift register clock pulses on the BSHFCLK line. The output of the demodulator counter 422 passes through the NOR gate U29 and the inverter U63 to the DEMOD output line as soon as the counter 422 counts 8 1/6th bit intervals. However, the demodulated data is not clocked into the serial shift register 152 until BSHFCLK pulses are produced at the end of the two start bit framing interval when the output of the NAND gate U163 goes low. After the BSHFCLK pulses are produced the STBDD pulses are combined with the FRAME signal in the NAND gate U164 so as to produce delayed shift register clock (DSHFCLK) pulses which occur after the BSHFCLK pulses and are used at various points in the device 80, as described heretofore. The DEMOD output line of the demodulator 150 is supplied through the switch U758 (FIG. 31) to the input of the BCH error code computer 154 so as to enable this computer to compute a BCH error code based on the first 27 bits of the received message. The DEMOD output is also supplied through the switch U759 (FIG. 27) to the input of the serial shift register 152, as will be described in more detail hereinafter. The DEMOD output is also supplied to the dual function pin 22 of the device 80 when this device is operated in a test mode, as will be described in more detail hereinafter.

The RXWDETN line also controls resetting of the counters 420 and 422 since when this line goes low it indicates that a valid start bit of two bit intervals length has been received. More particularly, the RXWDETN line is supplied through the NAND gate U162 and the inverter U53 to one input of a three input NOR gate U176. The STBCD strobe pulses are anded with the frame signal in the NAND gate U150 and inverted in the inverter U55 to supply another input to the NOR gate U176. The third input of this NOR gate is the internal reset line INTRES which is normally low. Accordingly, an output is supplied from the NOR gate U176 in response to the low output produced by U150 which is inverted in the inverter U54 and supplied to the bit reset line BITRST to reset the bit framing counter 420 and the demodulator counter 422.

After a valid start bit has been received, which lasted for two bit intervals, it is necessary to adjust the bit framing counter 420 so that it will count up to only 6 to set the frame latch U169, U170. This is accomplished by combining the RXWDETN signal, which passes through the NAND gate U201 and the inverters U202 and U861, with the STBAD pulses which are supplied as the other input to a NAND gate U862 through the inverter U866. As a result, the NAND gate U862 supplies a clock signal through the NAND gate U864 to the second stage U99 of the bit framing counter 420 while the output of the first stage U98 is blocked by the NAND gate U860. Accordingly, the stages U100 and U101 of the counter 420 are combined in the NOR gate U131 to set the frame latch U169, U170 at a count of 6 for the remaining bits of the received message.

With regard to the demodulator counter 422, it will be recalled that if this counter counts to four during the next bit interval, i.e. the phase counters 406-412 have collectively produced an output for four 1/6th bit intervals during the next full bit interval, it is assumed that a logic 1 has been received. Accordingly, the Q output of the stage U120 is also connected through the NOR gate U29 to the DEMOD line. In this connection it will be understood that while the stage U120 produces an output during the start bit framing interval before a count of 8 is reached in the counter 422, this output appearing on the DEMOD line is not used to load the shift register 152 because no BSHFCLK pulses have been produced at that time. The STBDD strobe pulses (FIG. 37(g)), which occur at the end of a 1/6th bit interval, are used to reset the frame latch U169, U170 at the end of either the initial two start bit framing cycle or at the end of each succeeding bit interval.

If the bit framing counter 420 counts to 12 during the initial two start bits interval and the demodulator counter 422 does not count up to 8 or more during this period it is assumed that two valid start bits have not been received and the flip flop U119 is reset as well as the counters 420 and 422. More particularly, if the counter 422 does not count to 8 or more the RXWDETN line is high which appears as one input to the NAND gate U149. The other input of this NAND gate is a one when the STBCD strobe pulse is nanded with FRAME so that the output of the NAND gate U164, identified as RSTWORD goes high and resets the flip flops U95 and U119. When this occurs the Q not output of U119 goes high and the output of NAND gate U162 goes low which passes through the NOR gate U176 and causes the BITRST line to go high which resets the counters 420 and 422.

At the end of a 33 bit message the EOW line from the message bit counter 160 goes high and sets the latch U167, U168 so that the output of this latch, which is one input of the NAND gate U148 goes high. Upon the occurrence of the STBD pulse to the other input of the NAND gate U148 the RXWDETN latch U151, U165 is reset so that the RXWDETN line goes high indicating the end of a message. Also, a low on the output of the NAND gate U148 produces a high on the output of the NAND gate U164 which resets the flip flops U95 and U119.

Figure 38:
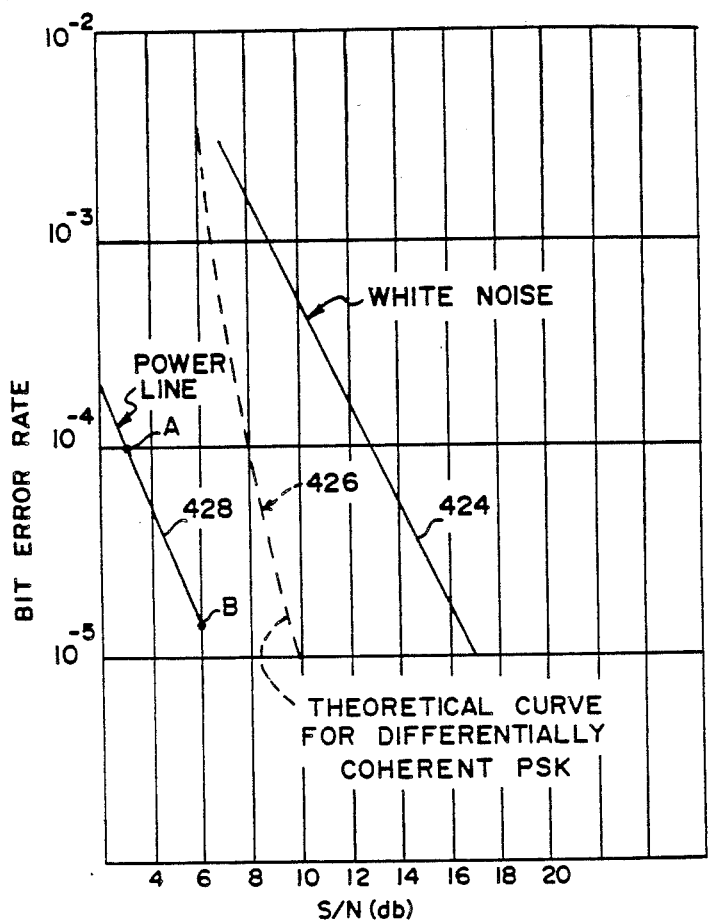
FIG. 38 is a graph showing the bit error rate of the digital demodulator of FIG. 35 IC in different noise environments.

From the above detailed description of the digital demodulator 150, it will be evident that this demodulator is particularly suitable for receiving and demodulating on-off keyed carrier messages transmitted over a power line which may have phase disturbances which produce large holes in the received message. This is because the phase counters 406–412 can detect a valid 1/6th bit when 16 out of the 64 carrier cycles are missing from the received signal. Also, the demodulator counter 422 can indicate a valid "logic 1" when 2 out of the six 1/6th bit intervals are missing in the received message. In FIG. 38 there is shown the test results of the digital demodulator 150 when used in different noise environments. Referring to this figure, the abscissa is a linear scale of signal to noise ratio in DB and the ordinate is a linear scale of the bit error rate. For example, a bit error rate of $10^{-3}$ is 1 bit error in the detection of 1,000 bits. The curve 424 in FIG. 38 shows the bit error rate of the digital demodulator 150 when an input signal amplitude of 100 millivolts peak to peak is mixed with different amplitudes of white noise to provide different signal to noise ratios. This 100 millivolt input signal plus noise was applied to the input of the coupling network 90 (in place of the power line 232 (FIG. 16)) and the signal to noise ratio was measured at the junctions of capacitor 284 and the diodes 286 and 288 in the coupling network of FIG. 16 with a spectrum analyzer having a bandwidth of 300 Hz. The curve 424 shows that at a signal to noise ratio of 17 DB a bit error rate of 1 in 100,000 is achieved. At a signal to noise ratio of 9 a bit error rate of 1 in 1,000 is achieved. For comparison, the curve 426 shows the theoretical bit error rate curve for a differentially coherent phase shift keyed signal with white noise. Curve 428 in FIG. 38 shows the bit error rate of the demodulator 150 when used on a power line instead of with a white noise generator. Since it was not possible to vary the noise level of the power line, different values of signal input were employed, point A on the curve 428 being obtained with a signal input of 30 millivolts peak to peak and point B on the curve 428 being obtained with a signal input of 60 millivolts peak to peak.

By comparing curves 424 and 428, it will be seen that the digital demodulator 150 provides substantially better performance i.e. lower bit error rates when used with the power line than when the input signal is mixed with white noise. This is because the power line noise is primarily impulsive whereas the white noise signal is of uniform distribution throughout all frequencies. The digital demodulator 150 is particularly designed to provide error free bit detection in the presence of impulsive noise, as discussed in detail heretofore.

The bandwidth of the digital demodulator 150 has also been measured by applying a sweep generator to the RX input pin of the device 80 and sweeping through a band of frequencies centered on the carrier frequency of 115.2 kHz. It was found that the demodulator 150 totally rejects all frequencies greater than 1.2 kHz away from the carrier frequency (115.2 kHz) except for odd harmonies of the carrier the lowest of which is 3 times the carrier frequency.

As discussed generally heretofore, the digital IC 80 can be pin configured to operate at a 1200 baud rate when the device 80 is to be used in less noisy environments such as the dedicated twisted pair 92 shown in FIG. 8. In accordance with a further aspect of the disclosed system this modification is accomplished in the digital demodulator 150 by simply resetting the phase counters 406–412 every 16 cycles of carrier rather than every 64 cycles of carrier. Also, the input to the Johnson counter U111, U112 is stepped up by a factor of 4 so that all of the strobe signals (FIG. 37) developed in the output of this counter, which repeat at a 1/6th bit rate, are increased by a factor of 4. More particularly, when the BAUD0 pin 2 of the device 80 is grounded a low signal is coupled through the inverters U24 and U49 to control the switch U122 so that the output of the stage U108 in the ripple counter U106–U110 is supplied to the Johnson counter U111, U112 through the switch U128. At the same time this signal controls the switches U123, U124, U125 and U126 (FIG. 19) to delete the first two stages of each of the phase counters 406–412 from their respective counting chains so that these counters now have only to count up to 12 during a 16 carrier cycle bit interval in order to indicate a valid 1/6th bit pulse on the output line thereof. However, all of the digital circuitry, described in detail heretofore in connection with the operation of the demodulator 150 at a 300 baud rate, continues to function in the same manner for input data received at a 1200 baud rate when the baud zero terminal is grounded. Also, all of the other circuitry of the digital IC 80, which has been described generally heretofore, functions properly to receive messages from the network and transmit messages to the network at the increased baud rate of 1200 baud by simply grounding the BAUD0 pin 2 of the device 80.

As discussed generally heretofore, the digital IC 80 may also be pin configured to accept unmodulated base band data at the extremely high baud rate of 38.4K baud. To accomplish this the baud 1 pin 7 of the device 80 is grounded so that the output of the inverter U12 (FIG. 18), which is identified as TEST in the detailed schematic, goes high. When this occurs the switch U128 is switched to its A input so that the 921.6 kHz signal from the Johnson counter U102, U103 is applied directly to the input of the Johnson counter U111, U112. This later Johnson counter thus operates to produce the above described strobe pulses at a frequency of 6 times the baud rate of 38.4kHz. At the same time the carrier confirmation circuits 402, 404 and the phase counters 406–412 are bypassed by supplying the Baud 1 signal to the switch U129 so that this switch is thrown to the B position in which the RX input is supplied directly to the D input of the flip flop U95. All of the start bit detection and framing logic described in detail heretofore in connection with the operation of the demodulator 150 at a 300 baud rate, will now function at the 38.4k baud rate.

When the device 80 is operated at a 38.4k baud rate the Baud 1 signal line is also used to control the switch U761 (FIG. 25) so that the QN output of the transmit flip flop U640 is supplied to the TX output pin 10 of the device 80 through the inverters U733, U740 and U745. Accordingly, all of the digital circuitry in the device 80 is capable of receiving messages from a low noise environment, such as a fiber optic cable, executing all of the instructions heretofore described including interfacing with an associated microcomputer, and transmitting messages back to the network all at the elevated baud rate of 38.4k baud.

Serial Shift Register-152

Figure 27A:
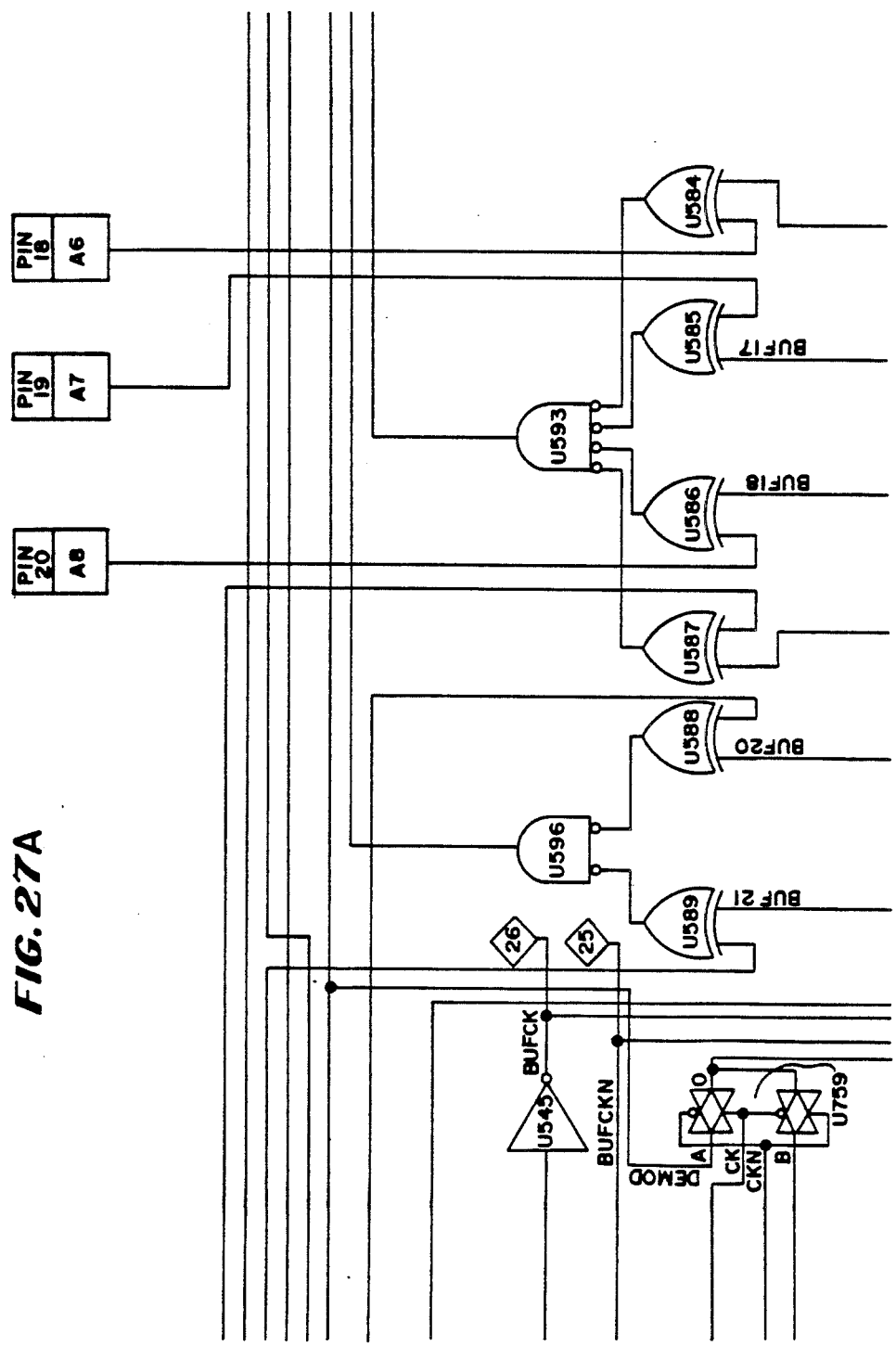
Figure 27B:
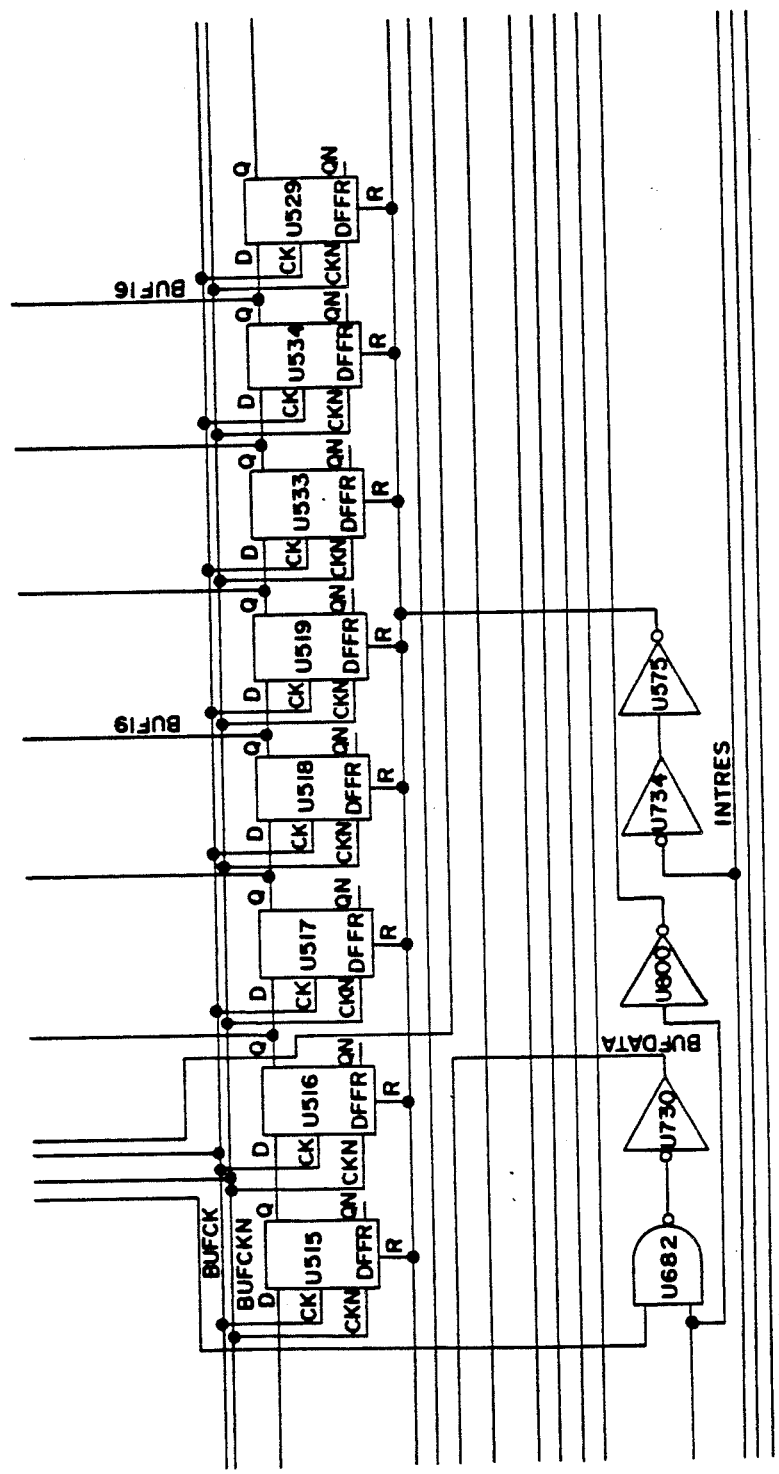
Figure 28A:
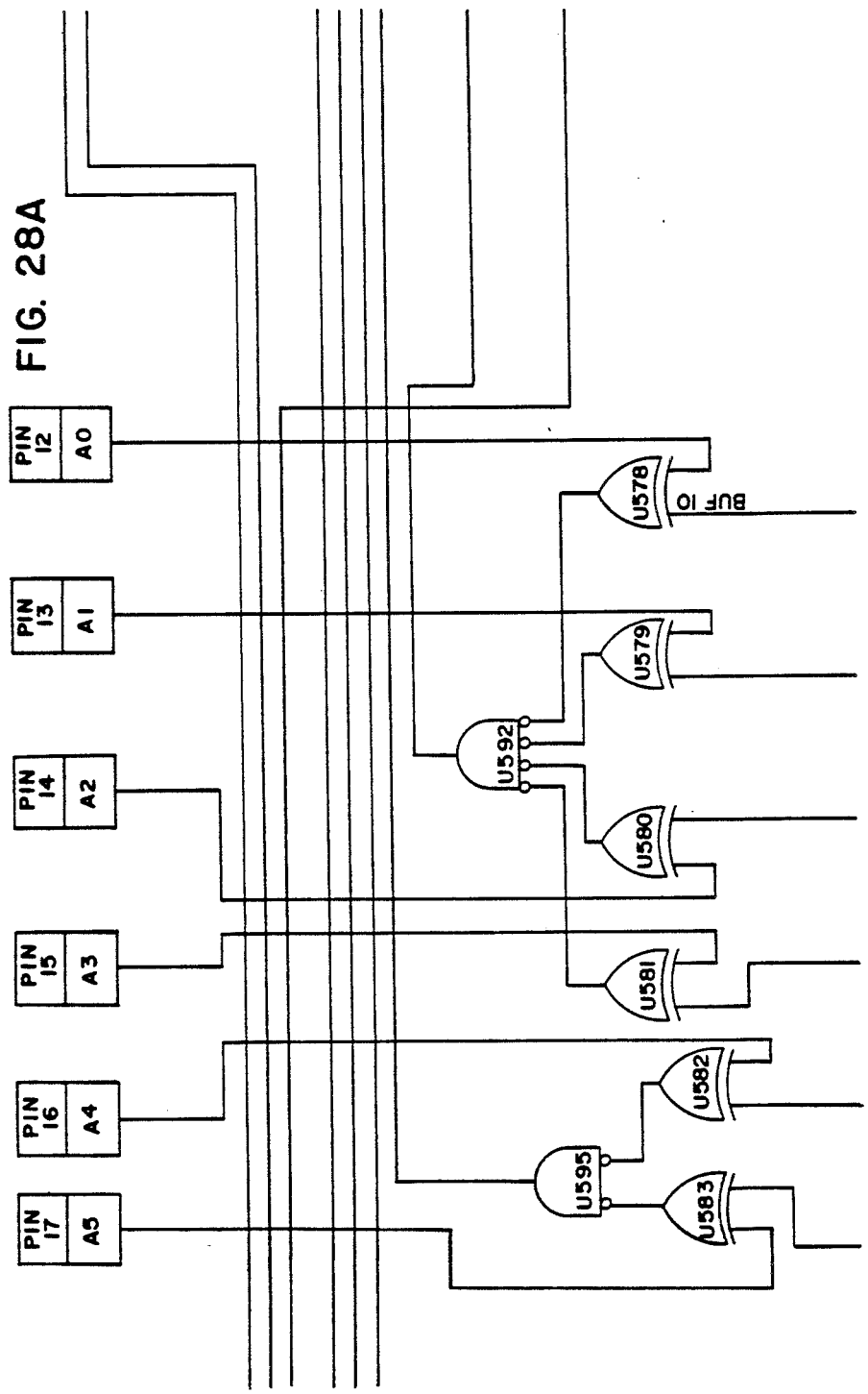
Figure 28B:
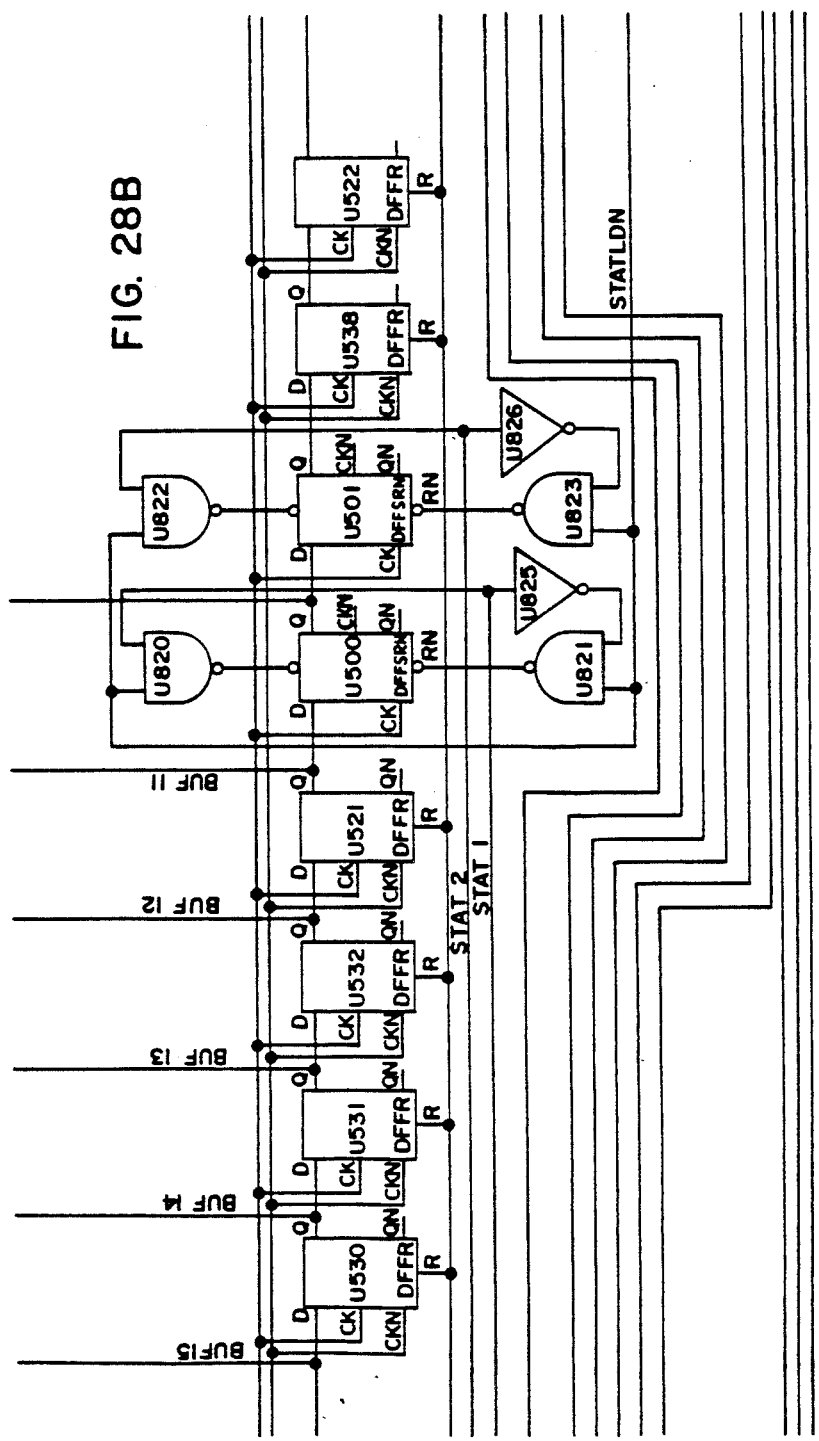
Figure 29A:
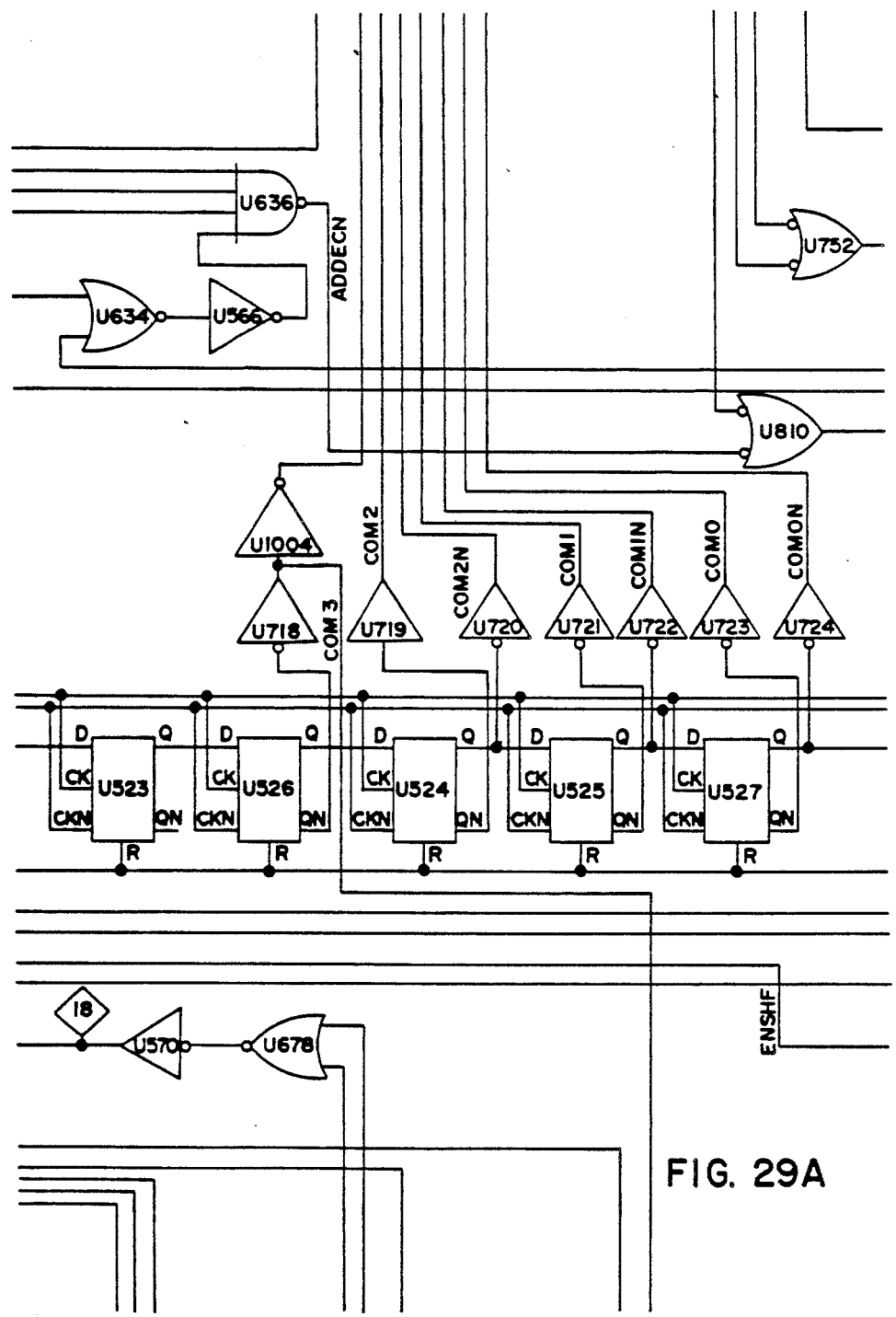
Figure 29B:
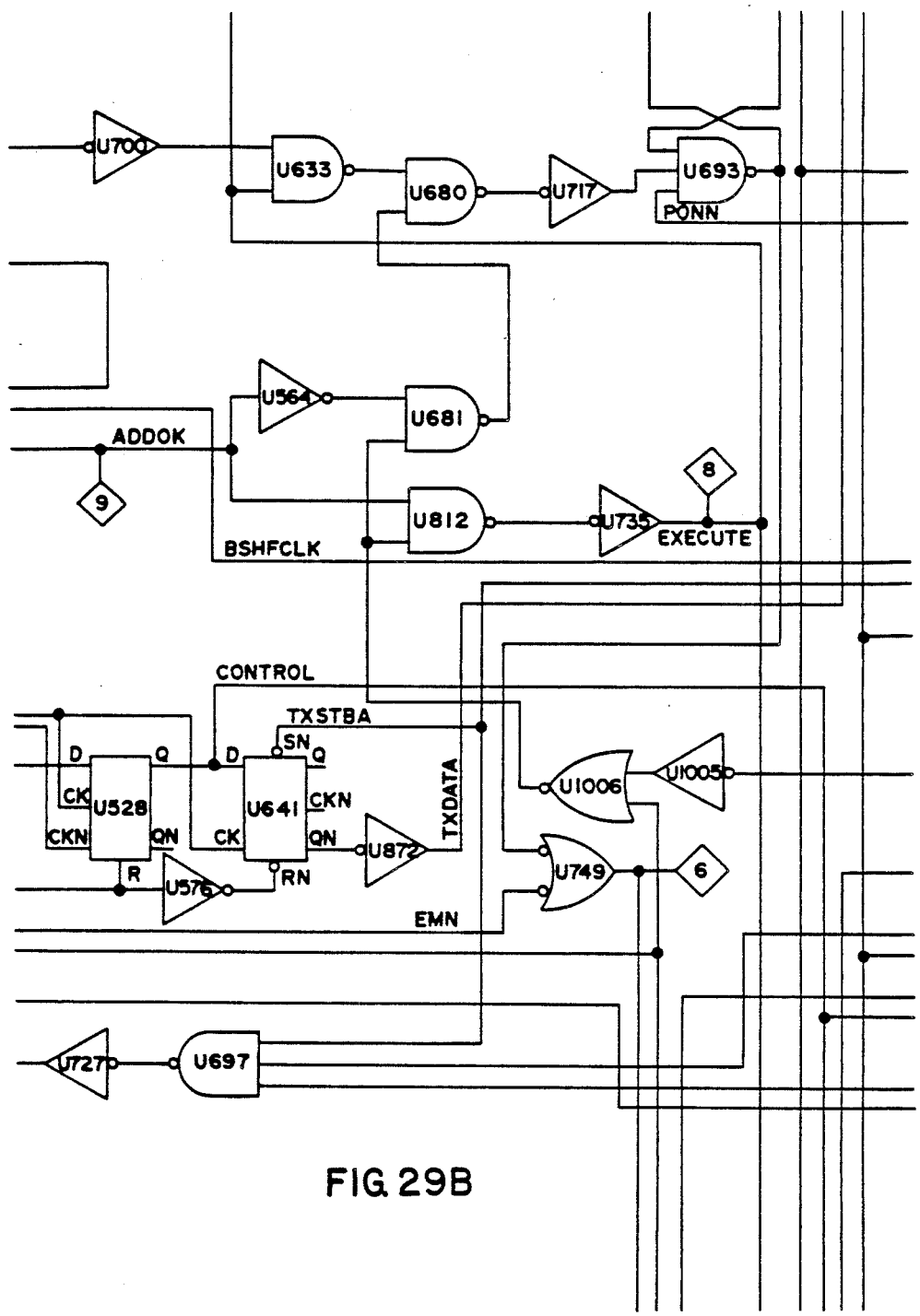
Figure 30A:
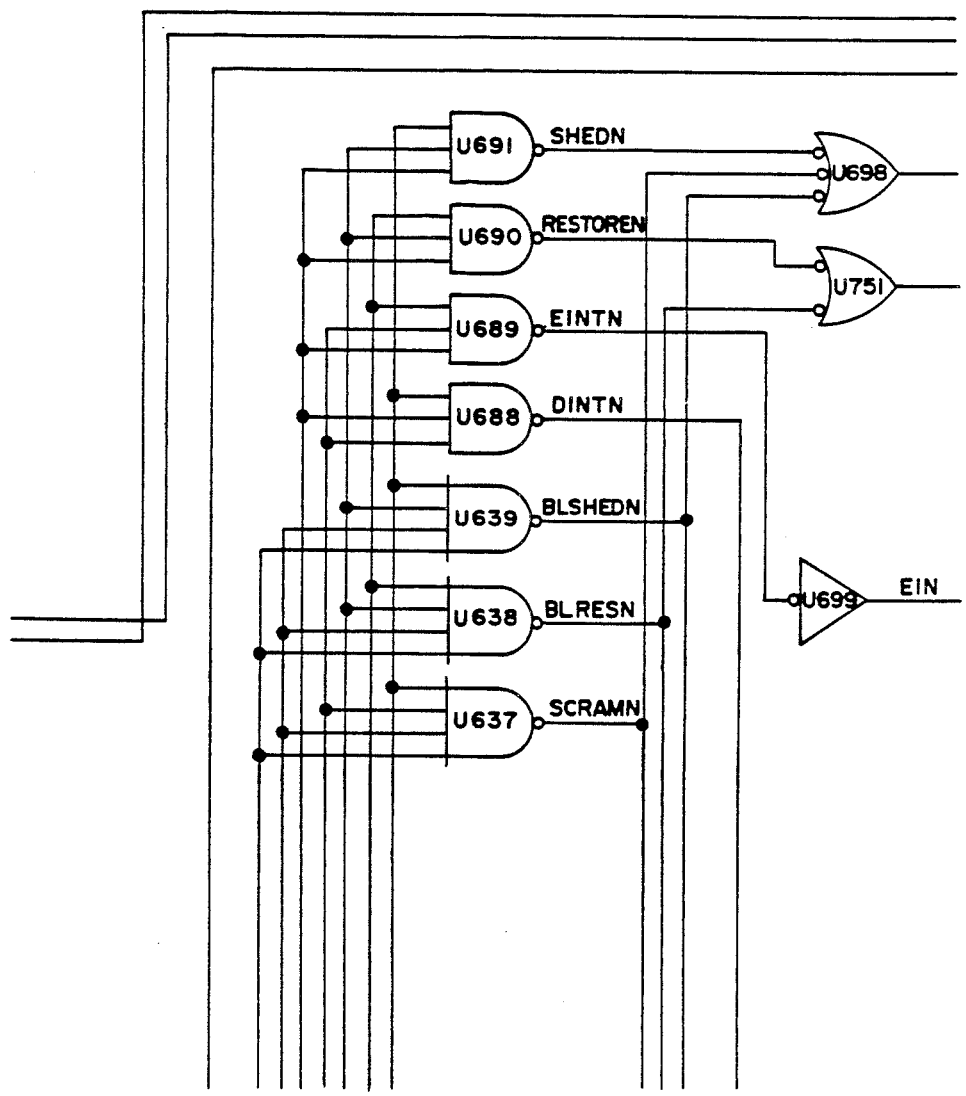
Figure 30B:
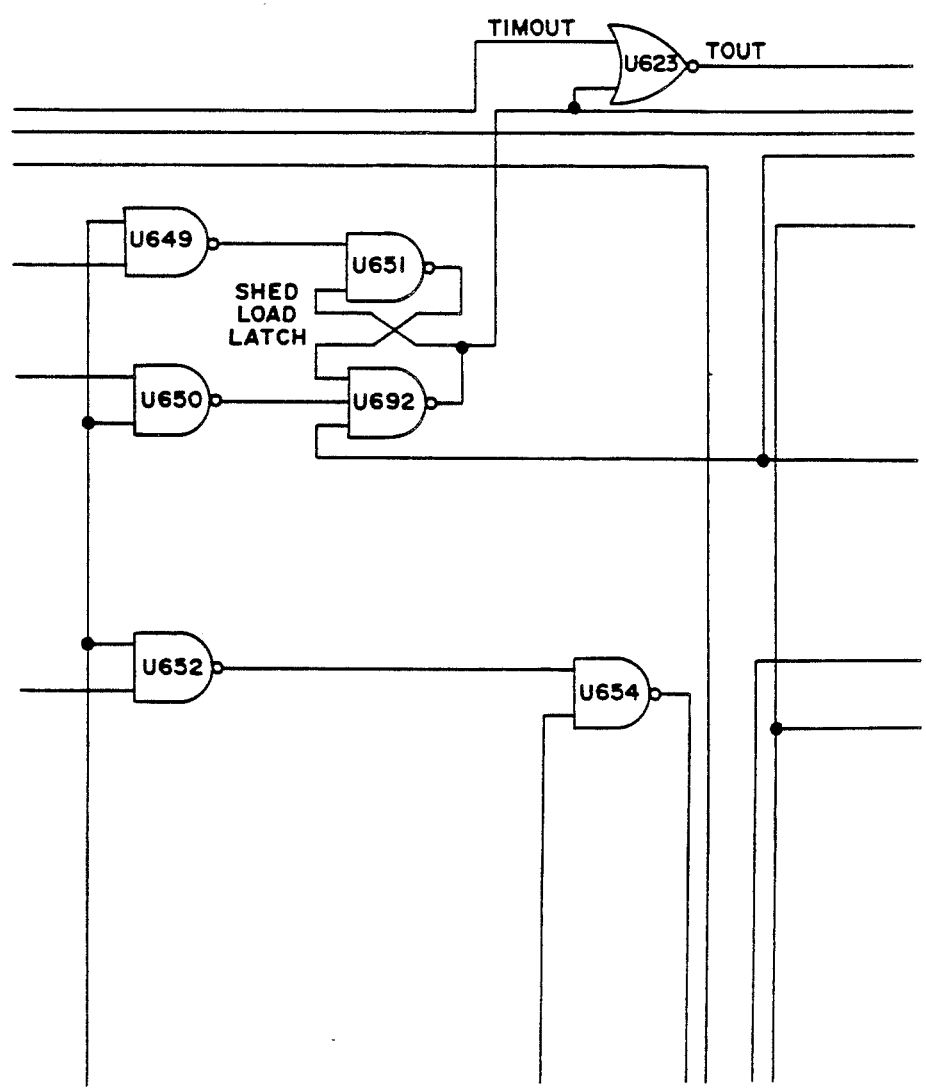
Figure 31A:
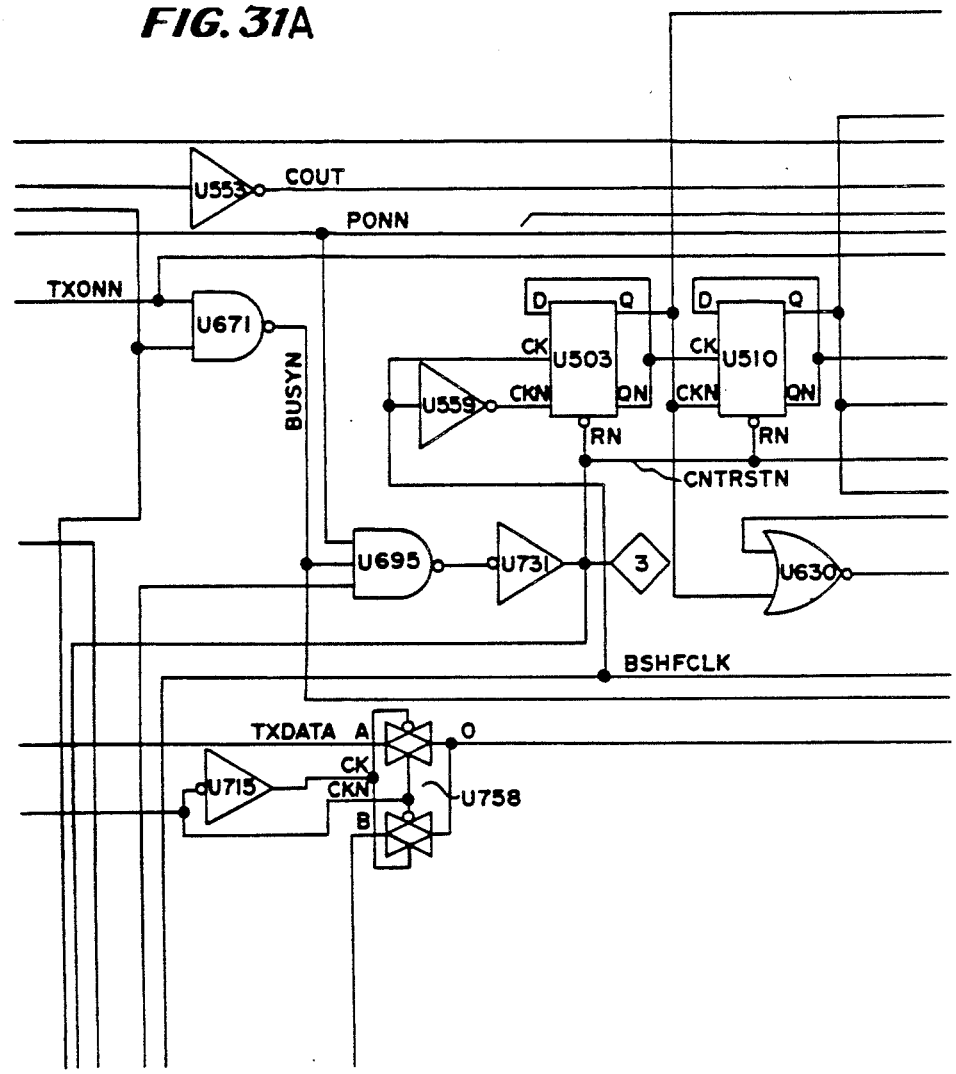
Figure 31B:
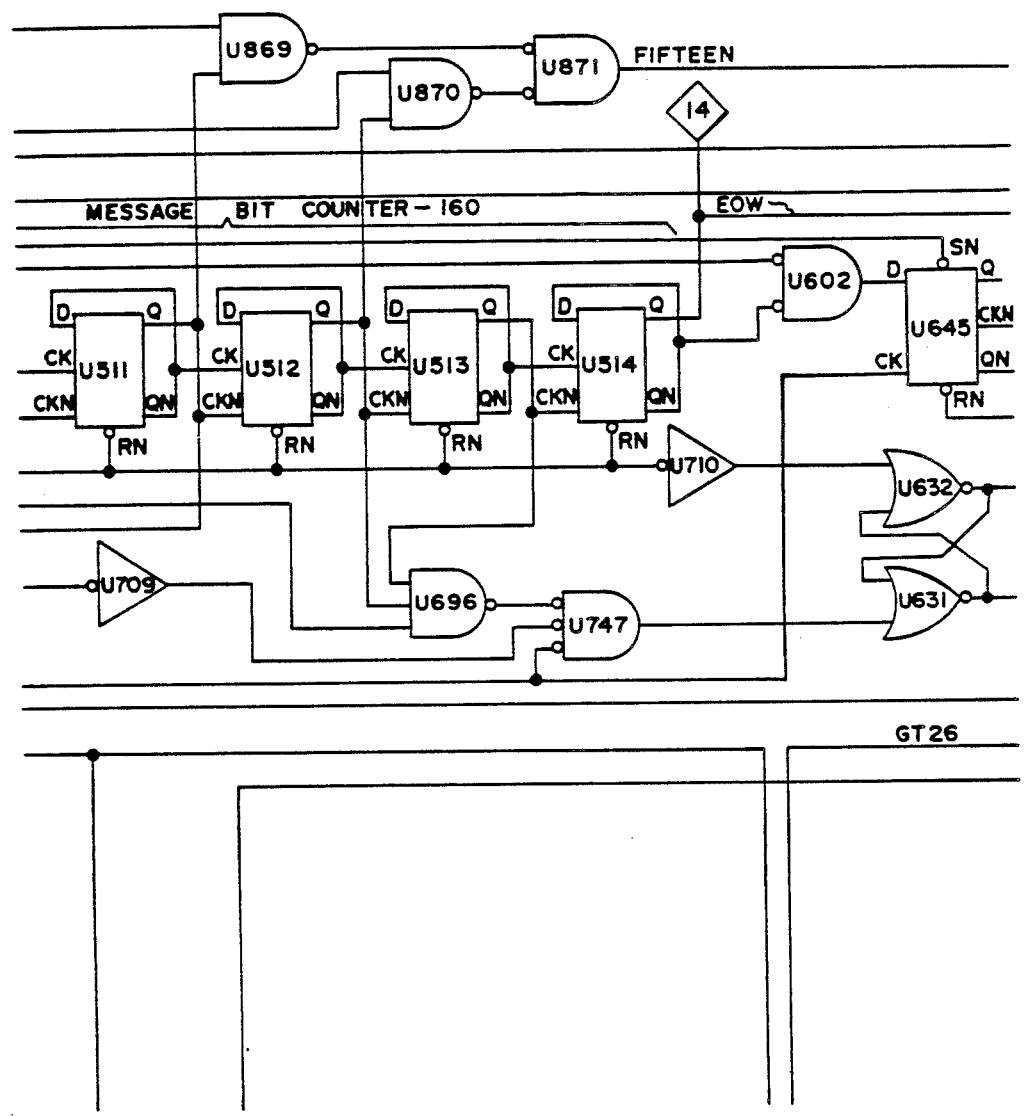
Figure 33A:
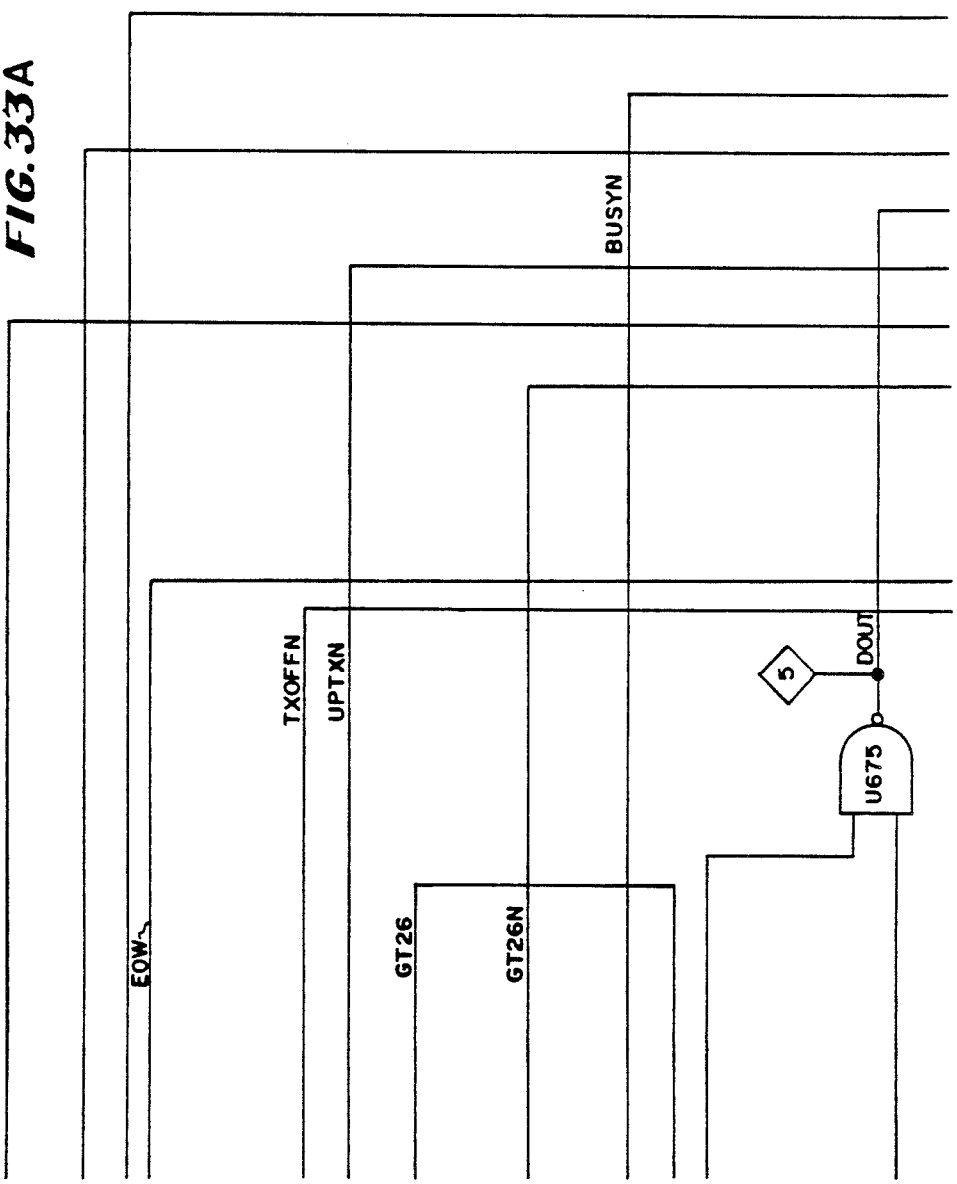
Figure 33B:
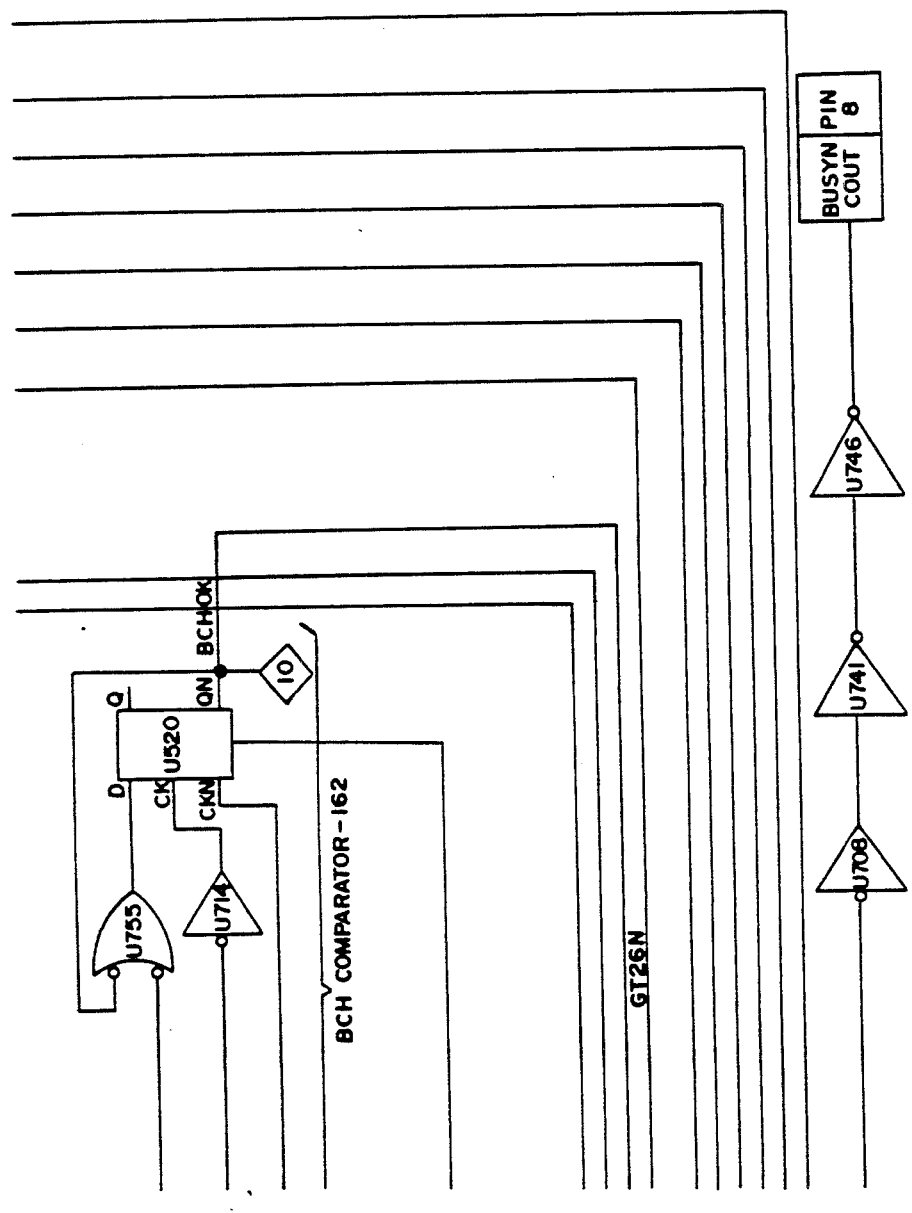

Considering now in more detail the serial shift register 152, this register comprises the serially connected stages U536, U537, U535, U515–519, U533, U534, U529–532, U521, U500, 1501, U538, U522, U523, U526, U524, U525, U527, U528 and U641 (FIGS. 26–29). As discussed generally heretofore the stage U528 stores the control bit of the received message and the stage U641 stores a logic "1" for the two start bits of the received message. The demodulated data of the received message is transmitted through the switch U759, the NAND gate U682 and the inverter U730 to the D input of the first stage U536 of the register 152, this input being identified as BUFDATA. The BSHFCLK pulses developed in the demodulator 150 are supplied as one input to a NAND gate U697 (FIG. 29). The other two inputs of the NAND gate U697 are the TXSTBA line and the GT26N line both of which are high at the beginning of a received message. Accordingly, the BSHFCLK pulses are inverted in the inverter U727 and appear on the ENSHF line which is supplied through the switch U760 (FIG. 26) and the inverters U540, U543, U544 and U545 to the BUFCK clock line of the register 152 and through the inverter U546 to the BUFCKN line, these lines forming the main clock lines of the register 152. The register 152 is reset from the internal reset line INTRES through the inverters 734 and 575 (FIG. 27). The manner in which data may be read out of the register 152 by an associated microcomputer or loaded into this register by a microcomputer has been described heretofore in connection with FIG. 14.

Address Decoder-164

Referring now to the detailed circuitry of the address decoder 164, this decoder comprises the exclusive OR gate U578–U589 (FIGS. 27 and 28) which compare the outputs of 12 stages of the register 152 with the 12 address pins A0–A11, the A0 pin being compared with the output of the 16th stage U500 and the output of address pin A11 being compared with the output of the fifth stage U516 of the register 152. The exclusive OR gate outputs are combined in the NOR gates U596, U593, U595 and U592, the outputs of which are further combined in the four input NAND gate U636 (FIG. 29). If bits B11–B22 of the received message, which are stored in the indicated stages of the register 152 all compare equally with the settings of the address select switches 120 (FIG. 10) which are connected to the address pins A0–A11, the output of the NAND gate U636 goes low, as indicated by the ADDECN output line of this gate.

Instruction Decoder-166

Considering now in more detail the instruction decoder 166, the Q and QN outputs of the register stages U527, U525 and U524 (FIG. 29), are coupled through inverters to a series of NAND gates U691, U690, U689, U688, U639, U638 and U637 (FIG. 30) the outputs of which provide the decoded instructions described in detail heretofore in connection with FIG. 3.

The manner in which a shed load instruction is carried out has been described in detail heretofore in connection with FIG. 12. However, it is pointed out that the SHEDN output of the instruction decoder 166 is supplied as one input to a 3 input NAND gate U698. The other two inputs of this NAND gate are the SCRAMN instruction and the block shed instruction BLSHEDN. Accordingly, when either of these other two instructions are developed they are combined with the execute function in the NAND gate U649 and set the shed load latch U651 and U692.

As discussed generally heretofore, the central controller can issue block shed or block restore instructions in response to which a group of sixteen stand alone slaves will simultaneously shed or restore their loads. More particularly, when a block shed instruction is decoded the BLSHEDN line goes low and when a block restore instruction is decoded the BLRESN line goes low. These lines are inputted to a NAND gate U752 whose output is high when either of these instructions is decoded. The output of U752 is supplied as one input to the NOR gate U634 the other input of which is the output of U592 corresponding to the four LSB's of the address decoder 164. The NOR gate U634 thus produces a zero even though the four LSB's of the decoded address do not correspond to the address assigned to these stand alone slaves. The output of U634 is inverted in U566 and provides a one to U636 so that the ADDOK goes high and a shed load or restore load operation is performed in all sixteen stand alone slaves.

With regard to the enable interface instruction EINTN, this signal is inverted in the inverter U699 and combined with the execute function in the NAND gate U652 so as to set the enable interface latch U654 and U693. As discussed generally heretofore, when the device 80 is in the expanded slave mode and an enable interface instruction is received this device establishes the above described interface with the microcomputer 84 which is maintained until a disable interface instruction is supplied from the master which resets the enable interface latch U654, U693. More particularly, a disable interface instruction DINTN is inverted in the inverter U700 (FIG. 29) and supplied through the NAND gates U633 and U680 to reset the latch 654, 693.

It is also possible for the master to disable the interface indirectly and without requiring the master to send a disable interface instruction to the device 80 which has already established an interface. More particularly, the master can accomplish the disabling of the interface implicitly by transmitting a message on the network which is addressed to a digital IC at a different remote station, this message including a control bit which is set. When this occurs, both devices will receive the message transmitted by the master. However, the device 80 which has already established an interface, will recognize that the address of the received message is not his own, in which case the ADDOK line (FIG. 29) will be low. This signal is inverted in the inverter U564 so as to provide a high on one input of the NAND gate U681. When the execute strobe signal EXSTB goes high the other input of the NAND gate U681 will be high so that a low is supplied to the other input of the NAND gate U680 which resets the latch U654, U693 in the same manner as would a disable interface instruction. When the ADDOK line is low, the NAND gate U812 is not enabled so that no EXECUTE instruction is produced in response to the message addressed to a different digital IC 80. The enable interface latch is also reset when power is applied to the device 80 over the PONN line.

Considering now the logic circuits 170 (FIG. 12) employed to provide the EXECUTE signal, when the ADDECN line goes low it passes through the NAND gate U810 to one input of the NAND gate U812. It will be recalled from the previous general description that if the control bit register 528 is set, the BCH comparator indicates no error in transmission by producing a high on the BCHOK line, and the end of a word is reached, all three lines EOW, CONTROL, and BCHOK are high. These three signals are inputted to a NAND gate U748 (FIG. 32) and pass through the NOR gate U604 so as to provide a high on the execute strobe line EXSTB. This line is supplied through the inverter U1005 (FIG. 29) and the NOR gate U1006 to the other input of the NAND gate U812 the output of which is inverted in the inverter U735 to provide a high on the EXECUTE line.

As discussed generally heretofore, the expanded mode slave device 80 will not disable the interface to the associated microcomputer 84 in response to a received message with a different address, if a BCH error is indicated in the received message. This restriction is established because the received message might have been intended for the expanded mode slave but the control bit was garbled into a "1" by a noise impulse. More particularly, if a BCH error is noted in the received message the BCHOK line will not go high and no high will be produced on the EXSTB line. Accordingly, even though the ADDOK line is low the NAND gate U681 will not produce an output and the enable interface latch U654 and U693 remains set so that the interface is not disabled.

Message Bit Counter - 160

Considering now in more detail the message bit counter 160, this counter comprises the six ripple counter stages U503 and U510-U514 (FIG. 31) which are clocked by the BSHFCLK pulses developed by the demodulator 150. As described generally heretofore, the message bit counter 160 counts these pulses from the demodulator 150 and when a count of 32 is reached provides an output on the EOW line which is the Q output of the last stage U514. The counter 160 also provides a strobe pulse for the status latch at a count of 15 and provides both positive and negative GT26 and GT26N signals upon a count of 26.

Considering first the manner in which the "15" strobe is produced, the Q outputs of the first and third stages 503 and 511 are combined in the NAND gate U869 and the Q outputs of the second and fourth stages are combined in the NAND gate U870, the outputs of these two gates being ANDED in the NOR gate U871 to provide an output on the FIFTEEN line when the indicated stages of the counter 160 are all high.

Considering how the GT26 signals are developed, the Q outputs of the second stage U510, the fourth stage U512, and the fifth stage U513 are combined in the NAND gate U696 so that on a count of 26 this gate produces an output which goes to the NOR gate U747. The second input to the NOR gate U747 is a combination of the Q outputs of stages U503 and U511, which must both be zero for a valid count of 26, in the NOR gate U630. The third input to the NOR gate U742 is the BSHFCLK pulse which, after a count of 26 in the counter 660 sets a latch comprising the NOR gates U631 and U632. When this latch is set the GT26 line goes high and the GT26N lines goes low.

It will be recalled from the previous general description that the message tit counter 160 is employed during both the reception of a message and the transmission of a message to count the bit intervals to determine the end of a word. However, when the device 80 is neither receiving a message or transmitting a message this counter should be reset. Also, it will be recalled from the previous general description that the BUSYN output pin 8 of the device 80 goes low when the device 80 is either receiving a message or transmitting a message to inform the interfaced microcomputer of this condition. Considering first the manner in which the BUSYN output is produced, when the device 80 is receiving a word the RXWDETN line is low and when the device 80 transmitting a message the TXONN line is low. These lines are ORed in the NAND gate U671 the output of which is supplied over the BUSYN line and through the B terminal of the switch U853 (FIG. 32), and the inverters U708, U741 and U746 (FIG. 33) to the BUSYN pin 8 of the device 80. Accordingly, a negative signal is produced on pin 8 when the device 80 is either receiving or transmitting a message.

Considering now the manner in which the message bit counter 160 is reset, it will be recalled from the previous general description of FIG. 13 that during a transmit message a TXSTBA signal is produced by the one bit delay flip flop U646 so as to provide a two bit interval wide start pulse at the beginning of the message while providing only a count of 1 for both start bits. Accordingly, it is necessary to hold the message bit counter 160 reset during the time period of the first start bit. This is accomplished by the TXSTBA signal which is supplied as one input to a NAND gate U695 and is low curing the first start bit. The other two inputs of the NAND gate U695 are the power PONN signal which resets the message bit counter 160 when power is applied to the device 80 but is otherwise normally high, and the BUSYN line which is high whenever a message is being either received or transmitted i.e. a period when the counter 160 should count the bits of the message. Accordingly, after the first transmitted start bit the TXSTBA line goes high and the reset is released on the counter 160.

BCH Error Code Computer-154

Considering now the BCH computer 154 in more detail, this computer is instructed based on the polynomial $x^5+x^2+1$ and hence comprises the five stage shift register U505-U509 (FIG. 32), as will be readily understood by those skilled in the art. In this connection, reference may be had to the book Error Correcting Codes by Peterson and Weldon, MIT Press 2nd. Ed. 1992, for a detailed description of the functioning and instruction of a BCH error correcting code. The shift register stages U505-U509 are clocked by the BSHFCLK pulses developed by the demodulator 150 which are applied to one input of the NAND gate U672 the other input of which is the TXSTBA signal which is high except during the first start bit of a transmitted message. The output of the NAND gate U672 is inverted in the inverter U711 to provide clock pulses for the BCH shift register U505-U509. The demodulated data of the received message is supplied through the switch U758 (FIG. 31) and the NAND gate U673 (FIG.

32) and the inverter U712 to one input of an exclusive OR gate U577 the output of which is connected to the D input of the first stage U505. The other input of the exclusive OR gate U577 is the output of a NOR gate U603 having the GT26 line as one input and the QN output of the last stage U509 as the other input. During the first 26 message bit the NOR gate U603 and exclusive OR gate U577 act as a recirculating input from the output to the input of the computer 154. Also the D input of the first stage 505 and the Q output of the second stage U506 provide inputs to an exclusive OR gate U590 the output of which is connected to the D input of the third stage U507. Accordingly, during the reception of the first 26 message bits the computer 154 computes a five bit BCH error code which is stored in the stages U505–U509. The stages U505–509 of the BCH error code computer are reset concurrently with the message bit counter 160 by the output of the inverter U731.

BCH Comparator - 162

It will be recalled from the previous general description that following reception of the 26 message bits the BCH error code computed in computer 154 is compared with the error code appearing as the message bits B27-B31 of the received message in the BCH comparator 162. More particularly, the Q output of the last stage U509 is one input of an exclusive OR gate U591 (FIG. 32) the other input of which is the DEMOD data from the output of the switch U758. As soon as the GT26 line goes high at the end of 26 message bits the NOR gate U603 blocks the recirculation connection from the QN output of stage 509 to the exclusive OR gate U577. The gate U603 thus functions as the switch 158 in FIG. 12. At the same time the GT26 line is inverted in the inverter U713 and supplied as the second input to the NAND gate U673 so as to remove DEMOD data from the input to the computer 154. The gate U673 thus performs the function of the switch 156 in FIG. 12. Accordingly, subsequent BSHFCLK pulses will act to shift the BCH error code stored in the register U505-509 out of this register for a bit by bit comparison in the exclusive NOR gate U591. The output of this NOR gate is supplied as one input to a NAND gate U755 (FIG. 33) the other input of which is the QN output of a BCHOK flip flop U520. The flip flop U520 is held reset during transmission by the TXONN line which is one input to a NAND gate U750 the output of which is connected to the reset terminal of U520. U520 is also reset through the other input of U750 when the counters 160 and 154 are reset. The flip-flop U520 is clocked by BSHFCLK pulses through the NAND gate U676 (FIG. 32) only after the GT26 line goes high at the end of the 26th message bit. When the flip flop U520 is reset its QN output is a one which is supplied to the NAND gate U755. When the two inputs to the exclusive NOR gate U591 agree this gate produces a one so that the output of U755 is a zero to the D input of U520 so that its QN output remains high. If all five bits of the two BCH error codes agree the QN output of U520 remains high to provide a high on the BCHOK line.

If the two inputs to U591 do not agree, say on a comparison of the second bit in each code, the output of U591 will be a zero and the output of U755 will be a one which is clocked into the flip flop U520 on the next BSCHFCLK pulse. This causes the QN output of U520 to go low which is fed back to U755 to cause U755 to produce a one at its output regardless of the other input from the exclusive NOR gate U591. Accordingly, even though the third, fourth and fifth bits compare equally and the gate U591 produces a one for these comparisons, the flip flop U520 will remain with a one on its D input so that the QN input of U520 will be low at the end of the five bit and indicate an error in the received message.

Status Control 176

Considering now in more detail the manner in which the status signals on pins 26 and 23 (STAT1 and STAT2) are added to a reply message transmitted back to the central controller as bits 25 and 26, it will be recalled from the preceding general description that a period of time equal to fifteen bits is allowed for the controlled relay contacts to settle before the status of these contacts is set into the register 152. More particularly, when fifteen bits of data have been shifted out of the register 152 during a transmitted reply message, the data previously stored in stage U535 has been shifted beyond the stages U500 and U501 and hence these stages may be set in accordance with the signals on STAT1 and STAT2. The STAT1 signal is supplied to one input of a NAND gate U820 (FIG. 28) the output of which sets stage U500 and through the inverter U825 to one input of a NAND gate U821 the output of which resets the stage U500. Also, the STAT2 signal is applied to one input of a NAND gate U822 the output of which sets the stage U501 and through the inverter U826 to one input of a NAND gate U823 the output of which resets the stage U501.

It will be recalled from the previous description of the message bit counter 160 that after this counter has counted to 15 the output of the NOR gate U871 goes high. This signal is supplied as one input to a NAND gate U685 (FIG. 23) the other input of which is the DSHFCLK pulses so that the output of the NAND gate U685 goes low near the end of the bit interval after a count of 15 is reached in the counter 160. Assuming that the status latch U662 and U663 has been set in response to a reply instruction, as described previously in connection with FIG. 13, the two inputs to the NOR gate U599 will be zero so that a 1 is produced on the output of this gate which is supplied as one input to the NOR gate U678 (FIG. 29) the other input of which is the INTRES line. The output of the NOR gate U678 is inverted in the inverter U570, which is supplied to the other input of all four of the NAND gates U820-U823. Accordingly, in response to the FIFTEEN signal the stages U500 and U501 are set or reset in accordance with the signals on the STAT1 and STAT2 lines.

Test Mode

As discussed generally heretofore, a digital IC 80 may be pin configured to operate in a test mode in which the outputs of the digital demodulator 150 are brought out to dual purpose pins of the device 80 so that test equipment can be connected thereto. More particularly, the digital IC 80 is pin configured to operate in a test mode by leaving both the mode 1 and mode 0 pins ungrounded so that they both have a "1" input due to the internal pull up resistors within the device 80. The "1" on the mode 1 line is supplied as one input to the NAND gate U838 (FIG. 18) and the 1 on the mode 0 pin 27 is inverted in the inverters U827 and U828 and applied as the other input of the NAND gate U838 the output of which goes low and is inverted in the inverter U846 so that the OIN line is high in the test mode. The OIN line controls a series of 3 tristate output circuits U855, U856 and U857 (FIG. 26) connected respectively to the address pins A11, A10, and A9. The RXWDETN output line of the demodulator 150 is supplied through the inverter U831 to the input of the tristate output circuit U855. The DEMOD output of the demodulator 150 is supplied through the inverter 830 to the input of the tristate U856 and the BSHFCLK pulse line from the demodulator 150 is supplied through the inverter U829 to the input of the tristate U857. The OIN line also controls the A11, A10 and A9 address lines so that these lines are set at "1" during the test operation and hence the signals supplied to the dual purpose address pins P21 22, and 23 during test will not interfere in the address decoder portion of the device 80.

The portion of the digital IC 80 beyond the demodulator 150 can be tested at the 38.4k baud rate by applying a test message to the RX pin 6 at 38.4k baud. This message may, for example, test the response of the device 80 to a message including a shed load command and the COUT output line can be checked to see if the proper response occurs. This portion of the digital IC 80 may thus be tested in less than 1 millisecond due to the fact that the 38.4 k baud rate is utilized. In this connection it will be noted that the baud 1 pin 7 of the device 80 is grounded for the test mode so that the switch U129 (FIG. 20) bypasses the digital demodulator 150. Also, this TEST signal controls the switch U761 (FIG. 25) so that the TX out pin 10 is connected directly to the QN output of the transmit flip flop U640, as in the 38.4k baud rate transmit and receive mode.

The digital demodulator 150 of the device 80 may be tested by configuring the baud 0 and baud 1 pins for the desired baud rate of either 300 or 1200 and supplying a test message at that baud rate to the RX input pin 6 of the device 80. The DEMOD, RXWDETN signal and the BSCHFCLK pulses which are produced by the demodulator 150 may be checked by examining the dual function pins 21, 22 and 23 of the device 80.

Local Override Circuit

Figure 39:
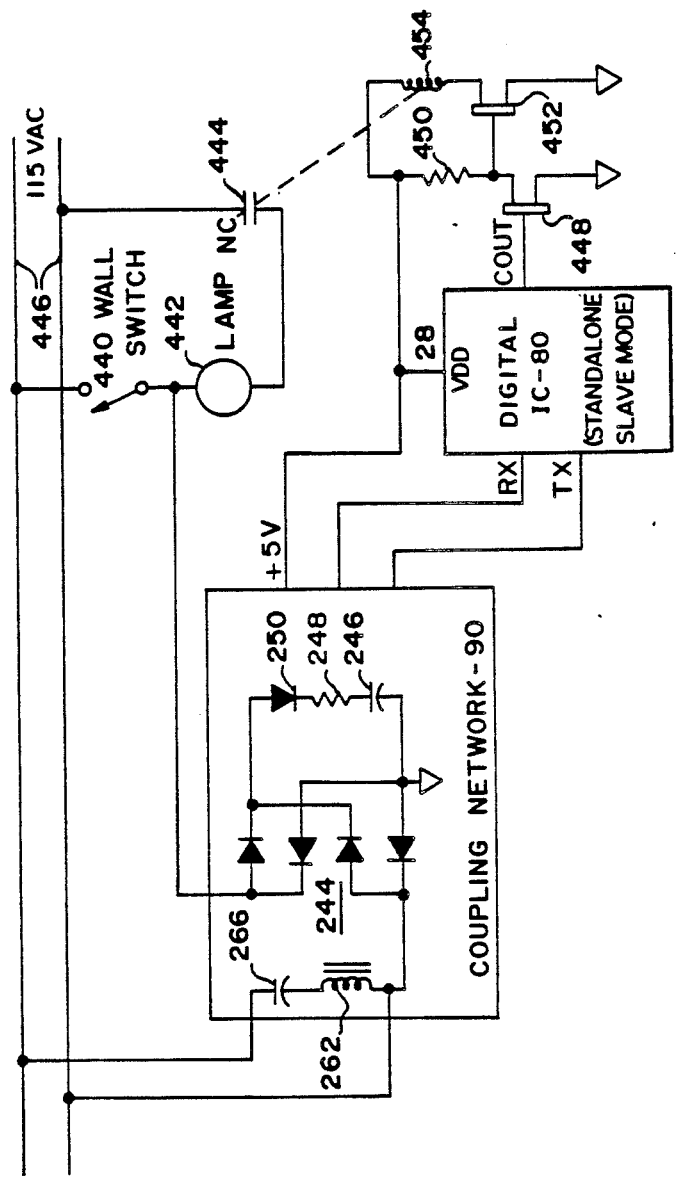
FIG. 39 is a schematic diagram of a local override circuit employing the digital IC of the disclosed communications system.

As discussed generally heretofore, the digital IC 80 is designed so that whenever +5V is applied to the Vdd pin 28 of the device 80 the COUT line is pulled high even though no message is sent to the device to restore load. This feature can be employed to provide local override capability as shown in FIG. 39. Referring to this figure, a wall switch 440 is shown connected in series with a lamp 442 and a set of normally closed relay contacts 444 across the 115 AC line 446. A digital IC 80 which is operated in the stand alone slave mode is arranged to control the relay contacts 444 in response to messages received over the power line 446 from a central controller. More particularly, the COUT line of the digital IC 80 is connected to the gate electrode of an FET 448, the drain of which is connected to ground and the source of which is connected through a resistor 450 to the +5v. supply output of the coupling network 90. 1 The source of the FET 448 is also connected to the gate electrode of a second FET 452 the drain of which is connected to ground and the source of which is connected to a relay coil 454 which controls the relay contacts 444, the upper end of the relay winding 454 being also connected to the +5v. supply.

The coupling network 90 shown in FIG. 39 is substantially identical to the coupling network shown in detail in FIGS. 16 except for the fact that AC power for the coupling network 90, and specifically the rectifier 244 thereof, is connected to the bottom contact of the wall switch 440 so that when the wall switch 440 is open no AC power is supplied to the coupling network 90 and hence no plus five volts is developed by the regulated five volt supply 258 (FIG. 16) in the coupling network 90. In this connection it will be understood that the portions of the coupling network 90 not shown in FIG. 39 are identical to the corresponding portion of this network in FIG. 16.

In operation, the relay contacts 444 are normally closed when the relay coil 454 is not energized and the wall switch 440 controls the lamp 442 in a conventional manner. During periods when the wall switch is closed and the lamp 442 is energized AC power is supplied to the coupling network 90 so that it is capable of receiving a message over the power line 446 and supplying this message to the RX input terminal of the digital IC 80. Accordingly, if the central controller wishes to turn off the lamp 442 in accordance with a predetermined load schedule, it transmits a shed load message over the power line 446 which is received by the digital IC 80 and this device responds to the shed load instruction by pulling the COUT line low. The FET 448 is thus cut off so that the gate electrode of the FET 452 goes high and the FET 452 is rendered conductive so that the relay coil 454 is energized and the contacts 444 are opened in accordance with the shed load instruction. However, a local override function may be performed by a person in the vicinity of the wall switch 440 by simply opening this wall switch and then closing it again. When the wall switch 440 is opened AC power is removed from the coupling network 90 and the +5v. power supply in this network ceases to provide 5 volt power to the digital IC 80. Also, power is removed from the FET's 448 and 452 so that the relay coil 454 is deenergized so that the normally closed relay contacts 444 are closed. When the wall switch 440 is again closed five volts is developed by the supply in the coupling network 90 and supplied to pin 28 of the digital IC 80 which responds by powering up with the COUT line high. When this occurs the FET 448 is rendered conductive and current through the resistor 450 holds the FET 452 off so that the relay 454 remains deenergized and the contacts 444 remain closed. If the digital IC 80 powered up with the COUT line low then the relay coil 454 would be energized on power up and would open the contacts 444, thus preventing the local override feature. It will thus be seen that when power is removed from a particular area which includes the lamp 442, in accordance with a preprogrammed lighting schedule, the shed load instruction from the central controller can be overridden by a person in the room in which the lamp 442 is located by simply opening the wall switch 440 and then closing it again. This local override function is accomplished substantially immediately and without requiring the digital IC 80 to transmit a message back to the central controller and having the central controller send back a message to the digital IC 80 to restore load. In prior art systems such as shown in the above mentioned prior art U.S. Pat. Nos. 4,367,414 and 4,396,844, local override is accomplished only by having the remote device send a request for load to the central controller which request is detected by polling all of the remote devices, the central controller then sending back a message to that particular remote station to restore load. Such a process takes many seconds during which time the personnel located in the room in which the lamp 442 has been turned off are in the dark.

The coupling network 90, the digital IC 80, the FET's 448, 452 and the relay 454 may all be mounted on a small card which can be directly associated with the wall switch 440 so as to provide an extremely simple and low cost addressable relay station with local override capability.

Throughout Timing Diagrams

Figures 40, 41:
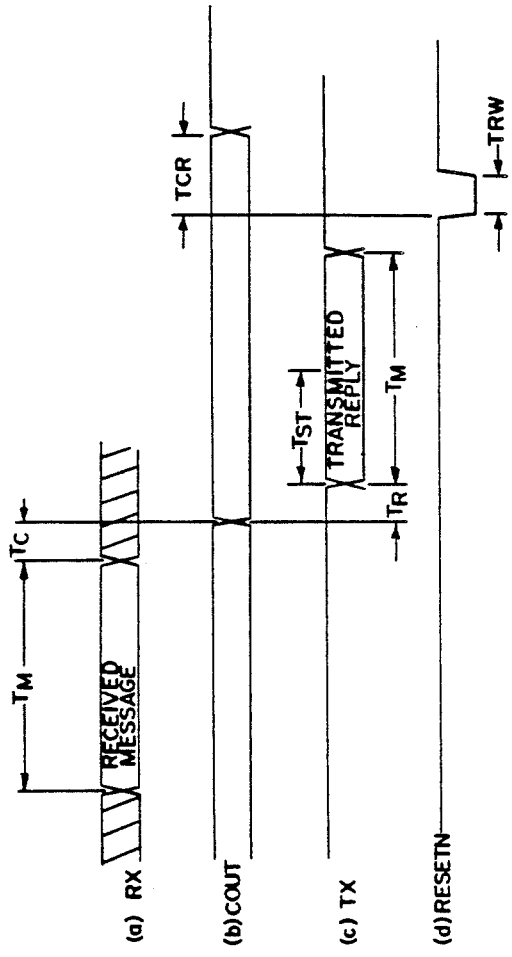
FIG. 40 is a series of timing diagrams illustrating the operation of the digital IC in the stand alone slave mode.
FIG. 41 is a chart of the response times at different baud rate of the signals shown in FIG. 40.
Figure 42:
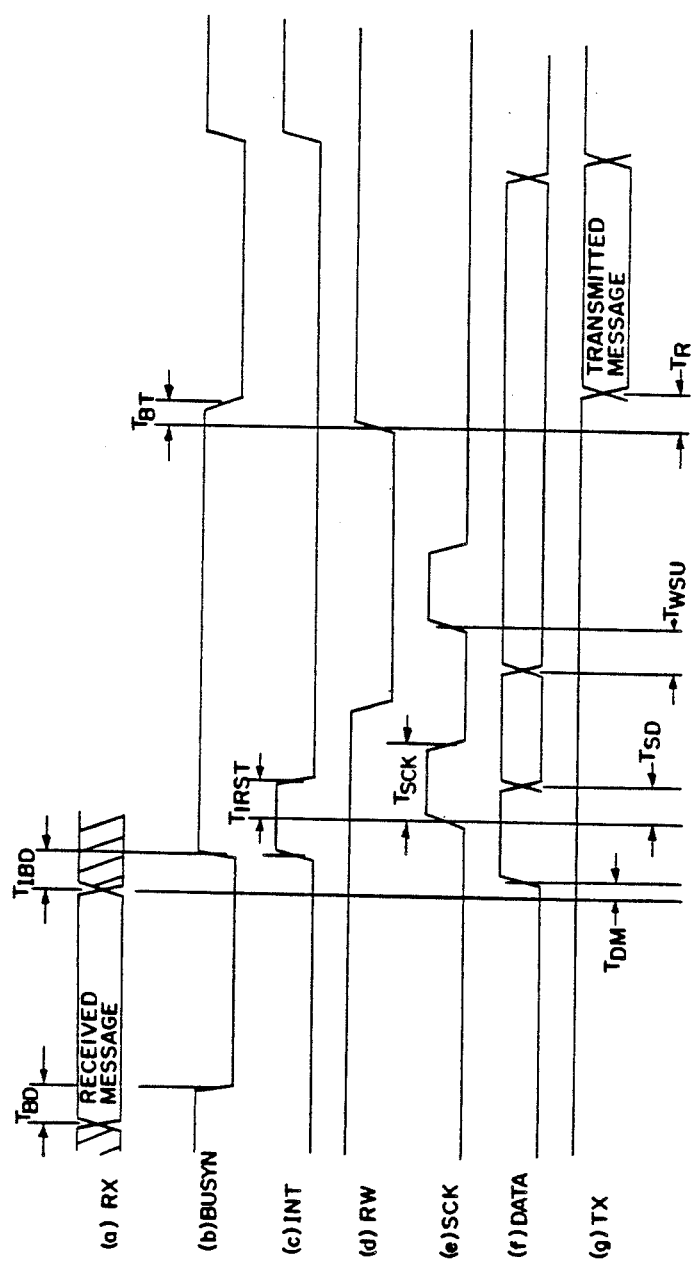
FIG. 42 is a series of timing diagrams of the digital IC in an interface mode with the microcomputer.

In FIGS. 40 and 42 there is shown a series of timing diagrams which illustrate the time required to accomplish various functions within the digital IC 80. In the accompanying FIGS. 41 and 43, the time required to accomplish these functions at each of the baud rates at which the digital IC 80 is arranged to operate are also given. All time intervals given in FIGS. 41 and 43 are maximum values unless otherwise indicated. Referring to FIG. 40, the timing diagrams in this Fig. relate to the operation of the digital IC 80 when in a stand alone slave mode. Thus, FIG. 40(a) shows the length of a received network message (TM) and also shows the delay between the end of the received message and a change in potential on the COUT output line of the digital IC 80 (FIG. 40b). FIG. 40(c) illustrates the additional delay TR which is experienced between the time the COUT line is changed and the start of a transmitted message when a reply is requested by the central controller. This Fig. also shows the length of time TST from the start of the transmitted reply message to the time at which the signals on the STAT1 and STAT2 lines are strobed into the serial shift register of the digital IC 80. FIG. 40(d) shows the reset pulse which is either developed internally within the device 80 by the Schmidt trigger U180 (FIG. 18) or may be sent to the device 80 from an external controlling device, this pulse having a minimum width of 50 nanoseconds for all three baud rates. A comparison of FIGS. 40(b) and 40(d) also shows the time (TCR) required to reset the COUT output line in response to the reset pulse shown in FIG. 40(d).

Referring now to FIG. 42, this figure shows the various timing diagrams in connection with the digital IC 80 when operated in an expanded mode in setting up the interface with an associated microcomputer and in reading data from the serial shift register of the device 80 and loading data into this register. In FIG. 42(a) the time delay between the receipt of a message from the central controller and the time the BUSYN line goes low (FIG. 42(b)), which is identified as the delay TBD, is shown. The time from the end of a received message to the time the BUSYN line is brought high again is shown by the interval TIBD, when comparing FIGS. 42(a) and (b). Also, this same delay is produced in developing an interrupt pulse on the INT line, as shown in FIG. 42(c).

A comparison of FIGS. 42(a) and 42(f) shows the time TDM between the end of a received message and the time data is available on the DATA pin of the digital IC 80. A comparison of FIGS. 42(c) and (e) shows the time delay TIRST between the leading edge of the first serial clock pulse produced on the SCK line by the microcomputer and the time at which the device 80 causes the INT line to go low.

FIG. 42(e) shows the width TSCK of the serial clock pulses supplied to the SCK line by the microcomputer, these pulses having a minimum width of 100 nanoseconds for all baud rates. A comparison of FIGS. 42(e) and 42(f) shows the maximum time TSD available to the microcomputer to apply an SCK pulse to the SCK line in reading data out of the serial shift register of the digital IC 80. A comparison of these Figs. also shows the set up time TWSU required between the time the microcomputer puts data on the DATA line and the time when the microcomputer can thereafter clock the SCK line reliably. As shown in FIG. 43 this time is a minimum of 50 nanoseconds for all three baud rates. A comparison of FIGS. 42(d) and (g) shows the time TT required after the RW line is pulled high after it has been low for the digital IC 80 to start transmitting a message onto the network. A comparison of FIGS. 42(b) and (d) shows the time TBT required between the time the RW line is pulled high and the time the digital IC 80 responds by pulling the BUSYN line low.

Obviously, many modifications and variations of the present invention are possible in light of the above teachings. Thus it is to be understood that within the scope of the appended claims the invention may be practiced otherwise than as specifically described hereinabove.

What is claimed and desired to be secured by Letters Patent is:

1. A multi purpose two way communication device connected to a communication network line for receiving plural bit digital signal messages from and transmitting plural bit digital signal messages to a central controller also connected to said network line, said device comprising a single hard-wired digital-logic integrated circuit, said device being operable in a first mode in which said device includes means for receiving and decoding a digital signal message from said central controller and means responsive to the decoded message for executing a control function in accordance with an instruction contained in the decoded message, said device also being operable in a second expanded service mode which includes means responsive to a different decoded message for establishing an interface to a microcomputer, said device in said second mode including means for storing a received message until such time as said microcomputer decides to read out said stored message over said established interface, a digital signal message received from said network including a plurality of instruction bits and a control bit, means for storing the bits of a received message in said device, means operable in said first mode and in response to a stored control bit of predetermined value for executing a control function in accordance with a first combination of stored instruction bits, and means operable in said expanded mode and in response to a control bit of said predetermined value for establishing said interface in accordance with a second combination of stored instruction bits.

2. A device according to claim 1, which includes means operative after said interface has been established and responsive to a digital signal message received from said network line and having a control bit value different from said predetermined value for accessing the stored bits of said received message to the interfaced microcomputer.

3. A device according to claim 1, which includes means operative after said interface has been established and responsive to a digital signal message received from said network line and having a control bit of said predetermined value for disabling said interface in accordance with a third combination of stored instruction bits.

4. A multi purpose two way communication device connected to a communication network line for receiving plural bit digital signal messages from and transmitting plural bit digital signal messages to a central controller also connected to said network line, said device comprising a single hard-wired digital-logic integrated circuit, said device being operable in a first mode in which said device includes means for receiving and decoding a digital signal message from said central controller and means responsive to the decoded message for executing a control function in accordance with an instruction contained in the decoded message, said device also being operable in a second expanded service mode which includes means responsive to a different decoded message for establishing an interface to a microcomputer, said device in said second mode including means for storing a received message until such time as said microcomputer decides to read out said stored message over said established interface, a digital signal message received from said network including a plurality of address bits, a plurality of instruction bits and a control bit, means for storing the bits of a received message in said device, means operable in said first mode for comparing said stored address bits with an address assigned to said device and upon coincidence thereof responding to a control bit of predetermined value by executing a control function in accordance with a first combination of stored instruction bits, and means operable in said expanded mode and in response to a control bit of said predetermined value and coincidence of said address bit comparing means for establishing said interface in accordance with a second combination of stored instruction bits.

5. A device according to claim 4, which includes means operative after said interface has been established and responsive to a digital signal message received from said network line and having a control bit value different from said predetermined value for accessing the stored bits of said last named received message to the interfaced microcomputer.

6. A multi purpose two way communication device connected to a communication network line for receiving plural bit digital signal messages from and transmitting plural bit digital signal messages to a central controller also connected to said network line, said device comprising a single hard-wired digital-logic integrated circuit, said device being operable in a first mode in which said device includes means for receiving and decoding a digital signal message from said central controller and means responsive to the decoded message for executing a control function in accordance with an instruction contained in the decoded message, said device also being operable in a second expanded service mode which includes means responsive to a different decoded message for establishing an interface to a microcomputer, said device in said second mode including means for storing a received message until such time as said microcomputer decides to read out said stored message over said established interface, a digital signal message including a plurality of signal bits and a control bit, means for storing the bits of a received message in said device, means operable in said first mode and responsive to a stored control bit of one value for interpreting a predetermined group of said stored message bits as a combination of instruction bits and executing a control function in accordance therewith, and means operable in said expanded mode and responsive to a stored control bit of a different value for interpreting said group of stored message bits as data for said interface microcomputer.

7. A device according to claim 6, which includes means operative in said first mode and responsive to a stored control bit of said one value for interpreting a different group of said stored message bits as address bits identifying said device, and means operable in said expanded mode and responsive to a stored control bit of said different value for interpreting said different group of stored message bits as data for said interfaced microcomputer.

8. In a communication and control system, the combination of a digital IC device coupled to a communication network link and adapted to receive plural bit messages transmitted over said link from a central controller, a serial shift register in said device and having a data input and a clock input, means for storing the bits of a received message in said register, a microcomputer interfaced to said device, said interface including an interrupt line, and means in said device and responsive to the storing of a received message in said serial shift register for producing an interrupt signal on said interrupt line, said interface also including a serial data line and a serial clock line, means in said device for connecting the output of said serial shift register to said serial data line, means in said device for connecting said serial clock line to said clock input of said serial shift register after said received message has been stored therein, and means in said microcomputer for reading the message bits stored in said register by applying successive clock pulses to said serial clock line to shift successive bits stored in said register onto said serial data line and successively reading said serial data line.

9. The combination of claim 8, which includes a receive-transmit shift register stage serially connected between the output of said serial shift register and said serial data line and having a clock input connected to said serial clock line, and means for setting said receive-transmit stage to a predetermined logic value after said received message is stored in said serial shift register, thereby to indicate to said microcomputer that a message has been received.

10. The combination of claim 9, which includes means for inputting a zero to said data input of said serial shift register so that said serial shift register and said receive-transmit stage are back filled with zeros after said received message bits have been shifted out of said serial shift register and said receive-transmit stage by the application of clock pulses to said serial clock line.

11. In a communication control network, the combination of a digital IC device coupled to a common network line and adapted to store plural bit messages transmitted over said line from a central controller, and means in said device and responsive to the reception of a message which includes an enable interface instruction for establishing an interface to an associated microcomputer, said plural bit message remaining stored in said device until said microcomputer decides to read out said stored message through said established interface, means in said device for storing data transmitted to said device from said microcomputer over said interface, and means in said device for transmitting the microcomputer data stored therein onto said common line as a network message, said microcomputer interface including a read-write line, means in said microcomputer for supplying a control signal to said read-write line, and means in said device and responsive to said control signal for initiating transmission of said microcomputer data over said common network line.

12. The combination of claim 11, wherein said control signal comprises successive low and high signals on said read-write line.

13. A digital IC device connected to a communication network line for receiving a message from a central controller also connected to said network line, the received message including a plurality of address bits and instruction bits followed by a set of error checking bits the logic value of which is determined by the preceding bits of the received message, a serial shift register in said device for storing the received message bits preceding said error checking bits, error code computing means included in said device for computing a new set of error checking bits based on the logic values of the received message bits preceding said error checking bits as said preceding message bits are stored in said serial shift register, means in said device for comparing said new set of error checking bits with a set of error checking bits of the received message on a bit by bit basis and developing an output signal if all bits of the two sets compare equally, means in said device for shifting out to said network line at least certain of the bits stored in said register to form a portion of a transmitted message, means in said device for supplying said certain bits to said error code computing means as they are shifted out of said register so that a set of transmission error checking bits is computed by said error code computing means based on the logic values of said certain bits, and means for supplying said set of transmission error checking bits to said network line as another portion of said transmitted message.

14. A device as set forth in claim 13, which includes means in said device for comparing the address bits of the received message with an address assigned to said device and upon coincidence thereof executing a control function in accordance with a predetermined combination of said instruction bits.

15. A device as set forth in claim 13, wherein said device includes a control output terminal connected to a controlled element external to said communication device, a status terminal connected to said controlled element to indicate the condition thereof, means in said device for comparing the address bits of the received message with an address assigned to said device and upon coincidence thereof controlling the logic value of said output terminal in accordance with a first combination of said instruction bits, and means in said device responsive to a second combination of said instruction bits for transmitting a reply message to the network, said reply message including said received address and instruction bits and a status bit representing the condition of said status terminal.

16. A device as set forth in claim 15, wherein said status bit is supplied to said error code computing means so that said set of transmission error checking bits is computed taking into account the logic value of said status bit.

17. A hardware based digital IC device connected to a communication network line for receiving a message including a plurality of instruction bits, a serial shift register in said device for storing the bits of a received message as they are received, a control output terminal in said device connected to a controlled element external to said digital IC device, a status terminal in said device connected to said controlled element to indicate the condition thereof, means responsive to a predetermined combination of said instruction bits for supplying a control signal to said control output terminal and transmitting a reply message back to the network which includes the bits stored in said shift register, and means in said device for including a status bit in said transmitted reply message which represents the condition of said status terminal.

18. A device as set forth in claim 17, wherein said status bit is added to said reply message after a predetermined number of bits have been shifted out of said serial shift register.

19. A device set forth in claim 18 which includes means operative after a bit has been shifted out of a predetermined one of the stages of said shift register for storing the logic value of said status bit in said one stage, and means for thereafter shifting said stored status bit out of said one stage as a part of said reply message.

20. A digital IC device as set forth in claim 17, wherein said received message includes a start signal having a duration of two bit intervals and a logic value of one, and means in said device and responsive to said start signal for setting a start bit register stage in said serial shift register.

21. A digital IC device as set forth in claim 20, wherein the bits stored in said shift register are shifted out beginning with said start bit register stage to form said reply message, and means in said device for developing an additional logic "1" start bit after said start bit register stage has been shifted out and before the remaining bits stored in said register are shifted out, thereby to provide a start signal of two bit intervals duration at the start of said transmitted reply message.

22. In a combination and control system, the combination of a digital IC device connected to a communication network line and adapted to receive plurality bit messages transmitted over said line from a central controller, a serial shift register in said device and having a data input and a clock input, means for storing the bits of a received message in said register, a microcomputer interfaced to said device through a serial data line, a serial clock line and a read-write control line, means in said device for connecting the output of said serial shift register to said serial data line when said read-write control line has a predetermined logic value, means in said device for connecting said serial clock line to said clock input of said serial shift register after said received message has been stored therein, and means in said microcomputer for reading the message bits stored in said register by applying successive clock pulses to said serial clock line to shift successive stored bits onto said serial data line and successively reading said serial data line.

23. The combination of claim 22, which includes means in said microcomputer for causing said read-write line to have the opposite logic value, means in said device and operative when said read-write control line has said opposite logic value for disconnecting said serial data line from the output of said serial shift register and connecting said serial data line to the data input of said serial shift register, and means in said microcomputer for sequentially placing a series of data bits on said serial data line and applying a clock pulse to said serial clock line coincident with each data bit in said series, thereby to shift said series of data bits into said register.

24. The combination of claim 23, which includes means in said microcomputer for causing said read-write line to have said predetermined logic value after said data bits have been shifted into said register, and means in said device and responsive to said last named means for initiating transmission of a message onto the network which includes said data bits.

25. The combination of claim 24, which includes means in said device ad operative after said data bits have been shifted into said register for disconnecting said serial clock line from said clock input of said serial shift register.

26. In a communication control network, the combination of a digital IC device coupled to a common network line and adapted to store plural bit messages transmitted over said line from a central controller, and means in said device and responsive to the reception of a message which includes an enable interface instruction for establishing an interface to an associated microcomputer, said plural bit message remaining stored in said device until said microcomputer decides to read out said stored message through said established interface, said microcomputer interface also including a read-write line, and means operative when said read-write line has one logic value for enabling said microcomputer to read the message bits stored in said device and operative when said read-write line has the opposite logic value for enabling said microcomputer to store data in said device.

27. The combination of claim 26, which includes means in said device and operative when said read-write line has said one logic value after microcomputer data has been stored in said device for transmitting the stored data onto said common line as a network message.

28. In a communication control network, the combination of a digital IC device coupled to a common network line and adapted to store plural bit messages transmitted over said line from a central controller, and means in said device and responsive to the reception of a message which includes an enable interface instruction for establishing an interface to an associated microcomputer, said plural bit message remaining stored in said device until said microcomputer decides to read out said stored message through said established interface, said stored plural bit messages from said central controller including a control bit having a predetermined logic value when accompanying said enable interface instruction and a plurality of address bits, means in said device for comparing said address bits with an address assigned to said device and upon coincidence thereof responding to a control bit of said predetermined value and said enable interface instruction by establishing said interface, and means in said device operative after said interface has been established and responsive to a plural bit message from said central controller which includes a control bit of said predetermined value and a plurality of address bits which do not coincide with the address assigned to said device for disabling said interface.

29. The combination of claim 28, which includes means in said device for detecting an error in a received message, and means in said device controlled by said error detection means for preventing said interface disabling means from disabling said interface when an error is detected in the received message.

30. In a communication and control network, the combination of, a digital IC coupled to a common network line and adapted to store plural bit messages transmitted over said line, said device having first and second control output terminals, a variable interval timer external to said device having a reset terminal connected to said first control terminal and a clock inhibit terminal connected to said second control terminal, a controlled element external to said device and connected to said second control terminal, said variable timer having a decode output which is low when said timer is reset and is connected to an input terminal of said device, means in said device and responsive to the reception of a message which includes a shed load instruction for pulling both said first and second control output terminals low, thereby to cause said controlled device to shed load and said timer to start counting, said decode output of said timer going high a predetermined time interval after starting said counting, and means in said device and responsive to a high on said input terminal for pulling said second control output terminal high, thereby causing said controlled element to restore load at the end of said predetermined interval.

31. The combination of claim 30, which includes means for adjusting said predetermined time interval.

32. The combination of claim 30, wherein said timer has a plurality of inputs which may be selectively grounded to vary said predetermined time interval.

33. The combination of claim 30, wherein said device is operable in an expanded mode to establish an interface to an associated microcomputer in response to the reception of a message which includes an enable interface instruction, and means utilizing said first and second control output terminals as a part of said interface in said expanded mode.

34. The combination of claim 33, wherein said input terminal of said device also forms part of said interface in said expanded mode.

35. In a communication and control network, the combination of, a digital IC coupled to a common network line and adapted to store plural bit messages transmitted over said line, said device having a control output terminal connected to a controlled element external to said device, means in said device and responsive to the reception of a message which includes a shed load instruction for producing a signal of predetermined logic value on said control output terminal which causes said controlled element to shed load, timing means external to said device and responsive to said signal on said control output terminal for developing an output signal a predetermined time interval thereafter, and means in said device and responsive to said output signal for causing said controlled element to restore load.

36. The combination of claim 35, which includes means for varying said predetermined time interval.

37. The combination of claim 35, wherein said last named means changes said signal on said control output terminal to the opposite logic value in response to said output signal.

38. The combination of claim 35, wherein said device is operable in an expanded mode to establish an interface to an associated microcomputer in response to the reception of a message which includes an enable interface instruction, and means utilizing said control output terminal as a part of said interface in said expanded mode.

39. In a communication control network, the combination of a digital IC device coupled to a common network line and adapted to store plural bit messages transmitted over said line from a central controller, and means in said device and responsive to the reception of a message which includes an enable interface instruction for establishing an interface to an associated microcomputer, said plural bit message remaining stored in said device until said microcomputer decides to read out said stored message through said established interface, said stored plural bit messages from said central controller also including a control bit having a predetermined logic value when accompanying said enable interface instruction and a plurality of address bits, means in said device for comparing said address bits with an address assigned to said device and upon coincidence thereof responding to a control bit of said predetermined value and said enable interface instruction by establishing said interface, and means in said device operative after said interface has been established and responsive to a plural bit message from said central controller which includes a control bit of said predetermined value and a disable interface instruction for disabling said interface.

40. In a communication control network, the combination of a digital IC device coupled to a common network line and adapted to store plural bit messages transmitted over said line from a central controller, and means in said device and responsive to the reception of a message which includes an enable interface instruction for establishing an interface to an associated microcomputer, said plural bit message remaining stored in said device until said microcomputer decides to read out said stored message through said established interface, said interface including an interrupt line and a data line, means in said device and responsive to the storage therein of a message from said central controller for producing an interrupt signal on said interrupt line and placing said data line at a predetermined logic state, means in said device for storing data applied to said device over said established interface by said microcomputer and transmitting the microcomputer data stored therein over said common network line to said central controller, and means in said device for placing said data line in the opposite logic state and producing an interrupt signal on said interrupt line after said microcomputer data has been transmitted to said central controller.

41. In a communication and control system, a digital IC device having a transmit output terminal coupled to a common network line of said system, means in said device for supplying a message start signal to said transmit terminal having a predetermined logic value and a duration of two bit intervals at a predetermined baud rate, and means in said device for supplying message data bits stored in said device to said transmit terminal immediately following said start signal, one of said data bits comprising a control bit having a first logic value which designates a plurality of message bits as instruction bits to enable an interface to be set up between said common network line and a microcomputer, the other logic value of said control bit designating a plurality of message bits as data bits for said microcomputer after said interface has been enabled.

42. The combination of claim 41, wherein a plurality of said message bits supplied to said transmit terminal comprise address bits when said control bit has said one logic value, said address bits comprising the network address assigned to said microcomputer.

43. In a communication and control system, the combination of a digital IC device coupled to a communication network link and adapted to receive a plurality of bit messages transmitted over said link, a serial shift register in said device and having a data input and a clock input, means for storing the bits of a receive message in said register, a microcomputer interface to said device through a serial data line and a serial clock line, means in said device for connecting the output of said serial shift register to said serial data line, means in said device for connecting said serial clock line to said clock input of said serial shift register, and means in said microcomputer for reading the message bits stored in said register by applying successive clock pulses to said serial clock line to shift successive stored bits onto said serial data line and successively reading said serial data line, an error code shift register stage serially connected between the output of said serial shift register and the serial data line, error code detecting means in said device for detecting an error in said receive message, and means in said device and controlled by said error code detection means for setting said error code register stage to a predetermined logic value when an error is detected in a received message, a message bit counter for counting the number of bits in the received message and producing an output signal at the end of the message, and means jointly controlled by said output signal and said error code detection means for setting said error code register stage to a predetermined logic value when an error is detected in the received message.

44. In a communication and control system, the combination of a digital IC device coupled to a common network line and having a serial shift register for storing a plural bit message transmitted over said line from a central controller, a microcomputer interfaced to said device, said interface including a data line and an interrupt line, a receive-transmit register stage in said device and serially connected between the output of said serial shift register and said data line, means in said device and responsive to the storing of said central controller message in said serial shift register for producing a first interrupt signal on said interrupt line, and means for setting said receive-transmit stage to a predetermined logic value after said received message has been stored in said serial shift register, whereby said microcomputer can verify that a message has been received by said device by reading said data line and said interrupt line.

45. The combination of claim 44, which includes means in said microcomputer for reading through said interface the message stored in said serial shift register, and means for setting said receive-transmit stage to the opposite logic value when said message has been read out by said computer.

46. The combination of claim 45, which includes means in said microcomputer for storing data in said serial shift register through said interface, means in said device for transmitting the data stored in said register over said common network line to said central controller without disturbing the setting of said receive-transmit stage, and means in said device for producing a second interrupt signal on said interrupt line after said data has been transmitted, whereby said microcomputer can verify that said data has been transmitted and said register is empty by reading said data line and said interrupt line.

47. In a communication control network, the combination of, a plurality of digital IC devices each coupled to a common network line and each adapted to store a first message transmitted over said line from a central controller, each of said devices having a different address assigned thereto, said first message including a plurality of address bits, a plurality of instruction bits and a control bit having a first logic value, means in each of a first group of said devices and responsive to the reception of a first message which includes address bits corresponding to the address assigned to the device and instruction bits corresponding to an enable interface instruction for establishing an interface to an associated microcomputer so that said microcomputer can read said first message stored in said device, each of said first group of devices also being adapted to store a second message transmitted over said line from said central controller, said second message including a control bit of the opposite logic value and data bits intended for said microcomputer which data bits occupy message bit positions previously occupied by said address bits of said first message, and means in each of said devices and responsive to said control bit of opposite logic value for preventing said data bits of said second message from being falsely interpreted as address bits corresponding to the address assigned to the device.

48. The combination of claim 47, which includes means in each of a second group of said devices for storing a third message transmitted over said line from said central controller, said third message including a control bit of said first logic value, address bits corresponding to the address assigned to one device in said second group of devices and instruction bits corresponding to a predetermined control function, and means in each of said second group of devices and operative when said address bits of said stored third message correspond to the address assigned to the device for executing a control function corresponding to said instruction bits of said stored third message.

49. The combination of claim 47, which includes means in each of said first group of devices for storing a third message transmitted over said line from said central controller, said third message including address bits, instruction bits and a control bit of said first logic value, and means in each of said first group of devices and responsive to the reception of a third message which includes address bits corresponding to the address assigned to the device and instruction bits corresponding to a disable interface instruction for disabling said established interface.

50. The combination of claim 47, which includes means in each of said first group of devices and operative after said interface has been established between one of said devices and said microcomputer for responding to a third message transmitted over said line from said central controller which includes a control bit of said first logic value and address bits which do not correspond to the address assigned to said one device for disabling said established interface.

51. The combination of claim 50, wherein said third message includes a set of error checking bits the logic value of which is determined by the preceding bits of said third message, error code computing means in each of said first group of devices for computing a new set of error checking bits based on the logic values of the message bits of said third message which precede said error checking bits, and means operative when said error computing means indicates an error in said third message as received by said one device for preventing said disabling means from disabling said established interface.

52. The combination of claim 47 wherein said first message also includes data bits intended for said associated microcomputer.

* * * * *